US010294325B2

(12) United States Patent
Fujimoto

(10) Patent No.: US 10,294,325 B2
(45) Date of Patent: May 21, 2019

(54) HALO-CONTAINING ANION EXCHANGE MEMBRANES AND METHODS THEREOF

(71) Applicant: National Technology & Engineering Solutions of Sandia, LLC, Albuquerque, NM (US)

(72) Inventor: Cy Fujimoto, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/911,641

(22) Filed: Mar. 5, 2018

(65) Prior Publication Data

US 2018/0194892 A1 Jul. 12, 2018

Related U.S. Application Data

(63) Continuation-in-part of application No. 15/398,545, filed on Jan. 4, 2017, now Pat. No. 10,053,534.

(60) Provisional application No. 62/274,569, filed on Jan. 4, 2016.

(51) Int. Cl.

| | |
|---|---|
| ***C08J 5/22*** | (2006.01) |
| ***B01J 41/07*** | (2017.01) |
| ***B01J 41/13*** | (2017.01) |
| ***B01J 47/12*** | (2017.01) |
| ***C08G 61/10*** | (2006.01) |
| ***H01M 8/1018*** | (2016.01) |
| ***H01M 8/1023*** | (2016.01) |
| ***H01M 8/1039*** | (2016.01) |

(52) U.S. Cl.

CPC .............. *C08G 61/10* (2013.01); *B01J 41/07* (2017.01); *B01J 41/13* (2017.01); *B01J 47/12* (2013.01); *C08J 5/2262* (2013.01); *H01M 8/1023* (2013.01); *H01M 8/1039* (2013.01); *C08G 2261/228* (2013.01); *C08G 2261/312* (2013.01); *C08G 2261/46* (2013.01); *C08G 2261/516* (2013.01); *C08G 2261/90* (2013.01); *C08J 2365/02* (2013.01); *H01M 2008/1095* (2013.01); *Y02E 60/523* (2013.01); *Y02P 70/56* (2015.11)

(58) Field of Classification Search

CPC .......... C08G 18/0828; C08G 2261/516; C08G 2261/1452; C08G 2261/722; H01B 1/122; H01M 8/1025

See application file for complete search history.

(56) References Cited

U.S. PATENT DOCUMENTS

| | | | |
|---|---|---|---|
| 7,022,810 | B1 | 4/2006 | Cornelius |
| 7,301,002 | B1 | 11/2007 | Cornelius et al. |
| 7,582,683 | B2 | 9/2009 | Pivovar et al. |
| 7,781,625 | B2 | 8/2010 | Earle et al. |

(Continued)

OTHER PUBLICATIONS

Akiko O et al., "Electrophilic aromatic aroylation with $CF_3$-bearing arenecarboxylic acid derivatives: Reaction behavior and acidic mediator dependence," *Synth. Commun.* 2007;37:2701-15.

(Continued)

*Primary Examiner* — Shane Fang
(74) *Attorney, Agent, or Firm* — Helen S. Baca

(57) ABSTRACT

The present invention relates to functionalized polymers including a poly(phenylene) structure having modifications suitable for an anion exchange membrane. Exemplary modifications include use of a cationic moiety and a halo moiety. Methods and uses of such structures and polymers are also described herein.

20 Claims, 31 Drawing Sheets

(I)

(56) References Cited

U.S. PATENT DOCUMENTS

| | | | |
|---|---|---|---|
| 7,816,482 | B1 | 10/2010 | Hibbs et al. |
| 7,846,980 | B2 | 12/2010 | Pivovar et al. |
| 7,875,101 | B2 | 1/2011 | Staiger et al. |
| 7,888,397 | B1 | 2/2011 | Hibbs et al. |
| 8,110,636 | B1 | 2/2012 | Fujimoto et al. |
| 8,227,147 | B2 | 7/2012 | Kim et al. |
| 8,492,049 | B2 | 7/2013 | Kim et al. |
| 8,530,109 | B2 | 9/2013 | Kim et al. |
| 8,809,483 | B1 | 8/2014 | Hibbs |
| 9,048,480 | B2 | 6/2015 | Kim et al. |
| 9,051,431 | B2 | 6/2015 | Kim et al. |
| 9,580,541 | B1 | 2/2017 | Fujimoto et al. |
| 2009/0264544 | A1 | 10/2009 | Loy |
| 2011/0237789 | A1 | 9/2011 | Weber et al. |
| 2012/0225371 | A1 | 9/2012 | Kim et al. |
| 2015/0349269 | A1 | 12/2015 | Lee et al. |
| 2017/0190831 | A1 | 7/2017 | Kim et al. |

OTHER PUBLICATIONS

Antoniotti S et al., "Metal triflimidates: better than metal triflates as catalysts in organic synthesis—the effect of a highly delocalized counteranion," *Angew. Chem. Int'l Ed.* 2010;49:7860-88.

Corriu R et al., "Mécanisme de la C acylation: étude cinétique du mécanisme de l'acétylation des composés aromatiques catalysée par $AlCl_3$," *Tetrahedron* 1971;27:5819-31.

Corriu R et al., "Mécanisme de la C acylation: étude cinétique du mécanisme de la benzoylation des composés aromatiques catalysée par $AlCl_3$," *Tetrahedron* 1971;27:5601-18.

Effenberger F et al., "Trifluoromethanesulfonic-carboxylic anhydrides, highly active acylation agents," *Angew. Chem. Int'l Ed.* 1972;11(4):299-300.

Effenberger F et al., "Catalytic Friedel-Crafts acylation of aromatic compounds," *Angew. Chem. Int'l Ed.* 1972;11(4):300-1.

Fujimoto C et al., "Backbone stability of quaternized polyaromatics for alkaline membrane fuel cells," *J. Membrane Sci.* 2012;(423-424):438-49.

Fujimoto C et al., "Vanadium redox flow battery efficiency and durability studies of sulfonated Diels Alder poly(phenylene)s," *Electrochem. Commun.* 2012;20:48-51.

Fujimoto CH et al., "Ionomeric poly(phenylene) prepared by Diels-Alder polymerization: Synthesis and physical properties of a novel polyelectrolyte," *Macromolecules* 2005;38:5010-6.

Gal JF et al., "Metal triflates and triflimides as Lewis "superacids": preparation, synthetic application and affinity tests by mass spectrometry," *J. Phys. Org. Chem.* 2013;26:86-97.

Hibbs MR et al., "Synthesis and characterization of poly(phenylene)-based anion exchange membranes for alkaline fuel cells," *Macromolecules* 2009;42:8316-21.

Hibbs MR, "Alkaline stability of poly(phenylene)-based anion exchange membranes with various cations," *J. Polym. Sci. B* 2013;51:1736-42.

Hickner MA et al., "Transport in sulfonated poly(phenylene)s: Proton conductivity, permeability, and the state of water," *Polymer* 2006;47:4238-44.

Jakoby K et al., "Palladium-catalyzed phosphonation of polyphenylsulfone," *Macromol. Chem. Phys.* 2003;204:61-7.

Jang DO et al., "Highly selective catalytic Friedel-Crafts acylation and sulfonylation of activated aromatic compounds using indium metal," *Tetrahedron Lett.* 2006;47:6063-6.

Kim DS et al., "Resonance stabilized perfluorinated ionomers for alkaline membrane fuel cells," *Macromolecules* 2013;46(19):7826-33.

Kim YS et al., "Importance of polymer backbone stability of anion exchange polymer electrolytes," 227th ECS Meeting held on May 24, 2015-May 28, 2015 in Chicago, IL (MA2015-01), abstract No. 1231 (1 p.).

Kobayashi S et al., "Catalytic Friedel-Crafts acylation of benzene, chlorobenzene, and fluorobenzene using a novel catalyst system, hafnium triflate and trifluoromethanesulfonic acid," *Tetrahedron Lett.* 1998;39:4697-700.

Lee KS et al., "An operationally flexible fuel cell based on quaternary ammonium-biphosphate ion pairs," *Nature Energy* 2016;2: (7 pp.).

Lee KS et al., "Resonance-stabilized guanidinium-tethered poly(phenylene)s," PRiME 2016/230th ECS Meeting held on Oct. 2, 2016-Oct. 7, 2016 in Honolulu, HI (MA2016-02), abstract No. 2572 (1 p.).

Li N et al., "Polymer electrolyte membranes derived from new sulfone monomers with pendent sulfonic acid groups," *Macromolecules* 2010;43:9810-20.

Lim Y et al., "Synthesis and properties of sulfonated poly(phenylene sulfone)s without ether linkage by Diels—Alder reaction for PEMFC application," *Electrochim. Acta* 2014;119:16-23.

Luo K et al., "Investigation of ionic conductivity, uptake and cation diffusion of perfluorsulfonate and sulfonated block copolymer ion exchange membrane in non-aqueous solvents," 231st ECS Meeting held on May 28, 2017-Jun. 1, 2017 in New Orleans, LA (MA2017-01), abstract No. 166 (2 pp.).

Maalouf M et al., "Factors enabling high mobility of protons and water in perfluorosulfonate membranes under low hydration conditions," *Int'l J. Hydrogen Energy* 2014;39:2795-800.

Maurya S et al., "Importance of resonance structure on alkaline stability," 231st ECS Meeting held on May 28, 2017-Jun. 1, 2017 in New Orleans, LA (MA2017-01), abstract No. 1456 (1 p.).

Merle G et al., "Anion exchange membranes for alkaline fuel cells: A review," *J. Membrane Sci.* 2011;377:1-35.

Mohanty AD et al., "Stable elastomeric anion exchange membranes based on quaternary ammonium-tethered polystyrene-b-poly(ethylene-cobutylene)-b-polystyrene triblock copolymers," *Macromolecules* 2015;48:7085-95.

Murthy JK et al., "Aluminum chloride as a solid is not a strong Lewis acid," *J. Phys. Chem. B* 2006;110:8314-9.

Noji M et al., "Secondary benzylation using benzyl alcohols catalyzed by lanthanoid, scandium, and hafnium triflate," *J. Org. Chem.* 2003;68:9340-7.

Parcero E et al., "Phosphonated and sulfonated polyphenylsulfone membranes for fuel cell application," *J. Membr. Sci.* 2006;285:206-13.

Poppe D et al., "Carboxylated and sulfonated poly(arylene-co-arylene sulfone)s: thermostable polyelectrolytes for fuel cell applications," *Macromolecules* 2002;35:7936-41.

Rakita PE, "Triflic acid and its derivatives: a family of useful reagents for synthesis," *Chem. Today* May/Apr 2004:48-50.

Shainyan BA et al., "Trifluoromethanesulfonamides and related compounds," *Chem. Rev.* 2013;113:699-733.

Singh RP et al., "An efficient method for aromatic Friedel-Crafts alkylation, acylation, benzoylation, and sulfonylation reactions," *Tetrahedron* 2001;57:241-7.

Skalski TJG et al., "Structurally-defined, sulfo-phenylated, oligophenylenes and polyphenylenes," *J. Am Chem. Soc.* 2015;137(38):12223-6.

Stanis RJ et al., "Evaluation of hydrogen and methanol fuel cell performance of sulfonated diels alder poly(phenylene) membranes," *J. Power Sci.* 2010;195:104-10.

Sun C-N et al., "Evaluation of Diels-Alder poly(phenylene) anion exchange membranes in all-vanadium redox flow batteries," *Electrochem. Commun.* 2014;43:63-6.

Tang Z et al., "Block copolymer SDAPP membranes for vanadium redox flow batteries-strategy to address transport and durability," PRiME 2016/230th ECS Meeting held on Oct. 2, 2016-Oct. 7, 2016 in Honolulu, HI (MA2016-02), abstract No. 19 (2 pp.).

International Search Report (Form PCT/ISA/210), for International application No. PCT/US17/12206 (filing date Jan. 4, 2014), dated Apr. 13, 2017 (2 pp.).

Written Opinion of the International Searching Authority (Form PCT/ISA/237), for International application No. PCT/US17/12206 (filed Jan. 4, 2017), dated Apr. 13, 2017 (10 pp.).

Shifrina ZB et al., "Branched polyphenylenes by repetitive Diels-Alder cycloaddition", *Macromolecules* 2000; 33; 3525-9.

(I)

(Ia)

(Ib)

(Ic)

(Id)

(Ie)

(If)

(Ig)

(Ih)

(Ii)

(Ij)

(I-1) (I-2)

(I-3) (I-4)

(I-5)

(I-6)

(I-7)

(I-8)

(IV-2)

(IV-4)

(IV-5)

(IV-7) (IV-8)

(IV-7) (IV-8)

(IIa)

(IIb)

(IIc)

(IId)

(IIe)

(IIf)

(IIg)

(IIh)

(IIi)

(IIj)

(VI)

(VIa)

(VIb)

(VIc)

(II-5)

(II-6)

(IIk)

(IIl)

(IIm)

(IIn)

(IIo)

(IIp)

(IIq)

(IIr)

(II-7)

(II-8)

(II-9)

(II-10)

(II-11)

(II-12)

(II-13) (II-14)

(II-17)

(II-18)

HALO-CONTAINING ANION EXCHANGE MEMBRANES AND METHODS THEREOF

CROSS-REFERENCE TO RELATED APPLICATION

This application is a continuation-in-part of prior application Ser. No. 15/398,545, filed Jan. 4, 2017, now U.S. Pat. No. 10,053,534, issued Aug. 21, 2018, which in turn claims the benefit of U.S. Provisional Application No. 62/274,569, filed Jan. 4, 2016, each of which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to functionalized polymers including a poly(phenylene) structure having modifications suitable for an anion exchange membrane. Exemplary modifications include use of a cationic moiety and a halo moiety. Methods and uses of such structures and polymers are also described herein.

BACKGROUND OF THE INVENTION

Polymers including a poly(phenylene) backbone can provide improved properties, including enhanced chemical stability and/or strength. Thus, such robust polymers have been examined for use in fuel battery cells. However, further use as an anion exchange membrane will require chemical functionalities that impart binding to anionic carriers (e.g., hydroxide or carbonate anions), while maintaining the durability provided by the backbone. Additional starting materials, compositions, and methods to address such concerns are desired.

SUMMARY OF THE INVENTION

The present invention relates to polymer compounds and compositions having a poly(phenylene) structure in combination with a cationic moiety and/or a halo group to impart characteristics beneficial for an anion exchange membrane. For such a membrane, the composition should be capable of binding an anion, e.g., by use of a cationic moiety within the composition. In another instance, the composition should be sufficiently hydrophobic to reduce affinity with water, e.g., by use of a halo group within the composition.

Hydrophobicity can be one non-limiting way to control water affinity of the composition. In some instances, the polymer composition herein can be employed as an anion exchange membrane, which in turn can be employed within a fuel cell. A fuel cell can exhibit poor performance due to flooding, which can occur when the anionic exchange membrane displays high affinity to water. Thus, performance can be improved by employing a sufficiently hydrophobic polymer composition, which also displays binding to an anion carrier.

Accordingly, in one aspect, the present invention features a composition (e.g., a molecule, a monomer, a polymer, an article, etc.) including the formula (I), having the formula (I), or including a structure having the formula (I):

(I)

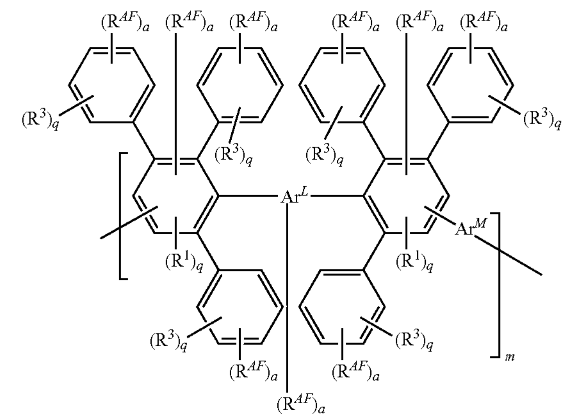

or a salt thereof (e.g., a cationic salt, such as a sodium salt, or a form thereof including a counter ion, such as a hydroxide).

In some embodiments, each and every $R^{AF}$ includes a cationic moiety or a halo. In other embodiments, at least one $R^{AF}$ is $R^A$ (e.g., an aryl, an alkyl, a heteroaryl, or a heteroalkyl substituted with the cationic moiety). In yet other embodiments, at least one $R^{AF}$ is $R^F$ (e.g., an aryl, an alkyl, a heteroaryl, or a heteroalkyl substituted with the halo). In some embodiments, the cationic moiety includes an onium cation (e.g., any described herein, such as an ammonium cation).

In some embodiments, each $R^{AF}$ includes, independently, optionally substituted alkyl (e.g., $C_{1-12}$ alkyl), optionally substituted haloalkyl (e.g., $C_{1-12}$ haloalkyl), optionally substituted perfluoroalkyl (e.g., $C_{1-12}$ perfluoroalkyl), optionally substituted heteroalkyl (e.g., $C_{1-12}$ heteroalkyl), halo, optionally substituted aryl (e.g., $C_{4-18}$ aryl), optionally substituted alkaryl (e.g., $C_{1-12}$ alk-$C_{4-18}$ aryl or $C_{1-6}$ alk-$C_{4-18}$ aryl), optionally substituted arylalkoxy (e.g., $C_{4-18}$ aryl-$C_{1-12}$ alkoxy or $C_{4-18}$ aryl-$C_{1-6}$ alkoxy), optionally substituted aryloxy (e.g., $C_{4-18}$ aryloxy, optionally including one or more halo or haloalkyl), optionally substituted aryloxycarbonyl (e.g., $C_{5-19}$ aryloxycarbonyl), optionally substituted aryloyl (e.g., $C_{7-11}$ aryloyl or $C_{5-19}$ aryloyl), optionally substituted arylcarbonylalkyl (e.g., $C_{4-18}$ arylcarbonyl-$C_{1-12}$ alkyl or $C_{4-18}$ arylcarbonyl-$C_{1-6}$ alkyl), optionally substituted arylsulfonyl (e.g., $C_{4-18}$ arylsulfoyl), or optionally substituted arylsulfonylalkyl (e.g., $C_{4-18}$ arylsulfonyl-$C_{1-12}$ alkyl or $C_{4-18}$ arylsulfonyl-$C_{1-6}$ alkyl).

In some embodiments, each $R^1$ or $R^3$ is, independently, H, halo, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^E$, where $R^S$ is an acidic moiety including a sulfonyl group, $R^P$ is an acidic moiety including a phosphoryl group, $R^C$ is an acidic moiety including a carbonyl group, and $R^E$ is an electron-withdrawing moiety; each $Ar^L$ is, independently, a bivalent linker including optionally substituted arylene; each $Ar^M$ is, independently, a bivalent linker including optionally substituted arylene; each q is, independently, an integer of from 0 to 5 (e.g., where each q for $R^1$ is, independently, 0 or 1); each a is, independently, an integer of from 0 to 5, wherein at least one a is not 0; and m is an integer of from about 1 to 1000 (e.g., from about 1 to 500). In further embodiments, at least one $R^1$ or $Ar^L$ in formula (I) includes $R^S$, $R^P$, $R^C$, or $R^E$. In some embodiments, q for $R^1$ is 1. In some embodiments, a for $Ar^L$ is an integer of from 0 to 5; and/or a for all other aryl groups is an integer of from 1 to 5. In some embodiments, each and every $R^3$ is, independently, $R^H$, $R^S$, $R^P$, $R^C$, or $R^E$.

In some embodiments, at least one $R^{AF}$ an optionally substituted aryl group. In other embodiments, each and every $R^{AF}$ comprises an optionally substituted aryl group. In yet other embodiments, at least one $R^{AF}$ includes an optionally substituted aryl group including one or more halo groups. In other embodiments, at least one $R^{AF}$ includes an optionally substituted alkyl group including one or more halo groups. In some embodiments, at least one $R^{AF}$ includes an optionally substituted aryl group including one or more cationic moieties. In other embodiments, at least one $R^{AF}$ includes an optionally substituted alkyl group including one or more cationic moieties.

In some embodiments, $R^{AF}$ is $-L^A-Ar^{AF}$. In other embodiments, $R^{AF}$ is $-L^A-Ak^{AF}$. In one instance, $Ar^{AF}$ is an optionally substituted aryl including the cationic moiety or the halo (e.g., substituted with one or more substituents selected from the group of halo, cyano, optionally substituted haloalkyl, optionally substituted perfluoroalkyl, optionally substituted nitroalkyl, and optionally substituted alkyl). In another instance, $Ak^{AF}$ is an optionally substituted alkyl including the cationic moiety or the halo; or an optionally substituted heteroalkyl including the cationic moiety or the halo (e.g., substituted with one or more substituents selected from the group of halo, cyano, optionally substituted haloalkyl, optionally substituted perfluoroalkyl, optionally substituted nitroalkyl, and optionally substituted alkyl).

In one instance, $L^A$ is a covalent bond, carbonyl (—C(O)—), oxy (—O—), thio (—S—), azo (—N═N—), phosphonoyl (—P(O)H—), phosphoryl (—P(O)<), sulfonyl (—$S(O)_2$—), sulfonyl (—S(O)—), sulfonamide (e.g., —$SO_2$—$NR^{L3}$— or —$NR^{L3}$—$SO_2$—, where $R^{L3}$ is H, optionally substituted alkyl, optionally substituted haloalkyl, optionally substituted alkoxy, optionally substituted alkaryl, optionally substituted aryl, or halo), imino (—NH—), imine (e.g., —$CR^{L1}$═N—, where $R^{L1}$ is H or optionally substituted alkyl), phosphine (e.g., —$PR^{L3}$— group, where $R^{L3}$ is H or optionally substituted alkyl), nitrilo (e.g., —$NR^{L3}$—, where $R^{L3}$ is H, optionally substituted alkyl, optionally substituted haloalkyl, optionally substituted alkoxy, optionally substituted alkaryl, optionally substituted aryl, or halo), optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy (e.g., —$(CR^{L1}R^{L2})_{La}$—, —C(O)$NR^{L3}$—, —$NR^{L3}$C(O)—, —$SO_2$—$NR^{L3}$—, —$NR^{L3}$—$SO_2$—, —$(CR^{L1}R^{L2})_{La}$—C(O)—$NR^{L3}$—, —$(CR^{L1}R^{L2})_{La}$—$NR^{L3}$—C(O)—, —$(CR^{L1}R^{L2})_{La}$—$SO_2$—$NR^{L3}$—, or —$SO_2$—$NR^{L3}$—$(CR^{L1}R^{L2})_{La}$—, where each of $R^{L1}$, $R^{L2}$, and $R^{L3}$ is, independently, H, optionally substituted alkyl, optionally substituted haloalkyl, optionally substituted alkoxy, optionally substituted alkaryl, optionally substituted aryl, or halo).

In other embodiments, $R^S$ is —$SO_2$—OH, —$SO_2$—$R^{S1}$, —$R^{SA}$—$SO_2$—$R^{S1}$, —$SO_2$—$R^{Ar}$, —$R^{SA}$—$SO_2$—$R^{Ar}$, —$SO_2NR^{N1}R^{N2}$, —N($R^{N1}$)—$SO_2$—$R^{S3}$, —$SO_2$—$R^{S3}$, —$SO_2$—$NR^{N1}$—$R^{S2}$, or —$SO_2$—$NR^{N1}$—$SO_2$—$R^{S3}$ (e.g., where each of $R^{S1}$, $R^{S2}$, $R^{S3}$, $R^{Ar}$, $R^{SA}$, $R^{N1}$, and $R^{N2}$ is any described herein).

In some embodiments, $R^C$ is —$CO_2$H, —C(O)—$R^{C1}$, or —$R^{CA}$—C(O)—$R^{C1}$ (e.g., where each of $R^{C1}$ and $R^{CA}$ is any described herein).

In some embodiments, $R^P$ is —$P(O)(OH)_2$, —O—$PO(OH)_2$, —P(O)$HR^{P1}$, —P(O)<$R^{P1}R^{P2}$, —P(O)<$R^{Ar}R^{P2}$, —P(O)<$R^{Ar}R^{Ar}$, —$R^{PA}$—P(O)<$R^{P1}R^{P2}$, —$R^{PA}$—P(O)<$R^{Ar}R^{P2}$, —$R^{PA}$—P(O)<$R^{Ar}R^{Ar}$, —O—P(O)<$R^{P1}R^{P2}$, —O—P(O)<$R^{Ar}R^{P2}$, or —O—P(O)<$R^{Ar}R^{Ar}$ (e.g., where each of $R^{P1}$, $R^{P2}$, $R^{Ar}$, and $R^{PA}$ is any described herein, and where each $R^{Ar}$ can be the same or different).

In some embodiments, $R^E$ is optionally substituted $C_{7-11}$ aryloyl, optionally substituted $C_{6-18}$ aryl, carboxyaldehyde, optionally substituted $C_{2-7}$ alkanoyl, optionally substituted $C_{1-12}$ alkyl, optionally substituted $C_{1-12}$ haloalkyl, optionally substituted $C_{2-7}$ alkoxycarbonyl, nitro, nitroso, cyano, sulfo, carboxyl, and quaternary ammonium (e.g., any described herein). In other embodiments, $R^E$ includes or is substituted by perfluoroalkyl (e.g., $C_{1-12}$ perfluoroalkyl).

In some embodiments, the composition includes a structure having any one of formulas (Ia) to (IIj), or a salt thereof or a form thereof including a counter ion. In other embodiments, each $R^{AF}$ is, independently, $R^A$ (i.e., a functional group including a cationic moiety) or $R^F$ (i.e., a functional group including a halo). In particular embodiments, the functional group for $R^A$ and $R^F$ is, independently, selected from the group of an optionally substituted alkyl, an optionally substituted heteroalkyl, an optionally substituted aryl, an optionally substituted heteroaryl, an optionally substituted alkaryl, an optionally substituted aryloxy, and an optionally substituted aryloyl.

In some embodiments, the composition includes a structure having any one of formulas (I-1) to (I-8), (IV-3), (IV-5), (IV-8), (IV-10), or (IV-11), or a salt thereof or a form thereof including a counter ion. In some embodiments, each and every $R^{AF1}$, if present, comprises the cationic moiety or the halo. In other embodiments, each and every $R^{A1}$, if present, comprises the cationic moiety. In yet other embodiments, each and every $R^{F1}$, if present, comprises the halo.

In some embodiments, $R^{F1}$ is the halo, an optionally substituted aryl having the halo, an optionally substituted alkyl having the halo, or an optionally substituted heteroalkyl having the halo. In other embodiments, $R^{A1}$ is the cationic moiety, an optionally substituted aryl having the cationic moiety, an optionally substituted alkyl having the cationic moiety, or an optionally substituted heteroalkyl having with the cationic moiety.

In another aspect, the present invention features a composition (e.g., a molecule, a monomer, a polymer, an article, etc.) including the formula (VI), having the formula (VI), or including a structure having the formula (VI):

(VI)

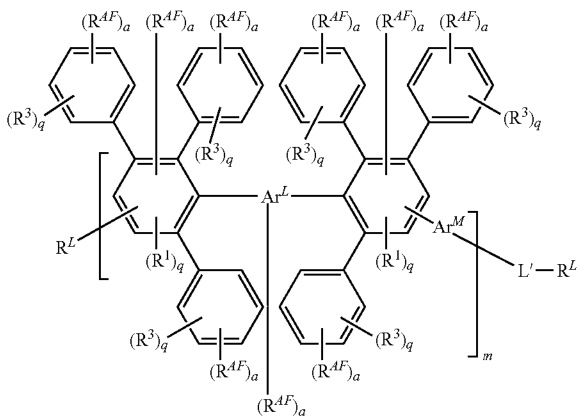

or a salt thereof (e.g., a cationic salt, such as a sodium salt) or a form thereof including a counter ion (e.g., an anion, such as any described herein). In some embodiments, each of $R^{AF}$ (e.g., $R^A$ and $R^F$), $R^H$, $R^1$, $R^3$, $Ar^L$, $Ar^M$, q, a, m, n, L', and $R^L$ is, independently, any described herein. In some embodiments, each $R^L$ is, independently, an electrophilic reactive end group (e.g., any herein, such as optionally substituted $C_{7-11}$ aryloyl or optionally substituted $C_{6-18}$ aryl). In further embodiments, at least one $R^1$ or $Ar^L$ or $Ar^M$ in formula (VI) includes $R^{AF}$, $R^A$, $R^F$, $R^H$, $R^S$, $R^P$, $R^C$, or $R^E$.

In yet another aspect, the present invention features a composition (e.g., a molecule, a monomer, a polymer, an article, etc.) including the formula (VII), having the formula (VII), or including a structure having the formula (VII):

(VII)

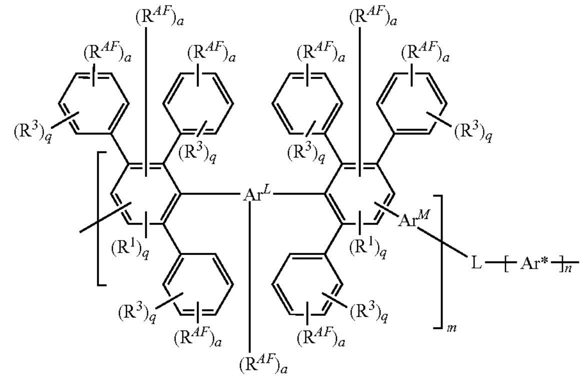

or a salt thereof (e.g., a cationic salt, such as a sodium salt) or a form thereof including a counter ion (e.g., an anion, such as any described herein). In some embodiments, each of $R^{AF}$ (e.g., $R^A$ or $R^F$), $R^1$, $R^3$, $Ar^L$, $Ar^M$, q, a, m, n, L, and Ar* is, independently, any described herein. In some embodiments, each of m and n is, independently, an integer of from about 1 to 1000 (e.g., from about 1 to 500); L is a linking segment; and Ar* is a hydrophobic segment. In further embodiments, at least one $R^1$ or $Ar^L$ or $Ar^M$ in formula (VII) includes $R^{AF}$, $R^A$, $R^F$, $R^H$, $R^S$, $R^P$, $R^C$, or $R^E$.

In yet another aspect, the present invention features a composition (e.g., a molecule, a monomer, a polymer, an article, etc.) including the formula (VIII), having the formula (VIII), or including a structure having the formula (VIII):

(VIII)

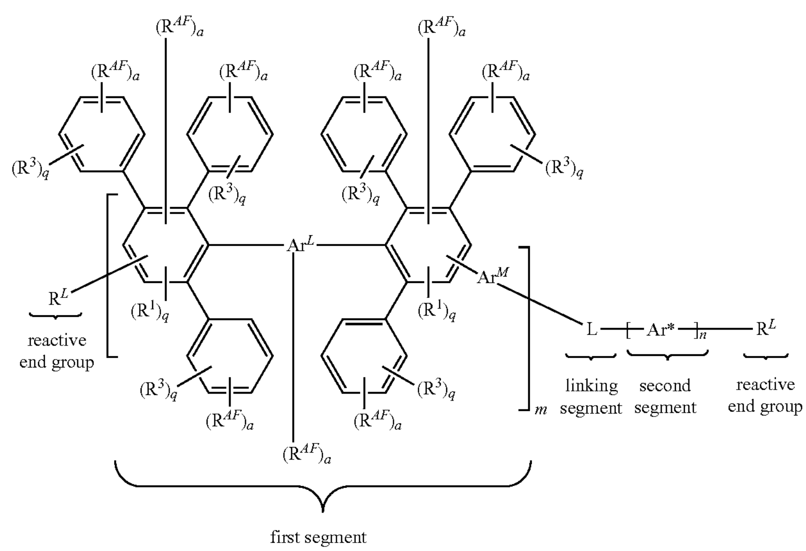

or a salt thereof (e.g., a cationic salt, such as a sodium salt) or a form thereof including a counter ion (e.g., an anion, such as any described herein). In some embodiments, each of $R^{AF}$ (e.g., $R^A$ or $R^F$), $R^1$, $R^3$, $R^L$, $Ar^L$, $Ar^M$, q, a, m, n, L, In yet another aspect, the present invention features a composition (e.g., a molecule, a monomer, a polymer, an and Ar* is, independently, any described herein. In some embodiments, each of m and n is, independently, an integer of from about 1 to 1000 (e.g., from about 1 to 500); L is a linking segment; and Ar* is a hydrophobic segment. In further embodiments, at least one $R^1$ or $Ar^L$ or $Ar^M$ in formula (VIII) includes $R^{AF}$, $R^A$, $R^F$, $R^H$, $R^S$, $R^P$, $R^C$, or $R^E$.

In another aspect, the present invention features a composition (e.g., a molecule, a monomer, a polymer, an article, etc.) including the formula (VIIIa), having the formula (VIIIa), or including a structure having the formula (VIIIa):

(VIIIa)

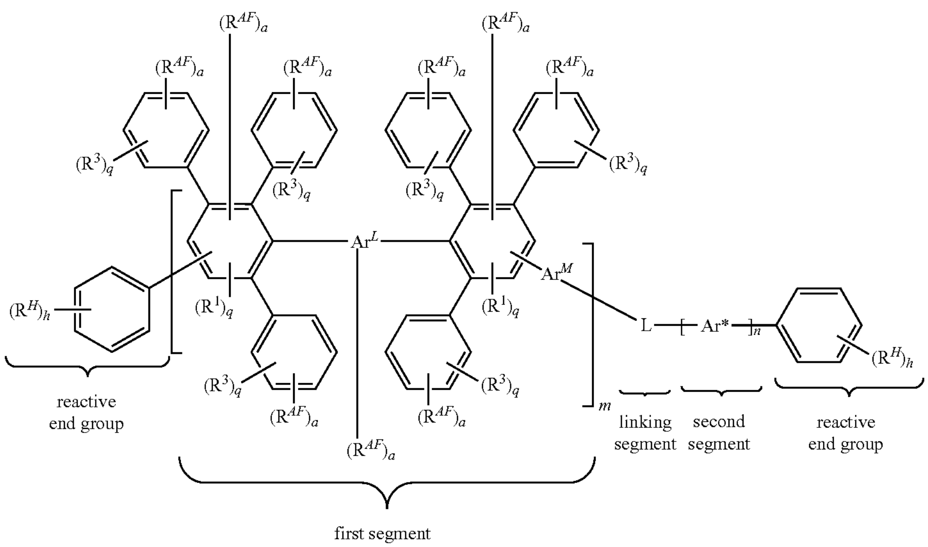

or a salt thereof (e.g., a cationic salt, such as a sodium salt) or a form thereof including a counter ion (e.g., an anion, such as any described herein). In some embodiments, each of $R^{AF}$ (e.g., $R^A$ or $R^F$), $R^1$, $R^3$, $Ar^L$, $Ar^M$, q, a, m, n, L, and Ar* is, independently, any described herein. In some embodiments, each of m and n is, independently, an integer of from about 1 to 1000 (e.g., from about 1 to 500); L is a linking segment; and Ar* is a hydrophobic segment. In further embodiments, at least one $R^1$ or $Ar^L$ or $Ar^M$ in formula (VIIIa) includes $R^{AF}$, $R^A$, RF, $R^H$, $R^S$, $R^P$, $R^C$, or $R^E$.

In yet another aspect, the present invention features a composition (e.g., a molecule, a monomer, a polymer, an article, etc.) including the formula (IX), having the formula (IX), or including a structure having the formula (IX):

(IX)

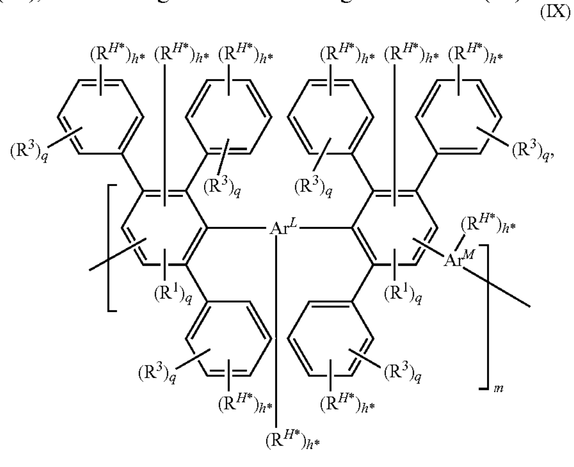

or a salt thereof (e.g., a cationic salt, such as a sodium salt) or a form thereof including a counter ion (e.g., an anion, such as any described herein). In some embodiments, each $R^{H*}$ is, independently, $R^{AF}$ or $R^{H'}$—$R^{AF}$, where $R^{AF}$ is a functional group including a cationic moiety or a halo, and where $R^{H'}$ is reacted reactive handle (e.g., any herein, where $R^{H'}$ is selected from the group of an optionally substituted alkyl (e.g., $C_{1-12}$ alkyl), optionally substituted haloalkyl (e.g., $C_{1-12}$ haloalkyl), optionally substituted perfluoroalkyl (e.g., $C_{1-12}$ perfluoroalkyl), optionally substituted heteroalkyl (e.g., $C_{1-12}$ heteroalkyl), optionally substituted aryl (e.g., $C_{4-18}$ aryl), optionally substituted alkaryl (e.g., $C_{1-12}$ alk-$C_{4-18}$ aryl or $C_{1-6}$ alk-$C_{4-18}$ aryl), optionally substituted arylalkoxy (e.g., $C_{4-18}$ aryl-$C_{1-12}$ alkoxy or $C_{4-18}$ aryl-$C_{1-6}$ alkoxy), optionally substituted aryloxy (e.g., $C_{4-18}$ aryloxy), optionally substituted aryloxycarbonyl (e.g., $C_{5-19}$ aryloxycarbonyl), optionally substituted aryloyl (e.g., $C_{7-11}$ aryloyl or $C_{5-19}$ aryloyl), optionally substituted arylcarbonylalkyl (e.g., $C_{4-18}$ arylcarbonyl-$C_{1-12}$ alkyl or $C_{4-18}$ arylcarbonyl-$C_{1-6}$ alkyl), optionally substituted arylsulfonyl (e.g., $C_{4-18}$ arylsulfoyl), or optionally substituted arylsulfonylalkyl (e.g., $C_{4-18}$ arylsulfonyl-$C_{1-12}$ alkyl or $C_{4-18}$ arylsulfonyl-$C_{1-6}$ alkyl)). In some embodiments, each of $R^{AF}$ (e.g., $R^A$ or $R^F$), $R^1$, $R^3$, $Ar^L$, $Ar^M$, q, h*, and m is, independently, any described herein. In some embodiments, each h* is, independently, an integer of from 0 to 5, wherein at least one h* is not 0. In further embodiments, at least one $R^1$ or $Ar^L$ or $Ar^M$ in formula (IX) includes $R^{AF}$, $R^A$, $R^F$, $R^H$, $R^S$, $R^P$, $R^C$, or $R^E$.

In some embodiments, the first composition is present in a polymeric membrane.

In any embodiment herein, L or L' includes a covalent bond, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, optionally substituted $C_{4-18}$ aryleneoxy, optionally substituted polyphenylene, or a structure of formula (II). In yet other embodiments, L or L' includes a structure of formula (I) and Ar* (e.g., any subunits described herein for Ar*).

In any embodiment herein, Ar* or L or L' includes a structure of formula (I), a sulfone subunit, an arylene sulfone subunit, an ether sulfone subunit, an arylene ether subunit, a perfluoroalkyl subunit, or a perfluoroalkoxy subunit.

In any embodiment herein, each of $Ar^L$, $Ar^M$, and Ar* is optionally substituted phenylene, optionally substituted naphthylene, optionally substituted phenanthrylene, a sulfone subunit, an arylene sulfone subunit, an ether sulfone subunit, an arylene ether subunit, a perfluoroalkyl subunit, a perfluoroalkoxy subunit, or any described herein (e.g., any aryl group described herein). In further embodiments, the optional substitution is $R^{AF}$, $R^A$, $R^F$, $R^H$, $R^S$, $R^P$, $R^C$, $R^E$ or a label (e.g., fluorine or another NMR detectable label).

In any embodiment herein, m is less than n. In any embodiment herein, m is more than n.

In any embodiment herein, the cationic moiety includes an onium cation (e.g., an ammonium cation, a sulfonium cation, a phosphonium cation, an oxonium cation, a diazonium cation, or a halonium cation).

In any embodiment herein, the counter ion is an anion (e.g., a hydroxide anion ($OH^-$), a halide anion (e.g., a chloride anion, a bromide anion, or a fluoride anion), or any described herein).

In any embodiment herein, $R^H$ is a reactive handle. In some embodiments, each $R^H$ is, independently, H, optionally substituted alkyl (e.g., $C_{1-12}$ alkyl), optionally substituted haloalkyl (e.g., $C_{1-12}$ haloalkyl), optionally substituted perfluoroalkyl (e.g., $C_{1-12}$ perfluoroalkyl), optionally substituted heteroalkyl (e.g., $C_{1-12}$ heteroalkyl), halo, optionally substituted aryl (e.g., $C_{4-18}$ aryl), optionally substituted alkaryl (e.g., $C_{1-12}$ alk-$C_{4-18}$ aryl or $C_{1-6}$ alk-$C_{4-18}$ aryl), optionally substituted arylalkoxy (e.g., $C_{4-18}$ aryl-$C_{1-12}$ alkoxy or $C_{4-18}$ aryl-$C_{1-6}$ alkoxy), optionally substituted aryloxy (e.g., $C_{4-18}$ aryloxy), optionally substituted aryloxycarbonyl (e.g., $C_{5-19}$ aryloxycarbonyl), optionally substituted aryloyl (e.g., $C_{7-11}$ aryloyl or $C_{5-19}$ aryloyl), optionally substituted arylcarbonylalkyl (e.g., $C_{4-18}$ arylcarbonyl-$C_{1-12}$ alkyl or $C_{4-18}$ arylcarbonyl-$C_{1-6}$ alkyl), optionally substituted arylsulfonyl (e.g., $C_{4-18}$ arylsulfoyl), or optionally substituted arylsulfonylalkyl (e.g., $C_{4-18}$ arylsulfonyl-$C_{1-12}$ alkyl or $C_{4-18}$ arylsulfonyl-$C_{1-6}$ alkyl). In other embodiments, $R^H$ is -$L^H$-$Ar^H$ or $R^H$ is -$L^H$-$Ak^H$ (e.g., $Ar^H$ is an optionally substituted aryl (e.g., substituted with one or more substituents selected from the group of halo, cyano, optionally substituted haloalkyl, optionally substituted perfluoroalkyl, optionally substituted nitroalkyl, and optionally substituted alkyl); $Ak^H$ is an optionally substituted alkyl or optionally substituted heteroalkyl (e.g., substituted with one or more substituents selected from the group of halo, cyano, optionally substituted haloalkyl, optionally substituted perfluoroalkyl, optionally substituted nitroalkyl, and optionally substituted alkyl); and $L^H$ is a linker, such as any described herein for $L^A$).

In any embodiment herein, $R^H$ is $R^{AF}$, $R^A$, or $R^F$; and h can be a.

In any embodiment herein, $R^{H1}$ is $R^{A1}$ or $R^{F1}$.

In any embodiment herein, $R^H$ can be reacted with a reactant to provide an $R^{AF}$, $R^A$, or $R^F$ group.

In any embodiment herein, $R^{H1}$ can be reacted with a reactant to provide $R^{A1}$ or $R^{F1}$.

Definitions

As used herein, the term "about" means +/−10% of any recited value. As used herein, this term modifies any recited value, range of values, or endpoints of one or more ranges.

The term "acyl," or "alkanoyl," as used interchangeably herein, represent an alkyl group, as defined herein, or hydrogen attached to the parent molecular group through a carbonyl group, as defined herein. This group is exemplified by formyl, acetyl, propionyl, butanoyl, and the like. The alkanoyl group can be substituted or unsubstituted. For example, the alkanoyl group can be substituted with one or more substitution groups, as described herein for alkyl. In some embodiments, the unsubstituted acyl group is a $C_{2-7}$ acyl or alkanoyl group.

By "alkaryl" is meant an aryl group, as defined herein, attached to the parent molecular group through an alkylene group, as defined herein. Similarly, by the term "alkheteroaryl" is meant a heteroaryl group, as defined herein, attached to the parent molecular group through an alkylene group. Other groups preceded by the prefix "alk-" are defined in the same manner. The alkaryl group can be substituted or unsubstituted. For example, the alkaryl group can be substituted with one or more substitution groups, as described herein for alkyl and/or aryl. Exemplary unsubstituted alkaryl groups are of from 7 to 16 carbons ($C_{7-16}$ alkaryl), as well as those having an alkylene group with 1 to 6 carbons and an aryl group with 4 to 18 carbons (i.e., $C_{1-6}$ alk-$C_{4-18}$ aryl).

By "alkcycloalkyl" is meant a cycloalkyl group, as defined herein, attached to the parent molecular group through an alkylene group, as defined herein. The alkcycloalkyl group can be substituted or unsubstituted. For example, the alkcycloalkyl group can be substituted with one or more substitution groups, as described herein for alkyl.

By "alkenyl" is meant an optionally substituted $C_{2-24}$ alkyl group having one or more double bonds. The alkenyl group can be cyclic (e.g., $C_{3-24}$ cycloalkenyl) or acyclic. The alkenyl group can also be substituted or unsubstituted. For example, the alkenyl group can be substituted with one or more substitution groups, as described herein for alkyl.

By "alkheterocyclyl" represents a heterocyclyl group, as defined herein, attached to the parent molecular group through an alkylene group, as defined herein. Exemplary unsubstituted alkheterocyclyl groups are of from 2 to 14 carbons.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkoxyalkyl" is meant an alkyl group, as defined herein, which is substituted with an alkoxy group, as defined herein. Exemplary unsubstituted alkoxyalkyl groups include between 2 to 12 carbons ($C_{2-12}$ alkoxyalkyl), as well as those having an alkyl group with 1 to 6 carbons and an alkoxy group with 1 to 6 carbons (i.e., $C_{1-6}$ alkoxy-$C_{1-6}$ alkyl).

By "alkoxycarbonyl" is meant an alkoxy group, as defined herein, that is attached to the parent molecular group through a carbonyl group. In some embodiments, an unsubstituted alkoxycarbonyl group is a $C_{2-7}$ alkoxycarbonyl group.

By "alkyl" and the prefix "alk" is meant a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy; (2) $C_{1-6}$ alkylsulfinyl; (3) $C_{1-6}$ alkylsulfonyl; (4) amino; (5) aryl; (6) arylalkoxy; (7) aryloyl; (8) azido; (9) cyano; (10) carboxyaldehyde; (11) $C_{3-8}$ cycloalkyl; (12) halo; (13) heterocyclyl; (14) heterocyclyloxy; (15) heterocyclyloyl; (16) hydroxyl; (17) N-protected amino; (18) nitro; (19) oxo; (20) $C_{3-8}$ spirocyclyl; (21) $C_{1-6}$ thioalkoxy; (22) thiol; (23) —$CO_2R^A$, where $R^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (24) —$C(O)NR^BR^C$, where each of $R^B$ and $R^C$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (25) —$SO_2R^D$, where $R^D$ is selected from the group consisting of (a) $C_{1-6}$ alkyl, (b) $C_{4-18}$ aryl, and (c) $C_{1-6}$ alk-$C_{4-18}$ aryl; (26) —$SO_2NR^ER^F$, where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; and (27) —$NR^GR^H$, where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkenyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a $C_{1-3}$, $C_{1-6}$, $C_{1-12}$, $C_{1-16}$, $C_{1-18}$, $C_{1-20}$, or $C_{1-24}$ alkyl group.

By "alkylene" is meant a bivalent form of an alkyl group, as described herein. Exemplary alkylene groups include methylene, ethylene, propylene, butylene, etc. In some embodiments, the alkylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkylene group. The alkylene group can be branched or unbranched. The alkylene group can also be substituted or unsubstituted. For example, the alkylene group can be substituted with one or more substitution groups, as described herein for alkyl.

By "alkyleneoxy" is meant an alkylene group, as defined herein, attached to the parent molecular group through an oxygen atom.

By "alkylsulfate" is meant an alkyl group, as defined herein, attached to the parent molecular group through an —O—($SO_2$)— group. An exemplary alkylsulfate group is —O—$SO_2$-Ak, where each Ak is, independently, optionally substituted alkyl.

By "alkylsulfinyl" is meant an alkyl group, as defined herein, attached to the parent molecular group through an group. In some embodiments, the unsubstituted alkylsulfinyl group is a $C_{1-6}$ or $C_{1-12}$ alkylsulfinyl group.

By "alkylsulfinylalkyl" is meant an alkyl group, as defined herein, substituted by an alkylsulfinyl group. In some embodiments, the unsubstituted alkylsulfinylalkyl group is a $C_{2-12}$ or $C_{2-24}$ alkylsulfinylalkyl group (e.g., $C_{1-6}$ alkylsulfinyl-$C_{1-6}$ alkyl or $C_{1-12}$ alkylsulfinyl-$C_{1-12}$ alkyl).

By "alkylsulfonyl" is meant an alkyl group, as defined herein, attached to the parent molecular group through an group. In some embodiments, the unsubstituted alkylsulfonyl group is a $C_{1-6}$ or $C_{1-12}$ alkylsulfonyl group. In other embodiments, the alkylsulfonyl group is —$SO_2$—$R^{S1}$, where $R^{S1}$ is an optionally substituted $C_{1-12}$ alkyl (e.g., as described herein, including optionally substituted $C_{1-12}$ haloalkyl or perfluoroalkyl).

By "alkylsulfonylalkyl" is meant an alkyl group, as defined herein, substituted by an alkylsulfonyl group. In some embodiments, the unsubstituted alkylsulfonylalkyl group is a $C_{2-12}$ or $C_{2-24}$ alkylsulfonylalkyl group (e.g., $C_{1-6}$ alkylsulfonyl-$C_{1-6}$ alkyl or $C_{1-12}$ alkylsulfonyl-$C_{1-12}$ alkyl). An exemplary alkylsulfonylalkyl group is —C—($SO_2$-Ak)$_3$, where each Ak is, independently, optionally substituted alkyl.

By "alkylsulfonylamide" is meant an amino group, as defined herein, substituted by an alkylsulfonyl group. In some embodiments, the unsubstituted alkylsulfonylamide group is —$NR^{N1}R^{N2}$, in which each of $R^{N1}$ and $R^{N2}$ is, independently, H, $C_{1-12}$ alkyl, or $C_{1-24}$ alkylsulfonyl group (e.g., $C_{1-6}$ alkylsulfonyl or $C_{1-12}$ alkylsulfonyl), where at least one of $R^{N1}$ and $R^{N2}$ includes a sulfonyl group. An exemplary alkylsulfonylamide group is —N—($SO_2$-Ak)$_2$ or —N(Ak)($SO_2$-Ak), where each Ak is, independently, optionally substituted alkyl.

By "alkynyl" is meant an optionally substituted $C_{2-24}$ alkyl group having one or more triple bonds. The alkynyl group can be cyclic or acyclic and is exemplified by ethynyl, 1-propynyl, and the like. The alkynyl group can also be substituted or unsubstituted. For example, the alkynyl group can be substituted with one or more substitution groups, as described herein for alkyl.

By "amidino" is meant —$C(NR^{N3})NR^{N1}R^{N2}$, where each of $R^{N1}$, $R^{N2}$, and $R^{N3}$ is, independently, H or optionally substituted alkyl, or $R^{N1}$ and $R^{N2}$, taken together with the nitrogen atom to which each are attached, form a heterocyclyl group, as defined herein.

By "amino" is meant —$C(O)NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group, as defined herein.

By "amino" is meant —$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group, as defined herein.

By "aminoalkyl" is meant an alkyl group, as defined herein, substituted by an amino group, as defined herein.

By "ammonium" is meant a group including a protonated nitrogen atom $N^+$. Exemplary ammonium groups include —$N^+R^{N1}R^{N2}R^{N3}$ where each of $R^{N1}$, $R^{N2}$, and $R^{N3}$ is, independently, H, optionally substituted alkyl, optionally substituted aryl, or optionally substituted alkaryl; or $R^{N1}$ and $R^{N2}$, taken together with the nitrogen atom to which each are attached, form a heterocycle; or $R^{N1}$ and $R^{N2}$, taken together, form an optionally substituted alkylene or heteroalkylene (e.g., as described herein).

By "anion" is meant a monoatomic or polyatomic species having one or more elementary charges of the electron. Exemplary, non-limiting anions include a halide (e.g., $F^-$, $Cl^-$, $Br^-$, or $I^-$), a hydroxide (e.g., $OH^-$), a borate (e.g., tetrafluoroborate ($BF_4^-$), a carbonate (e.g., $CO_3^{2-}$ or $HCO_3^-$), or a sulfate (e.g., $SO_4^{2-}$).

By "aryl" is meant a group that contains any carbon-based aromatic group including, but not limited to, benzyl, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one, two, three, four, or five substituents independently selected from the group consisting of: (1) $C_{1-6}$ alkanoyl; (2) $C_{1-6}$ alkyl; (3) $C_{1-6}$ alkoxy; (4) $C_{1-6}$ alkoxy-$C_{1-6}$ alkyl; (5) $C_{1-6}$ alkylsulfinyl; (6) $C_{1-6}$ alkylsulfinyl-$C_{1-6}$ alkyl; (7) $C_{1-6}$ alkylsulfonyl; (8) $C_{1-6}$ alkylsulfonyl-$C_{1-6}$ alkyl; (9) aryl; (10) amino; (11) $C_{1-6}$ aminoalkyl; (12) heteroaryl; (13) $C_{1-6}$ alk-$C_{4-18}$ aryl; (14) aryloyl; azido; (16) cyano; (17) $C_{1-6}$ azidoalkyl; (18) carboxyaldehyde; (19) carboxyaldehyde-$C_{1-6}$ alkyl; (20) $C_{3-8}$ cycloalkyl; (21) $C_{1-6}$ alk-$C_{3-8}$ cycloalkyl; (22) halo; (23) $C_{1-6}$ haloalkyl; (24) heterocyclyl; (25) heterocyclyloxy; (26) heterocyclyloyl; (27) hydroxyl; (28) $C_{1-6}$ hydroxyalkyl; (29) nitro; (30) $C_{1-6}$ nitroalkyl; (31) N-protected amino; (32) N-protected amino-$C_{1-6}$ alkyl; (33) oxo; (34) $C_{1-6}$ thioalkoxy; (35) thio-$C_{1-6}$ alkoxy-$C_{1-6}$ alkyl; (36) —$(CH_2)_rCO_2R^A$, where r is an integer of from zero to four, and $R^A$ is selected from the group consisting of (a) hydrogen, (b) $C_{1-6}$ alkyl, (c) $C_{4-18}$ aryl, and (d) aryl; (37) —$(CH_2)_rCONR^BR^C$, where r is an integer of from zero to four and where each $R^B$ and $R^C$ is independently selected from the group consisting of (a) hydrogen, (b) $C_{1-6}$ alkyl, (c) $C_{4-18}$ aryl, and (d) $C_{1-6}$ alk-$C_{4-18}$ aryl; (38) —$(CH_2)_rSO_2R^D$, where r is an integer of from zero to four and where $R^D$ is selected from the group consisting of (a) $C_{1-6}$ alkyl, (b) $C_{4-18}$ aryl, and (c) $C_{1-6}$ alk-$C_{4-18}$ aryl; (39) —$(CH_2)_rSO_2NR^ER^F$, where r is an integer of from zero to four and where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (40) —$(CH_2)_rNR^GR^H$, where r is an integer of from zero to four and where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group; (41) thiol; (42) perfluoroalkyl; (43) perfluoroalkoxy; (44) aryloxy; (45) cycloalkoxy; (46) cycloalkylalkoxy; and (47) arylalkoxy. In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

By "arylcarbonylalkyl" is meant an alkyl group, as defined herein, substituted by an aryloyl group, as defined herein. In some embodiments, the arylcarbonylalkyl group is Ar—C(O)-Ak-, in which Ar is an optionally substituted aryl group and Ak is an optionally substituted alkyl or optionally substituted alkylene group. In particular embodiments, an unsubstituted arylcarbonylalkyl group is a $C_{4-20}$ aryl-C(O)—$C_{1-12}$ alkyl group or a $C_{4-12}$ aryl-C(O)—$C_{1-6}$ alkyl group or a $C_{4-18}$ aryl-C(O)—$C_{1-6}$ alkyl group.

By "arylene" is meant a bivalent form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a $C_{4-18}$, $C_{4-14}$, $C_{4-12}$, $C_{4-10}$, $C_{6-18}$, $C_{6-14}$, $C_{6-12}$, or $C_{6-10}$ arylene group. The arylene group can be branched or unbranched. The arylene group can also be substituted or unsubstituted. For example, the arylene group can be substituted with one or more substitution groups, as described herein for aryl.

By "aryleneoxy" is meant an arylene group, as defined herein, attached to the parent molecular group through an oxygen atom.

By "arylalkoxy" is meant an alkaryl group, as defined herein, attached to the parent molecular group through an oxygen atom.

By "aryloxy" is meant —OR, where R is an optionally substituted aryl group, as described herein. In some embodiments, an unsubstituted aryloxy group is a $C_{4-18}$ or $C_{6-18}$ aryloxy group.

By "aryloxycarbonyl" is meant an aryloxy group, as defined herein, that is attached to the parent molecular group through a carbonyl group. In some embodiments, an unsubstituted aryloxycarbonyl group is a $C_{5-19}$ aryloxycarbonyl group.

By "aryloyl" is meant an aryl group that is attached to the parent molecular group through a carbonyl group. In some embodiments, an unsubstituted aryloyl group is a $C_{7-11}$ aryloyl or $C_{5-19}$ aryloyl group.

By "arylsulfonyl" is meant an aryl group, as defined herein, attached to the parent molecular group through an —$SO_2$— group.

By "arylsulfonylalkyl" is meant an alkyl group, as defined herein, substituted by an arylsulfonyl group. In some embodiments, the arylcarbonylalkyl group is Ar—$SO_2$-Ak-, in which Ar is an optionally substituted aryl group and Ak is an optionally substituted alkyl or optionally substituted alkylene group. In particular embodiments, the unsubstituted arylsulfonylalkyl group is a $C_{4-20}$ aryl-$SO_2$—$C_{1-12}$ alkyl group or a $C_{4-12}$ aryl-$SO_2$—$C_{1-6}$ alkyl group or a $C_{4-18}$ aryl-$SO_2$—$C_{1-6}$ alkyl group.

By "azido" is meant an —$N_3$ group.

By "azo" is meant an —N═N— group.

By "azidoalkyl" is meant an azido group attached to the parent molecular group through an alkyl group, as defined herein.

By "carbonyl" is meant a —C(O)— group, which can also be represented as >C═O.

By "carboxyaldehyde" is meant a —C(O)H group.

By "carboxyaldehydealkyl" is meant a carboxyaldehyde group, as defined herein, attached to the parent molecular group through an alkylene group, as defined herein.

By "carboxyl" is meant a —$CO_2H$ group.

By "cyano" is meant a —CN group.

By "cycloalkyl" is meant a monovalent saturated or unsaturated non-aromatic cyclic hydrocarbon group of from three to eight carbons, unless otherwise specified, and is exemplified by cyclopropyl, cyclobutyl, cyclopentyl, cyclohexyl, cycloheptyl, bicyclo[2.2.1.]heptyl and the like. The cycloalkyl group can also be substituted or unsubstituted. For example, the cycloalkyl group can be substituted with one or more groups including those described herein for alkyl.

By "cycloalkoxy" is meant a cycloalkyl group, as defined herein, attached to the parent molecular group through an oxygen atom.

By "diazonium" is meant a group including —$N_2^+$.

By "dithiocarboxyamino" is meant —$NR^{N1}C(S)SR^{S1}$, where each of $R^{N1}$ and $R^{S1}$ is, independently, H or optionally substituted alkyl, or $R^{N1}$ and $R^{S1}$, taken together with the nitrogen atom to which each are attached, form a heterocyclyl group, as defined herein.

By "halo" is meant F, Cl, Br, or I.

By "haloalkyl" is meant an alkyl group, as defined herein, substituted with one or more halo.

By "halonium" is meant a group including —$X^+$, where X is halo as defined herein. Exemplary halonium groups include an iodonium group (e.g., —$I^+$), a bromonium group (e.g., —$Br^+$), a chloronium group (e.g., —$Cl^+$), or a fluoronium group (e.g., —$F^+$).

By "heteroalkyl" is meant an alkyl group, as defined herein, containing one, two, three, or four non-carbon heteroatoms (e.g., independently selected from the group consisting of nitrogen, oxygen, phosphorous, sulfur, or halo).

By "heteroalkylene" is meant a divalent form of an alkylene group, as defined herein, containing one, two, three, or four non-carbon heteroatoms (e.g., independently selected from the group consisting of nitrogen, oxygen, phosphorous, sulfur, or halo).

By "heteroalkyleneoxy" is meant a heteroalkylene group, as defined herein, attached to the parent molecular group through an oxygen atom.

By "heteroaryl" is meant a subset of heterocyclyl groups, as defined herein, which are aromatic, i.e., they contain 4n+2 pi electrons within the mono- or multicyclic ring system.

By "heterocyclyl" is meant a 5-, 6- or 7-membered ring, unless otherwise specified, containing one, two, three, or four non-carbon heteroatoms (e.g., independently selected from the group consisting of nitrogen, oxygen, phosphorous, sulfur, or halo). The 5-membered ling has zero to two double bonds and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include thiiranyl, thietanyl, tetrahydrothienyl, thianyl, thiepanyl, aziridinyl, azetidinyl, pyrrolidinyl, piperidinyl, azepanyl, pyrrolyl, pyrrolinyl, pyrazolyl, pyrazolinyl, pyrazolidinyl, imidazolyl, imidazolinyl, imidazolidinyl, pyridyl, homopiperidinyl, pyrazinyl, piperazinyl, pyrimidinyl, pyridazinyl, oxazolyl, oxazolidinyl, isoxazolyl, isoxazolidinyl, morpholinyl, thiomorpholinyl, thiazolyl, thiazolidinyl, isothiazolyl, isothiazolidinyl, indolyl, quinolinyl, isoquinolinyl, benzimidazolyl, benzothiazolyl, benzoxazolyl, furyl, thienyl, thiazolidinyl, isothiazolyl, isoindazolyl, triazolyl, tetrazolyl, oxadiazolyl, uricyl, thiadiazolyl, pyrimidyl, tetrahydrofuranyl, dihydrofuranyl, tetrahydrothienyl, dihydrothienyl, dihydroindolyl, tetrahydroquinolyl, tetrahydroisoquinolyl, pyranyl, dihydropyranyl, dithiazolyl, benzofuranyl, benzothienyl, and the like.

By "heterocyclyloxy" is meant a heterocyclyl group, as defined herein, attached to the parent molecular group through an oxygen atom.

By "heterocyclyloyl" is meant a heterocyclyl group, as defined herein, attached to the parent molecular group through a carbonyl group.

By "hydroxyl" is meant —OH.

By "hydroxyalkyl" is meant an alkyl group, as defined herein, substituted by one to three hydroxyl groups, with the proviso that no more than one hydroxyl group may be attached to a single carbon atom of the alkyl group and is exemplified by hydroxymethyl, dihydroxypropyl, and the like.

By "imine" is meant —$CR^{L1}$═N—, where $R^{L1}$ is H or optionally substituted alkyl.

By "imino" is meant —NH—.

By "nitrilo" is meant —N<. Exemplary nitrilo groups include —$NR^{L3}$—, where $R^{L3}$ is H, optionally substituted alkyl, optionally substituted haloalkyl, optionally substituted alkoxy, optionally substituted alkaryl, optionally substituted aryl, or halo.

By "nitro" is meant an —$NO_2$ group.

By "nitroalkyl" is meant an alkyl group, as defined herein, substituted by one to three nitro groups.

By "nitroso" is meant an —NO group.

By "oxo" is meant an ═O group.

By "oxonium" is meant a group including a protonated oxygen atom $O^+$. Exemplary oxonium groups include —$O^+R^{O1}R^{O2}$, where each of $R^{O1}$ and $R^{O2}$ is, independently, H, optionally substituted alkyl, optionally substituted alkenyl, optionally substituted aryl, or optionally substituted alkaryl; or wherein $R^{O1}$ and $R^{O2}$, taken together, form an optionally substituted alkylene or heteroalkylene (e.g., as described herein).

By "oxy" is meant —O—.

By "perfluoroalkyl" is meant an alkyl group, as defined herein, having each hydrogen atom substituted with a fluorine atom. Exemplary perfluoroalkyl groups include trifluoromethyl, pentafluoroethyl, etc.

By "perfluoroalkylene" is meant an alkylene group, as defined herein, having each hydrogen atom substituted with a fluorine atom. Exemplary perfluoroalkylene groups include difluoromethylene, tetrafluoroethylene, etc.

By "perfluoroalkyleneoxy" is meant a perfluoroalkylene group, as defined herein, having an oxy group attached to either end of the perfluoroalkylene group. Exemplary perfluoroalkylene groups include, e.g., —$OC_fF_{2f}$— or —$C_fF_{2f}O$—, where f is an integer from about 1 to 5, and 2f is an integer that is 2 times f (e.g., difluoromethyleneoxy, tetrafluoroethyleneoxy, etc.).

By "perfluoroalkoxy" is meant an alkoxy group, as defined herein, having each hydrogen atom substituted with a fluorine atom.

By "phosphine" is meant a —$PR^{L3}$— group, where $R^{L3}$ is H or optionally substituted alkyl.

By "phosphonium" is meant a group including a protonated phosphorous atom $P^+$. Exemplary phosphonium groups include —$P^+R^{P1}R^{P2}R^{R3}$, where each of $R^{P1}$, $R^{P2}$, and $R^{P3}$ is, independently, H, optionally substituted alkyl, optionally substituted alkenyl, optionally substituted aryl, or optionally substituted alkaryl; or wherein two of $R^{P1}$, $R^{P2}$, and $R^{P3}$, taken together, form an optionally substituted alkylene or heteroalkylene (e.g., as described herein).

By "phosphono" is meant a —$P(O)(OH)_2$ group.

By "phosphonoyl" is meant a —P(O)H— group.

By "phosphoric ester" is meant a —O—$PO(OH)_2$ group.

By "phosphoryl" is meant a —P(O)<group.

By "protecting group" is meant any group intended to protect a reactive group against undesirable synthetic reactions. Commonly used protecting groups are disclosed in "Greene's Protective Groups in Organic Synthesis," John Wiley & Sons, New York, 2007 (4th ed., eds. P. G. M. Wuts and T. W. Greene), which is incorporated herein by reference. O-protecting groups include an optionally substituted alkyl group (e.g., forming an ether with reactive group O), such as methyl, methoxymethyl, methylthiomethyl, benzoyloxymethyl, t-butoxymethyl, etc.; an optionally substituted alkanoyl group (e.g., forming an ester with the reactive group O), such as formyl, acetyl, chloroacetyl, fluoroacetyl (e.g., perfluoroacetyl), methoxyacetyl, pivaloyl, t-butylacetyl, phenoxyacetyl, etc.; an optionally substituted aryloyl group (e.g., forming an ester with the reactive group O), such as —C(O)—Ar, including benzoyl; an optionally substituted alkylsulfonyl group (e.g., forming an alkylsulfonate with reactive group O), such as $—SO_2—R^{S1}$, where $R^{S1}$ is optionally substituted $C_{1-12}$ alkyl, such as mesyl or benzylsulfonyl, an optionally substituted arylsulfonyl group (e.g., forming an arylsulfonate with reactive group O), such as $—SO_2—R^{S4}$, where $R^{S4}$ is optionally substituted $C_{4-18}$ aryl, such as tosyl or phenylsulfonyl; an optionally substituted alkoxycarbonyl or aryl oxycarbonyl group (e.g., forming a carbonate with reactive group O), such as $—C(O)—OR^{T1}$, where $R^{T1}$ is optionally substituted $C_{1-12}$ alkyl or optionally substituted $C_{4-18}$ aryl, such as methoxycarbonyl, methoxymethylcarbonyl, t-butyloxycarbonyl (Boc), or benzyloxycarbonyl (Cbz); or an optionally substituted silyl group (e.g., forming a silyl ether with reactive group O), such as $—Si—(R^{T2})_3$, where each $R^{T2}$ is, independently, optionally substituted $C_{1-12}$ alkyl or optionally substituted $C_{4-18}$ aryl, such as trimethylsilyl, t-butyldimethylsilyl, or t-butyldiphenylsilyl. N-protecting groups include, e.g., formyl, acetyl, benzoyl, pivaloyl, t-butylacetyl, alanyl, phenylsulfonyl, benzyl, Boc, and Cbz. Such protecting groups can employ any useful agent to cleave the protecting group, thereby restoring the reactivity of the unprotected reactive group.

By "salt" is meant an ionic form of a compound or structure (e.g., any formulas, compounds, or compositions described herein), which includes a cation or anion compound to form an electrically neutral compound or structure. Salts are well known in the art. For example, non-toxic salts are described in Berge S M et al., "Pharmaceutical salts," *J. Pharm. Sci.* 1977 January; 66(1):1-19; and in "Handbook of Pharmaceutical Salts: Properties, Selection, and Use," Wiley-VCH, April 2011 (2nd rev. ed., eds. P. H. Stahl and C. G. Wermuth. The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, gluconate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methyl sulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine. Yet other salts include ammonium, sulfonium, sulfoxonium, phosphonium, iminium, imidazolium, benzimidazolium, amidinium, guanidinium, phosphazinium, phosphazenium, pyridinium, etc., as well as other cationic groups described herein (e.g., optionally substituted isoxazolium, optionally substituted oxazolium, optionally substituted thiazolium, optionally substituted pyrrolium, optionally substituted (uranium, optionally substituted thiophenium, optionally substituted imidazolium, optionally substituted pyrazolium, optionally substituted isothiazolium, optionally substituted triazolium, optionally substituted tetrazolium, optionally substituted furazanium, optionally substituted pyridinium, optionally substituted pyrimidinium, optionally substituted pyrazinium, optionally substituted triazinium, optionally substituted tetrazinium, optionally substituted pyridazinium, optionally substituted oxazinium, optionally substituted pyrrolidinium, optionally substituted pyrazolidinium, optionally substituted imidazolinium, optionally substituted isoxazolidinium, optionally substituted oxazolidinium, optionally substituted piperazinium, optionally substituted piperidinium, optionally substituted morpholinium, optionally substituted azepanium, optionally substituted azepinium, optionally substituted indolium, optionally substituted isoindolium, optionally substituted indolizinium, optionally substituted indazolium, optionally substituted benzimidazolium, optionally substituted isoquinolinium, optionally substituted quinolizinium, optionally substituted dehydroquinolizinium, optionally substituted quinolinium, optionally substituted isoindolinium, optionally substituted benzimidazolinium, and optionally substituted purinium).

By "spirocyclyl" is meant an alkylene diradical, both ends of which are bonded to the same carbon atom of the parent group to form a spirocyclyl group and also a heteroalkylene diradical both ends of which are bonded to the same atom.

By "sulfinyl" is meant an —S(O)— group.

By "sulfo" is meant an $—S(O)_2OH$ group.

By "sulfone" is meant $R'—S(O)_2—R''$, where R' and R'' is an organic moiety. Exemplary groups for R' and R'' include, independently, optionally substituted alkyl, alkenyl, alkynyl, alkaryl, alkheterocyclyl, alkcycloalkyl, alkanoyl, alkoxy, alkoxyalkyl, alkoxycarbonyl, alkylsulfinyl, alkylsulfonyl, alkylsulfinylalkyl, alkylsulfonylalkyl, aminoalkyl, aryl, arylalkoxy, aryloxy, aryloxycarbonyl, aryloyl, arylsulfonyl, arylsulfonylalkyl, azidoalkyl, carboxyaldehyde, carboxyaldehydealkyl, carboxyl, cyano, cycloalkyl, cycloalkoxy, haloalkyl, heteroaryl, heterocyclyl, heterocyclyloxy, heterocyclyloyl, hydroxyalkyl, nitroalkyl, perfluoroalkyl, perfluoroalkoxy, spirocyclyl, thioalkaryl, thioalkheterocyclyl, or thioalkoxy, as defined herein. The sulfone can be unsubstituted or substituted. For example, the sulfone can be substituted with one or more substitution groups, as described herein for alkyl and/or aryl.

By "sulfonyl" is meant an $—S(O)_2—$ group.

By "sulfonamide" is meant an $—S(O)_2—NR^{L3}—$ or an $—NR^{L3}—S(O)_2—$ group, in which $R^{L3}$ is any useful moiety. Exemplary $R^{L3}$ groups include H, optionally substituted alkyl, optionally substituted haloalkyl, optionally substituted alkoxy, optionally substituted alkaryl, optionally substituted aryl, or halo.

By "sulfonium" is meant a group including a protonated sulfur atom $S^+$. Exemplary sulfonium groups include —$S^{+}R^{S1}R^{S2}$, where each of $R^{S1}$ and $R^{S2}$ is, independently, H, optionally substituted alkyl, optionally substituted aryl, optionally substituted alkaryl, or optionally substituted alkenyl; or $R^{S1}$ and $R^{S2}$ taken together with the sulfur atom to which each are attached, form a heterocycle; or $R^{S1}$ and $R^{S2}$, taken together, form an optionally substituted alkylene or heteroalkylene (e.g., as described herein).

By "thioalkaryl" is meant a thioalkoxy group, as defined herein, substituted with an aryl group, as defined herein.

By "thioalkheterocyclyl" is meant a thioalkoxy group, as defined herein, substituted with a heterocyclyl group, as defined herein.

By "thioalkoxy" is meant an alkyl group, as defined herein, attached to the parent molecular group through a sulfur atom. Exemplary unsubstituted thioalkoxy groups include $C_{1-6}$ thioalkoxy.

By "thioamido" is meant —C(S)$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group, as defined herein.

By "thio" is meant an —S— group

By "thiol" is meant an —SH group.

By "triflate" is meant an —$OSO_2$—$CF_3$ or —OTf group.

By "triflimide" is meant an —$N(SO_2—CF_3)_2$ or —$NTf_2$ group.

By "trifyl" or "Tf" is meant an —$SO_2$—$CF_3$ group.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, π bond interactions, hydrophobic interactions, inclusion complexes, clathration, van der Waals interactions, and combinations thereof.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

BRIEF DESCRIPTION OF THE DRAWINGS

In FIG. 7A, provided are data for (i) control ($Br^{-}$ ions); (ii) treatment with 0.5M NaOH for 1 hour at 80° C. ($OH^{-}$ ions); (iii) treatment with NaOH, then 0.5M HBr for 1 hour at 25° C. ($Br^{-}$ ions); and (iv) treatment with NaOH, then HBr, and then NaOH ($OH^{-}$ ions). In FIG. 7B, provided are data for (i) control; (ii) treatment with 0.01M NaOH for 1 hour at room temperature; (iii) treatment with 0.5M NaOH for 30 minutes at room temperature; and (iv) treatment with 0.5M NaOH for 30 minutes at 80° C.

DETAILED DESCRIPTION OF THE INVENTION

The present invention relates to polymer structures having various functional groups including a cationic moiety or a halo group (e.g., a $R^{AF}$ group). In particular embodiments, $R^A$ is a functional group including the cationic moiety, and $R^F$ is a functional group including the halo group. The $R^{AF}$ groups can be provided on any useful site of the underlying polymer (e.g., pendent groups and/or backbone groups of the polymer). In some embodiments, the polymer includes both $R^A$ groups and $R^F$ groups (e.g., $R^A$ and $R^F$ on pendent groups and/or backbone groups of the polymer). Described herein are structures for such polymers having cationic moieties or halo groups, as well as methods for making and functionalizing such polymers.

Polymers

The present invention encompasses polymers, including copolymers. Exemplary polymer include any described herein, such as non-limiting generic structure provided in formulas (I), (Ia), (Ic), (Id), (Ie), (If), (Ig), (Ih), (Ii), (Ij), (VI), (VIa), (VIb), (VIc), (VId), (VII), (VIII), (VIIIa), and (IX), as well as particular structures provided as structures (I-1), (I-2), (I-3), (I-4), (I-5), (I-6), (I-7), (I-8), (IV-3), (IV-5), (IV-8), (IV-10), and (IV-11) (see FIGS. 1, 2A-2C, 3A-3B, 4A-4B, 5A-5B, 9A-9C, 10, 12-15, 18A-18C, 21A-21C, and 22), including salts thereof and forms thereof including a counter ion.

Of these, formulas (VI), (VIa), (VIb), (VIc), (VId), (VIII), and (VIIIa) are considered to be reagents having one or more reactive end groups. Formula (VII) is considered to be a copolymer. In particular embodiments, the copolymer of the invention includes a first segment, a second segment, and at least one linking segment connecting at least one first segment with at least one second segment. The second segment can be a hydrophilic segment or a hydrophobic segment. The first segment can include at least one $R^{AF}$.

Figure 1:
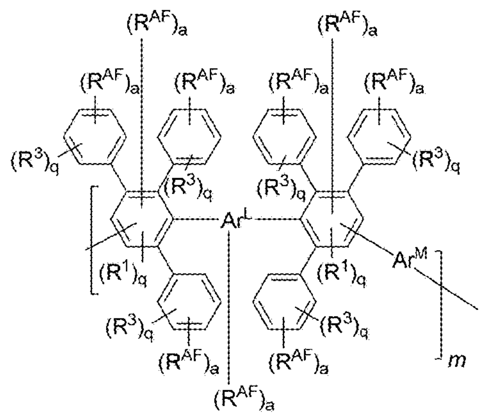
FIG. 1 shows a schematic of an exemplary polymer structure having one or more functional groups including a cationic moiety and/or a halo group ($R^{AF}$).

In one embodiment, a polymer includes the structure of formula (I), including salts thereof and forms thereof including a counter ion. As can be seen in FIG. 1, formula (I) is a generic structure encompassing other structures (e.g., formula (Ia)). The polymer can include any useful number of $R^{AF}$ disposed on pendent aryl groups (e.g., aryl groups in formula (I) having an optional $R^3$ group) and/or backbone aryl groups (e.g., aryl groups in formula (I) having an optional $R^1$ group or $Ar^L$). The polymer can include any useful type of $R^{AF}$ groups (e.g., $R^A$ including a cationic moiety or $R^F$ including a halo group), as well as any useful number of such groups (e.g., a groups, where a can be 0, 1, 2, 3, 4, or 5, and/or where at least one a is not 0).

Figure 4A:
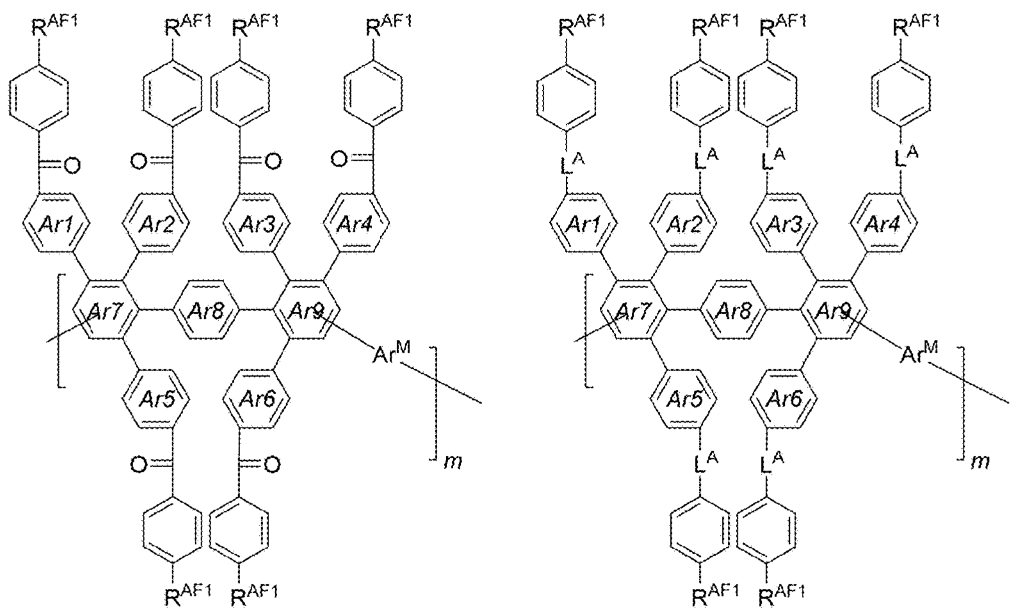
FIG. 4A-4B shows schematics of exemplary polymer structures having $R^{AF1}$ (i.e., a substituent that includes a cationic moiety or a halo group) and $L^{A}$ (i.e., a linker, such as any herein). Provided are structures (A) having formulas (I-1) to (I-2); and (B) having formulas (I-3) to (I-4).
Figure 4B:
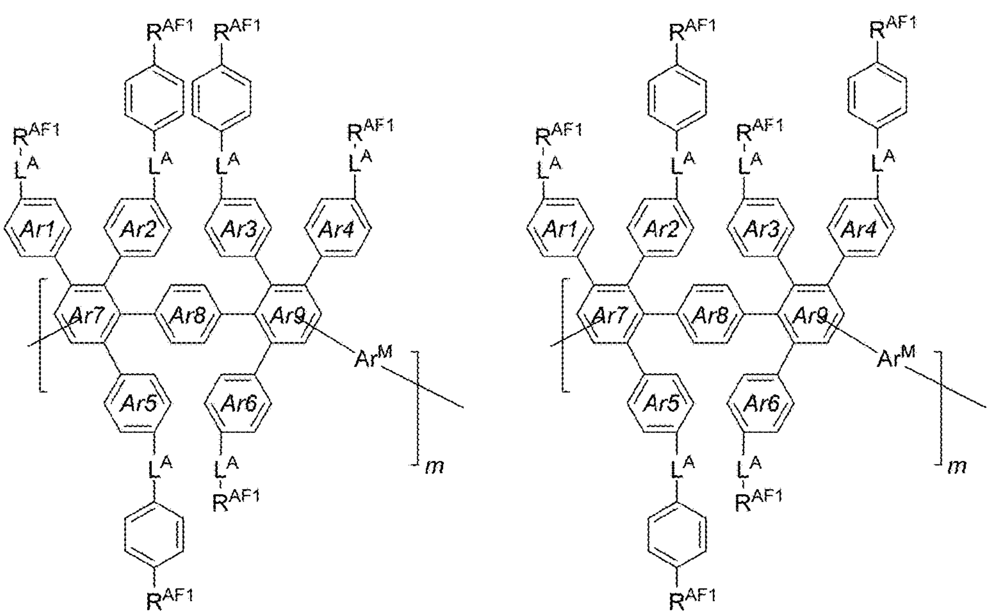

The polymer can include any useful type of pendent substituents (e.g., substituents $R^{AF}$, $R^{A}$, $R^{F}$, and/or $R^3$ on a pendent aryl group, such as those labeled with an $R_3$ in formula (I) of FIG. 1 or with Ar1-Ar6 in formula (I-3) or (I-4) of FIG. 4B), as well as any useful number of such substituents on each aryl group (e.g., a substituents for $R^{AF}$ and/or q substituents for $R^3$, where each of a and q is, independently, 0, 1, 2, 3, 4, or 5, and/or where at least one a is not 0). For any structure described herein, each $R^3$ is, independently, a functional group $R^{AF}$, a functional group including a cationic moiety $R^{A}$, a functional group including a halo $R^{F}$, a reactive handle $R^{H}$, an acidic moiety (e.g., $R^{S}$, $R^{P}$, $R^{C}$, or any described herein), an electron-withdrawing moiety (e.g., $R^{E}$ or any described herein), or an inert substituent (e.g., H, halo, optionally substituted alkyl, optionally substituted alkoxy, etc.). In some embodiments, each and every $R^3$ is, independently, $R^{AF}$, $R^{A}$, $R^{F}$, $R^{H}$, $R^{S}$, $R^{P}$, $R^{C}$, or $R^{E}$. In some embodiments, fully substituted pendent groups (e.g., $R^3$ is not H) can provide polymers with enhanced proton conduction, enhanced anion exchange capability, and durability characteristics.

The polymer can also include any useful backbone structure. For instance, in formula (I), the backbone includes three groups, i.e., two $R^1$-substituted aryl groups and a bridging group $Ar^{L}$ optionally including a functional group $R^{AF}$. The polymer can include any useful type of backbone substituents (e.g., backbone substituents $R^1$ or $R^{H}$ disposed on a backbone aryl group), as well as any useful number of such substituents on each group (e.g., a substituents for $R^{AF}$ and/or q substituents for $R^1$, where each of a and q is, independently, 0, 1, 2, 3, 4, or 5, and/or where at least one a is not 0). For any structure described herein, each $R^1$ is, independently, a functional group ($R^{AF}$, $R^{A}$, or $R^{F}$), an acidic moiety (e.g., $R^{S}$, $R^{P}$, $R^{C}$, or any described herein), an electron-withdrawing moiety (e.g., $R^{E}$ or any described herein), or an inert substituent (e.g., H, halo, optionally substituted alkyl, optionally substituted alkoxy, etc.). In some embodiments, each and every $R^1$ is, independently, $R^{AF}$, $R^{A}$, $R^{F}$, $R^{H}$, $R^{S}$, $R^{P}$, $R^{C}$, or $R^{E}$.

Each of bridging group $Ar^{L}$ and connecting group $Ar^{M}$ can be any useful bivalent linker. In particular embodiments, each of $Ar^{L}$ and $Ar^{M}$ is, independently, includes an optionally substituted arylene group. In some embodiments, each of $Ar^{L}$ and $Ar^{M}$ is, independently, an optionally substituted arylene group. In other embodiments, each of $Ar^{L}$ and $Ar^{M}$ is, independently, substituted with 1, 2, 3, or 4 $R^{AF}$ substituent(s), $R^{A}$ substituent(s), $R^{E}$ substituent(s), $R^{H}$ substituent (s), $R^{S}$ substituent(s), $R^{P}$ substituent(s), $R^{C}$ substituent(s), $R^{E}$ substituent(s), or label(s). Exemplary labels include a detectable label, such as an NMR label (e.g., fluorine, such as $^{19}F$; nitrogen, e.g., $^{15}N$; or oxygen, e.g., $^{17}O$), a spin label, an isotopic label, a mass label, a fluorescent label, a dye, etc.

In yet other embodiments, each of $Ar^{L}$ and $Ar^{M}$ is, independently, configured to reduce meta linkages. Thus, in some instances, each of $Ar^{L}$ and $Ar^{M}$ is, independently, a bivalent linker formed by removing a hydrogen atom from opposite faces of an aryl group. Examples of such linkers include 1,4-benzenediyl (or 1,4-phenylene), 2,7-phenanthrylene (or 2,7-phenanthrenediyl), 1,5-naphthylene (or 1,5-napthalenediyl), etc. For example, the polymer can include a structure of Formula (I) but having $Ar^{L}$ as a $R^1$-substituted 1,4-phenylene and $Ar^{M}$ as an $R^1$-substituted 1,4-phenylene, an $R^3$-substituted 1,4-phenylene, an $R^{AF}$-substituted 1,4-phenylene, an $R^{A}$-substituted 1,4-phenylene, or an $R^{F}$-substituted 1,4-phenylene.

A polymer can include any useful number of structures of formula (I). In some embodiments, the polymer includes in structures, where in is an integer of from about 1 to 1000 (e.g., from about 1 to 500).

Functional groups $R^{AF}$ can be present on the same polymer or on the same segment of the polymer with any other different type of substitutions, e.g., reactive handle substitutions (e.g., $R^{H}$), acidic substitutions (e.g., $R^{S}$, $R^{P}$, and/or $R^{C}$, as well as combinations thereof) and $R^{E}$ substitutions. In particular embodiments, $R^{A}$ groups can be employed to install functional groups to promote binding to an anion, and $R^{F}$ groups can be employed to provide hydrophobic characteristics. In other embodiments, the use of acidic moieties and electron-withdrawing moieties could provide orthogonal chemistries to control and optimize performance (e.g., by employing acidic moieties to control ion conduction) and durability (e.g., by employing electron-withdrawing moieties to reduce oxidation). Further, the presence of a reactive handle $R^{H}$ allows the polymer to be further functionalized (e.g., with one or more functional groups $R^{AF}$, $R^{A}$, $R^{F}$, $R^{S}$, $R^{P}$, $R^{C}$, and/or $R^{E}$, as well as any other groups described herein). In one instance, each pendent aryl group is substituted with an $R^{AF}$ (e.g., an $R^{A}$ and/or an $R^{F}$), an $R^{H}$, an $R^{S}$, an $R^{P}$, an $R^{C}$, and/or an $R^{E}$. Optionally, one or more backbone aryl groups can be further substituted with an $R^{AF}$ (e.g., an $R^{A}$ and/or an $R^{F}$), an $R^{H}$, an $R^{S}$, an $R^{P}$, an $R^{C}$, and/or an $R^{E}$.

Figure 2A:
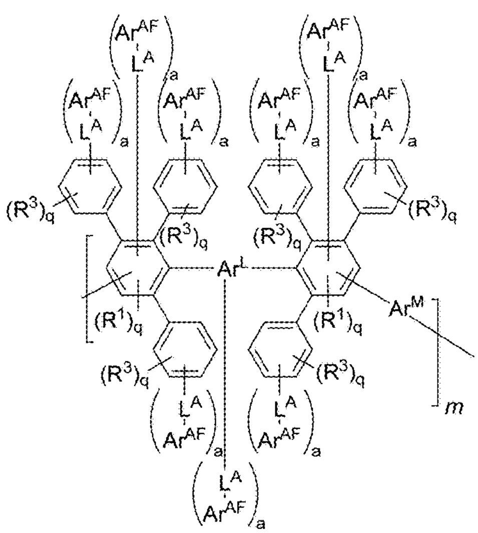
FIG. 2A-2C shows schematics of exemplary polymer structures having an aryl group including a cationic moiety and/or a halo group ($Ar^{AF}$) or an alkyl group including a cationic moiety and/or a halo group ($Ak^{AF}$). Provided are structures (A) having formulas (Ia) to (Ib); (B) having formulas (Ic) and (Id); and (C) having formulas (Ie) to (If).
Figure 2A:
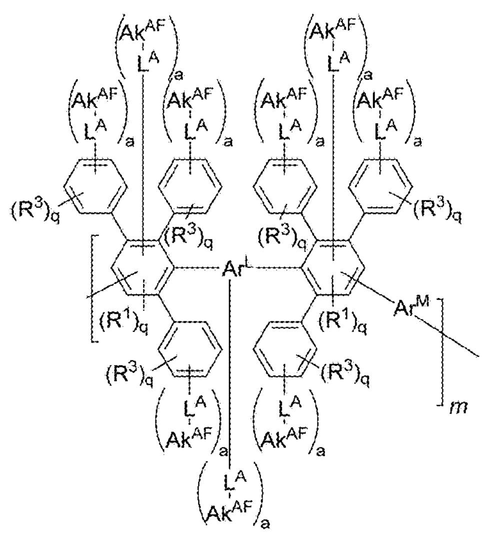

As seen in FIG. 2A, formulas (Ia) and (Ib) provide polymers having different representations of the $R^{AF}$ functional group. As can be seen, formula (Ia) includes a $R^{AF}$ moiety in which each moiety includes a linker $L^{A}$ and an optionally substituted aryl group $Ar^{AF}$ including a cationic moiety or a halo. As seen in formula (Ib), the $R^{AF}$ moiety includes a linker $L^{A}$ and an optionally substituted alkyl group $Ak^{AF}$ including a cationic moiety or a halo. Linker $L^{A}$ can include any useful linker moiety described herein, such as a covalent bond, carbonyl, oxy, thio, azo, phosphonoyl, phosphoryl, sulfonyl, sulfonyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy.

The aryl group $Ar^{AF}$ can be any useful aryl group (e.g., any herein, such as phenyl, benzyl, etc.) that is optionally substituted (e.g., any group herein described for an aryl group) and that also includes either a cationic moiety (e.g., any herein, such as an ammonium cation, a sulfonium cation, a phosphonium cation, an oxonium cation, a diazonium cation, or a halonium cation) and/or a halo (e.g., any herein, such as fluoro, chloro, bromo, or iodo). The alkyl group $Ak^{AF}$ can be any useful alkyl group (e.g., any herein, such as methyl, propyl, butyl, etc.) that is optionally substituted (e.g., any group herein described for an alkyl group) and that also includes either a cationic moiety (e.g., any herein, such as an ammonium cation, a sulfonium cation, a phosphonium cation, an oxonium cation, a diazonium cation, or a halonium cation) and/or a halo (e.g., any herein, such as fluoro, chloro, bromo, or iodo).

Figure 2B:
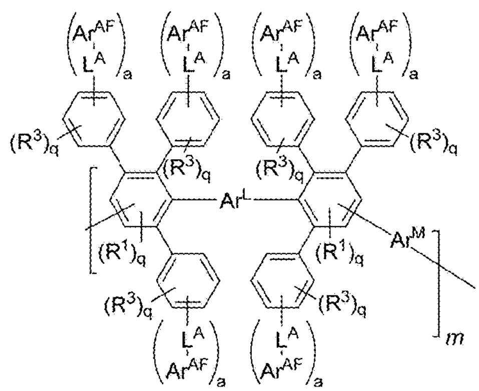
Figure 2B:
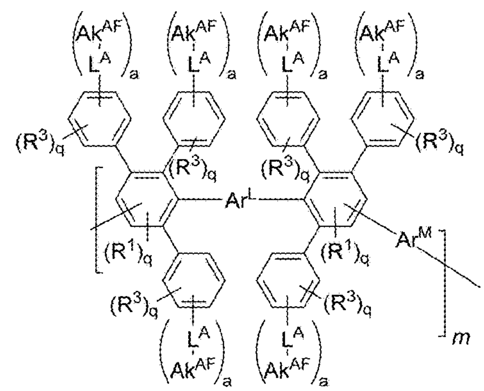
Figure 2C:
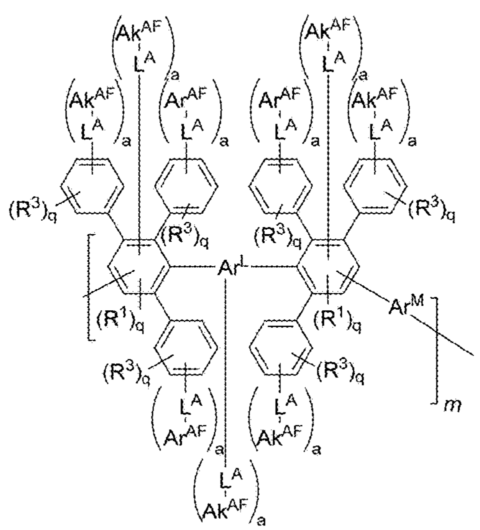
Figure 2C:
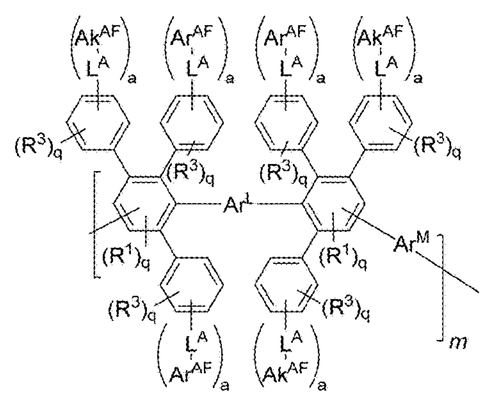

The $R^{AF}$ moiety can be present on any useful sites within a polymer. As seen in FIG. 2B, formulas (Ic) and (Id) provide polymers having $R^{AF}$ functional groups on pendent aryl groups (i.e., a number of $-L^{A}-Ar^{AF}$ groups on pendent aryl groups of formula (Ic) and a number of $-L^{A}-Ak^{AF}$ groups on pendent aryl groups of formula (Id)). As seen in FIG. 2C, different combinations of $R^{AF}$ moieties including aryl and alkyl groups are present on the same polymer. For instance, formula (Ie) provides a polymer having both $-L^{A}-Ar^{AF}$ groups and $-L^{A}-Ak^{AF}$ groups on backbone and pendent aryl groups. In another instance, formula (If) provides a polymer having both $-L^{A}-Ar^{AF}$ groups and $-L^{A}-Ak^{AF}$ groups on pendent aryl groups.

Figure 3A:
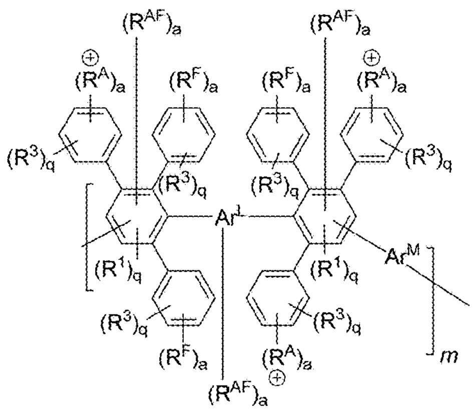
FIG. 3A-3B shows schematics of exemplary polymer structures having one or more functional groups including a cationic moiety ($R^{A}$) or functional groups including a halo group ($R^{F}$). Provided are structures (A) having formulas (Ig) to (Ih); and (B) having formulas (Ii) to (Ij).
Figure 3A:
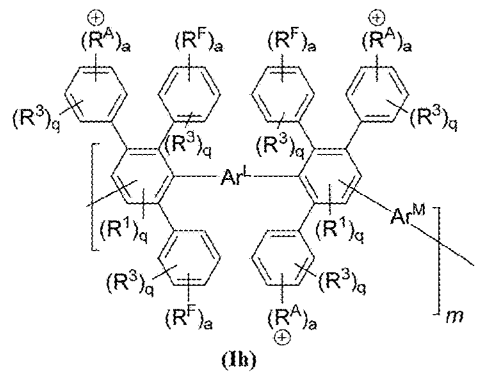
Figure 3B:
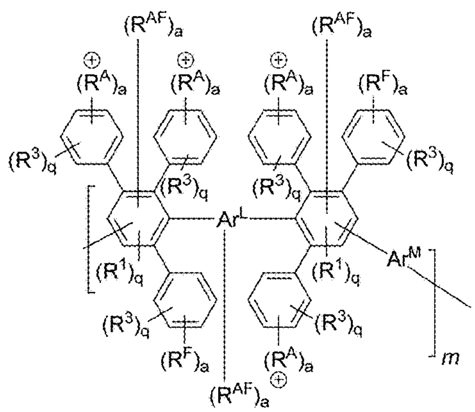
Figure 3B:
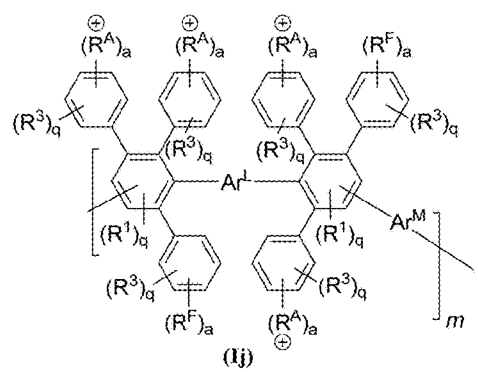

An $R^{AF}$ moiety can either be a functional group including a cationic moiety (e.g., $R^{A}$) or a functional group including a halo (e.g., $R^{F}$) and a polymer can have any useful combination of $R^{A}$ and $R^{F}$ groups. As seen in FIG. 3A, formula (Ig) includes a cationic $R^{A}$ group on three pendent aryl groups, a halo-containing $R^{F}$ group on three other pendent aryl groups, and an $R^{AF}$ group on backbone aryl groups. Formula (Ih) includes a cationic $R^{A}$ group on three pendent aryl groups, as well as a halo-containing $R^{F}$ group on three other pendent aryl groups. As seen in FIG. 3B, formula (Ii) includes a cationic $R^{A}$ group on four pendent aryl groups, a halo-containing $R^{F}$ group on two pendent aryl groups, and an $R^{AF}$ group on backbone aryl groups. Formula (Ij) includes a cationic $R^{A}$ group on four pendent aryl groups, as well as a halo-containing $R^{F}$ group on two pendent aryl groups.

Figure 29:
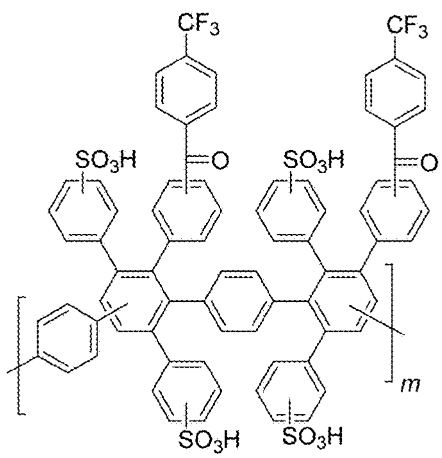
FIG. 29 shows further exemplary compounds having reactive handles. Provided is compound (II-17) having reactive handles (e.g., an $R^H$, such as an optionally substituted aryloyl) in combination with acidic moieties (e.g., an $R^S$ group, such as —$SO_3$H). Also provided is compound (II-18) having various types of reactive handles (e.g., an $R^H$, such as an optionally substituted alkaryl group that is substituted with an aminoalkyl group and/or an optionally substituted alkaryl group that is substituted with a perfluoroalkyl group). For compound (II-18), each Ak is independently, an optionally substituted alkylene group (e.g., any herein, such as an optionally substituted methylene, ethylene, etc.). In each of these compounds, in can be any useful number (e.g., any herein, such as of from about 40 to about 100). Any of the reactive handle in this figure can be reacted with a reagent to provide a $R^{AF}$ group, or the fluoro-containing group can be maintained to provide a $R^F$ group.
Figure 29:
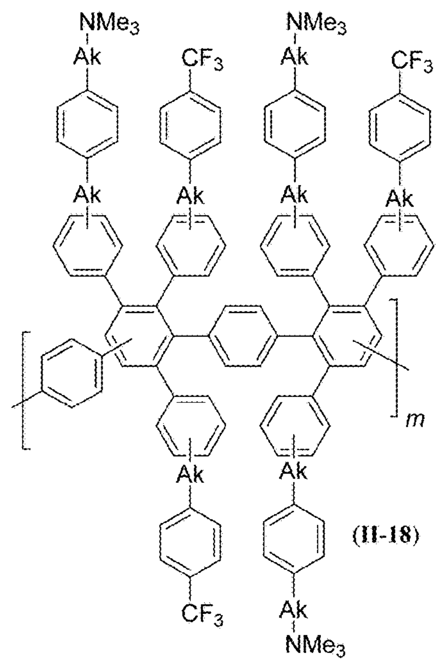

FIG. 29 provides an exemplary polymer of formula (II-18) having a functional group with a cationic moiety ($R^{A}$, e.g., $-Ak-Ph-Ak-NMe_3$) and a functional group including a halo ($R^{F}$, e.g., $-Ak-Ph-CF_3$).

Polymer Reagents

The present invention also includes reagents having any useful polymer segment described herein. For instance, the reagent can include a polymer segment disposed between two reactive end groups, where each end group can be the same or different. The polymer segment can be any described herein (e.g., a structure provided in formula (I), (Ia), (Ib), (Ic), (Id), (Ie), (If), (Ig), (Ii), (Ij), (VI), (VIa), (VIb), (VIc), (VId), (VII), (VIII), (VIIIa), and (IX), as well as particular structures provided as structures (I-1), (I-2), (I-3), (I-4), (I-5), (I-6), (I-7), (I-8), (IV-3), (IV-5), (IV-8), (IV-10), and (IV-11)). In addition, the polymer segment can include a second segment (e.g., Ar*), such as any described herein.

Optionally, a sublink L' can be present between the polymer segment and a reactive end group. The sublink L' can be composed of any useful linkage, such as any described herein (e.g., those described for linking segment L).

The reactive end group can be any useful group configured to react with a second reactive end group. In this way, ordered copolymer block structures can be synthesized by selectively placing reactive end groups on the ends of blocks or segments to form polymer reagents, and then reacting that polymer reagent to place the segments in an end-to-end fashion in the copolymer. A skilled artisan would understand how to place reactive end groups in a polymer reagent in order to form a copolymer with the desired configuration or order.

The reactive end group is usually placed on the ends of a first polymer reagent, as well as on the ends of the second polymer reagent. Then, a first reactive end group on the first polymer reagent reacts with the second reactive end group on a second polymer reagent. The first and second reactive end groups can be chosen from a pair of co-reactive groups. For example, such pairs of co-reactive groups include (i) a nucleophile for use with (ii) an electrophile; (i) an optionally substituted aryl group (e.g., having a —C(O)$R^{I}$ group, where $R^{I}$ is an aryl group having one or more halo) for use with (ii) an optionally substituted aryl group (e.g., having a —O$R^{Pr}$ group, where $R^{Pr}$ is H or an O-protecting group that can be deprotected prior to conducting a reaction); (i) an optionally substituted aryl group (e.g., having a —C(O)$R^{I}$ group, where $R^{I}$ is an aryl group having one or more halo) for use with (ii) an optionally substituted alkoxy group (e.g., such as —O$R^{Pr}$, where $R^{Pr}$ is H or an O-protecting group that can be deprotected prior to conducting a reaction); (i) an optionally substituted aryl group for use with (ii) an optionally substituted alkoxy group (e.g., such as —O$R^{Pr}$, where $R^{Pr}$ is H or an O-protecting group that can be deprotected prior to conducting a reaction); (i) an optionally substituted alkynyl group for use with (ii) an optionally substituted azido group, which can participate in a Huisgen 1,3-dipolar cycloaddition reaction; as well as (i) an optionally substituted diene having a 4π electron system for use with (ii) an optionally substituted dienophile or an optionally substituted heterodienophile having a 2π electron system, which can participate in a Diels-Alder reaction. For the co-reactive groups above, reagent (i) reacts with reagent (ii) in each pair. In one instance, the reactive group is $R^{H}$ (e.g., any described herein).

Figure 18A:
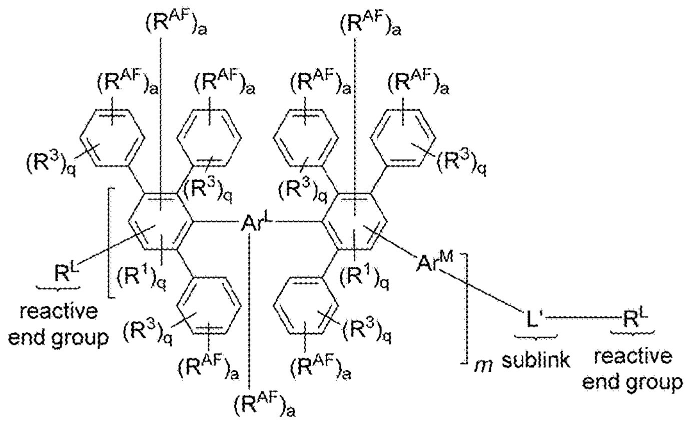
FIG. 18A-18C shows schematics of exemplary reagents having one or more reactive end groups ($R^L$). Provided are exemplary reagent structures (A) having formulas (VI) and (VIa), (B) having formulas (VIb) and (VIc), and (C) having formula (VId).
Figure 18A:
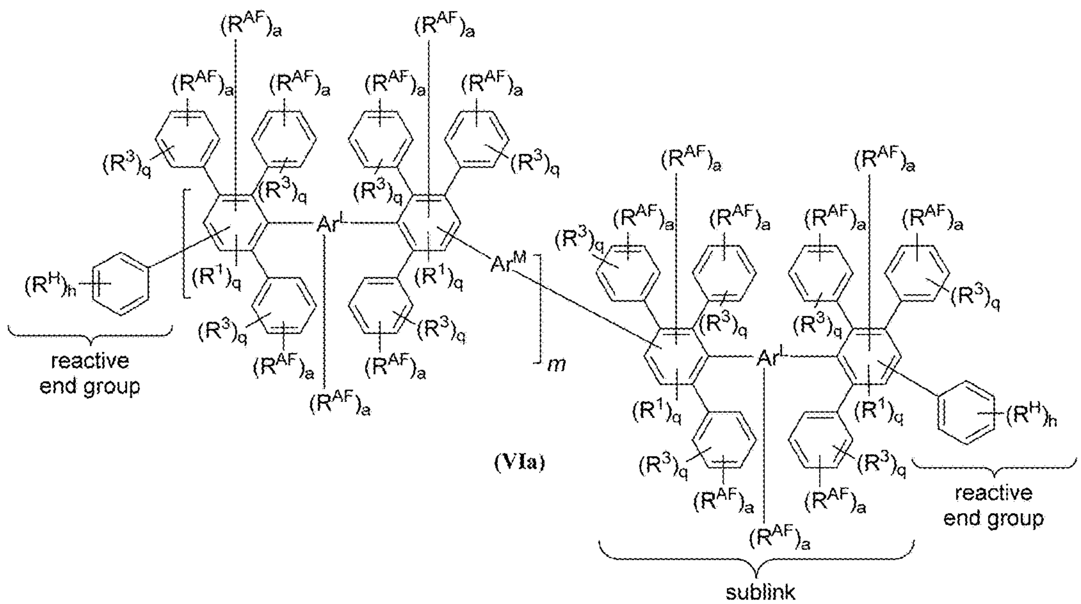

An exemplary polymer reagent is provided as structure (VI) in FIG. 18A. As can be seen, polymer reagent (VI) includes a two reactive end groups $R^{L}$ with a polymer segment (in brackets) placed between the reactive end groups. For this exemplary reagent, the optional sublink L' is located between the polymer segment and one of the reactive end groups. For reagent (VI), the polymer segment is that of formula (I), but any formula or structure herein can be employed for this polymer segment.

Figure 18B:
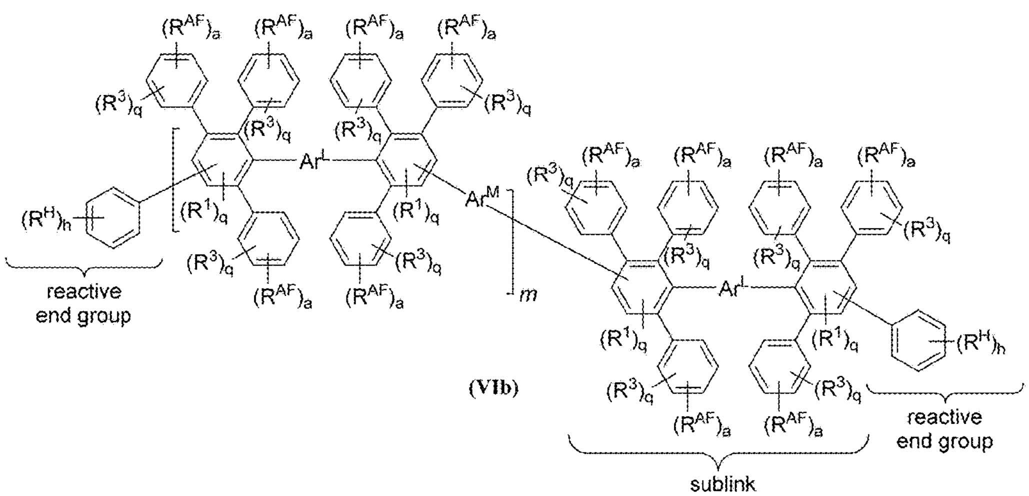
Figure 18B:
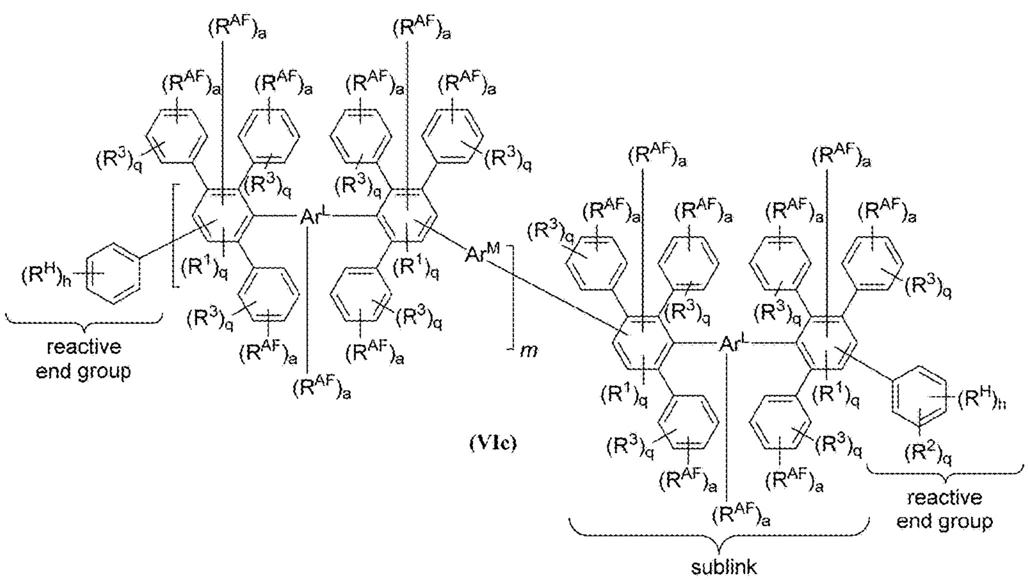
Figure 18C:
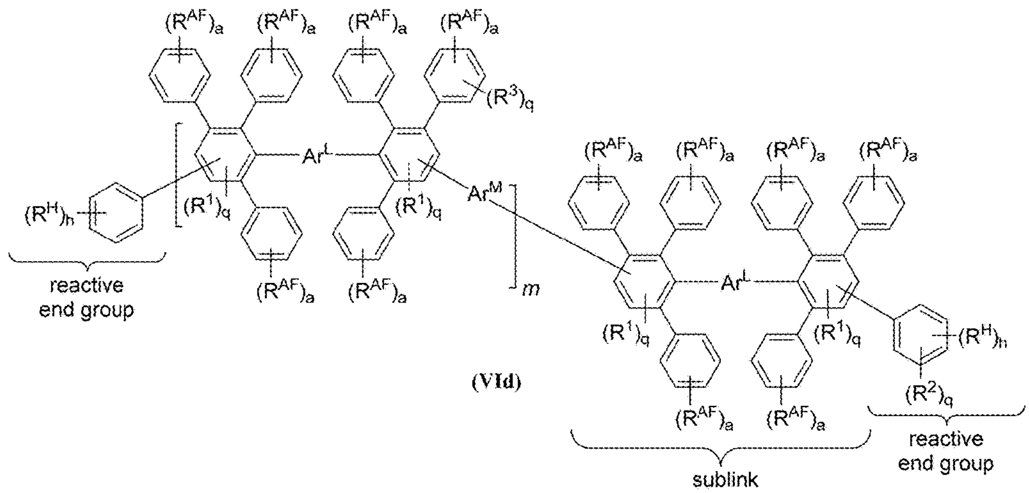

Further exemplary polymer reagents are provided as structure (VIa) to (VId) in FIG. 18A-18C. Exemplary reagents include a polymer having structure (VIa) to (VId), which includes a sublink having a structure similar to that of Formula (I) but lacking aryl group $Ar^{M}$.

Copolymers

Figure 21A:
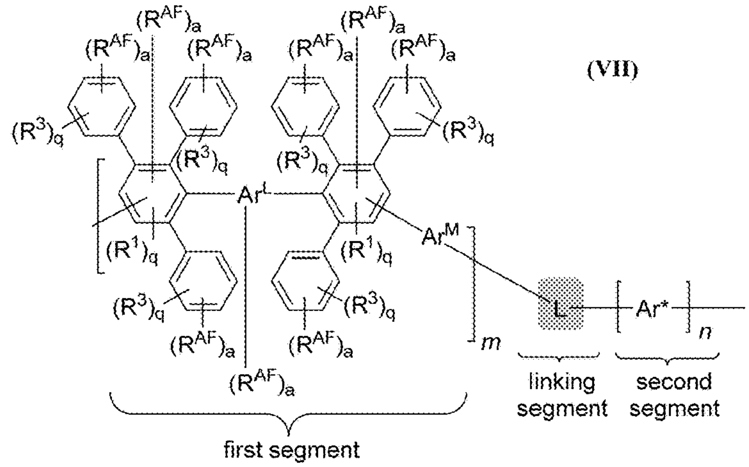
FIG. 21A-21C shows schematics of exemplary copolymer structures having a first segment, a linking segment, and a second segment. Provided are exemplary polymer structures (A) having formula (VII), (B) having formula (VIII), and (C) having formula (VIIIa).

The present invention also includes copolymers. In one embodiment, the copolymer includes the structure of formula (VII), including salts thereof. As can be seen in FIG. 21A, formula (VII) is a generic structure. Similar to formula (I) described above, the copolymer structure includes $R^{AF}$-substituted pendent and/or backbone aryl groups, $R^{1}$-substituted aryl groups, bridging group $Ar^{L}$, connecting group $Ar^{M}$, pendent substituents $R^{3}$, and m units. Thus, the description for these substituents provided for formula (I) applies equally to formula (VII). In some embodiments, each of $Ar^{L}$ and $Ar^{M}$ is, independently, an optionally substituted phenylene. In other embodiments, each of $Ar^{L}$ and $Ar^{M}$ is, independently, an optionally substituted 1,4-phenylene, e.g., $Ar^{L}$ as a $R^{1}$-substituted 1,4-phenylene and/or $Ar^{M}$ as an $R^{2}$-substituted 1,4-phenylene.

Figure 21B:
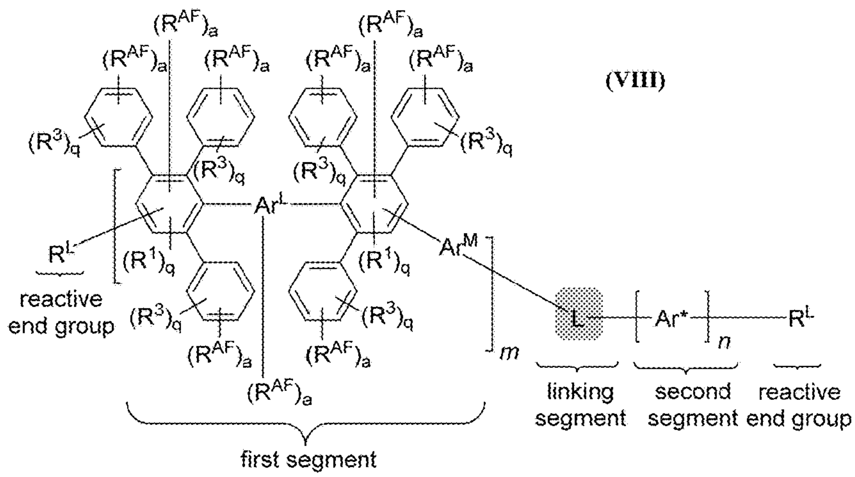
Figure 21C:
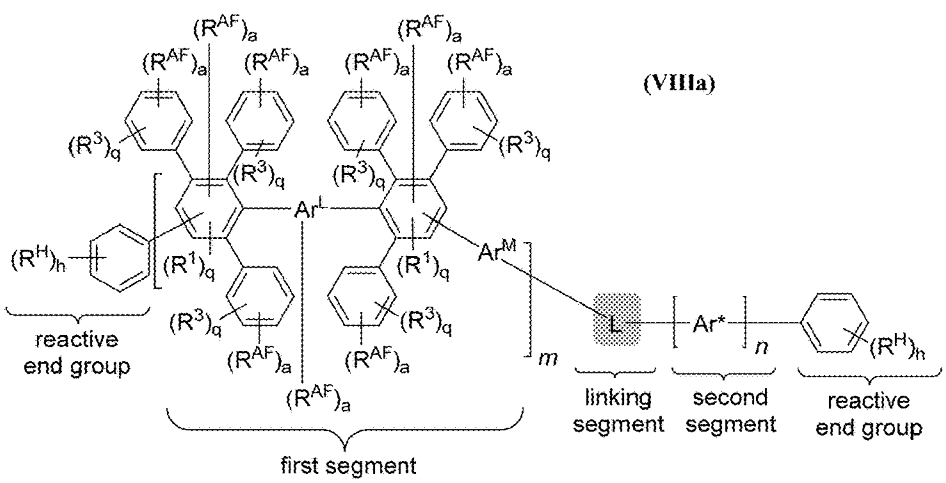

FIG. 21B provides formula (VIII), which is another generic structure including a first segment, a linking segment, a second segment, and two reactive end groups $R^{L}$. The first segment can be any described herein (e.g., a structure having formula (I)). The reactive end group $R^{L}$ can be any described herein. As seen in FIG. 21C, the structure of formula (VIIIa) includes a reactive end group $R^{L}$ that is an optionally substituted aryl group (e.g., an aryl group having a number of $R^{AF}$ groups).

Formulas (VII) and (VIII) also include additional groups, including a linking segment L and a second segment Ar* of n units. The linking segment L can be any useful linkage (e.g., any herein), including those to form a covalent bond between the two segments. In some embodiments, the linking segment includes those composed of structures, or a portion of such structures, in the first segment and/or the second segment. Exemplary linking segments L include a covalent bond, an optionally substituted alkylene, an optionally substituted heteroalkylene, an optionally substituted alkyleneoxy, an optionally substituted heteroalkyleneoxy, an optionally substituted arylene, an optionally substituted aryleneoxy, an Ar* unit, or a structure of formula (I).

The copolymer having formulas (VII) and (VIII) can have any useful second segment Ar*. In some embodiments, Ar* includes a structure of formula (I) (e.g., where each $R^3$ is H, optionally substituted alkyl, or $R^E$; or where the number of $R^S$ substituents in Ar* is less than the number of $R^S$ and/or $R^P$ substituents in the hydrophilic segment); a hydrophobic subunit; a sulfone subunit (e.g., a subunit including an —$SO_2$— group); an arylene sulfone subunit (e.g., —$(Ar)_a$—$SO_2$—$(Ar)_b$—, where Ar is an optionally substituted arylene group, as defined herein, and each a and b is an integer of about 0 to 10 and at least one of a or b is 1 or more); an ether sulfone subunit (e.g., —$(X^1)_a$—$SO_2$—$(X^2)_b$—O— or —$X^1$—O—$X^2$ $SO_2$—, where each $X^1$ and $X^2$ is, independently, any useful group, such as optionally substituted arylene or optionally substituted alkylene, and each a and b is an integer of about 0 to 10 and at least one of a or b is 1 or more); an arylene ether subunit (e.g., —$(Ar)_a$—O—$(Ar)_b$—, where Ar is an optionally substituted arylene group, as defined herein, and each a and b is an integer of about 0 to 10 and at least one of a or b is 1 or more); an arylene ketone subunit (e.g., —$(Ar)_a$—C(O)—$(Ar)_b$—, where Ar is an optionally substituted arylene group, as defined herein, and each a and b is an integer of about 0 to 10 and at least one of a or b is 1 or more); a perfluoroalkyl subunit (e.g., —$(CF_2)_{f1}$—, where f1 is an integer of 1 to about 16); or a perfluoroalkoxy subunit (e.g., —$O(CF_2)_{f1}$—, —$(CF_2)_{f1}O$—, —$O(CF_2)_{f1}CF(CF_3)O(CF_2)_{f2}$—, >$CFO(CF_2)_{f1}CF(CF_3)O(CF_2)_{f2}$—, where each f1 and f2 is, independently, an integer of 1 to about 16).

In some embodiments, formulas (VII) and (VIII) include a second segment Ar* that is a hydrophobic segment. In some embodiments, the second segment Ar* is a hydrophobic segment having one or more electron-withdrawing moieties (e.g., $R^E$) or one or more halo-containing functional groups (e.g., $R^F$). In particular embodiments, each pendent aryl group in the polymer or a segment thereof is substituted with an $R^E$ substitution and/or an $R^F$ substitution, where each substitution may be the same or different. In other embodiments, both pendent and backbone aryl groups are each, independently, substituted with an $R^E$ substitution and/or an $R^F$ substitution.

In other embodiments, formulas (VII) and (VIII) include a second segment Ar* that is a hydrophilic segment. In some embodiments, the second segment Ar* is a hydrophilic segment that includes the two $R^1$-substituted aryl groups and a bridging group $Ar^L$. Thus, in some embodiments, at least one substituent in this hydrophilic segment (e.g., substituents $R^1$, $R^2$, or $R^3$) is a hydrophilic moiety (e.g., an acidic moiety, such as any $R^A$, $R^S$, $R^P$, and/or $R^C$ described herein or any moiety including a sulfonyl group or a phosphoryl group). In some embodiments, the hydrophilic segment includes one or more acidic moieties (e.g., $R^S$, $R^P$, and/or $R^C$, as well as combinations thereof) on only the pendent aryl groups. Exemplary hydrophilic segments include those having $R^A$-substituted pendent aryl groups, $R^S$-substituted pendent aryl groups, $R^P$-substituted pendent aryl groups, and $R^1$-substituted backbone aryl groups.

A copolymer can include any useful number or ratio of first and second segments (e.g., hydrophilic and hydrophobic segments). In some embodiments, formulas (VII) and (VIII) include m number of first segments (e.g., hydrophilic segments) and n number of second segments (e.g., hydrophobic segments), where each of m and n is, independently, an integer of from about 1 to 1000. In other embodiments, the m (the number of first segments) is minimized in order to minimize swelling of the copolymer. For example, in some instances, m<n. In other instance, n is at least about 5 times greater than m (e.g., n is about 10 times greater than m, or n is about 20 times greater than m). In yet other instances, m is of from about 1 to 100, and n is of from about 5 to 500 (e.g., m is of from about 1 to 50, and n is of from about 5 to 500; m is of from about 1 to 50, and n is of from about 10 to 100; m is of from about 1 to 10, and n is of from about 5 to 500; m is of from about 1 to 20, and n is of from about 20 to 400; and m is of from about 1 to 10, and n is of from about 100 to 200). In some instances, m can be about 5.6 and n can be about 60.7 or 121.4. In other instances, m is of from about 1 to 20, and n is of from about 20 to 400.

For any polymer herein, including any copolymer herein, each and every $R^1$ can be independently, $R^{AF}$, $R^A$, $R^F$, $R^H$, $R^S$, $R^P$, $R^C$, and/or $R^E$. For instance, in some embodiments, each aryl group in the polymer or a segment thereof is substituted with an $R^{AF}$, an $R^A$, an $R^F$, an $R^H$, an $R^S$, an $R^P$, and/or an $R^C$ substitution, where each substitution may be the same or different. Reactive handles $R^H$ can be present on the same polymer or on the same segment of the polymer with any other different type of substitutions, e.g., acidic substitutions (e.g., $R^S$, $R^P$, and/or $R^C$, as well as combinations thereof) and $R^E$ substitutions. In particular, the use of acidic moieties and electron-withdrawing moieties could provide orthogonal chemistries to control and optimize performance (e.g., by employing acidic moieties to control ion conduction) and durability (e.g., by employing electron-withdrawing moieties to reduce oxidation). Further, the presence of a reactive handle $R^H$ allows the polymer to be further functionalized (e.g., with one or more functional groups $R^{AF}$, $R^A$, $R^F$, $R^S$, $R^P$, $R^C$, and/or $R^E$). In one instance, each pendent aryl group is substituted with an $R^{AF}$, an $R^A$, an $R^F$, an $R^H$, an $R^S$, an $R^P$, an $R^C$, and/or an $R^E$. Optionally, one or more backbone aryl groups can be further substituted with an $R^{AF}$, an $R^A$, an $R^F$, an $R^H$, an $R^S$, an $R^P$, an $R^C$, and/or an $R^E$.

Functional Groups and Moieties

The present invention includes the use of functional groups and moieties, such as functional groups (e.g., $R^{AF}$) including a cationic moiety (e.g., $R^A$) or a halo (e.g., $R^F$), reactive handles (e.g., $R^H$), acidic moieties (e.g., $R^S$, $R^P$, or $R^C$), electron-withdrawing moieties (e.g., $R^E$), and other functional groups. Any number of these functional moieties can be present on the polymer (e.g., the polymer backbone aryl groups and/or pendent aryl groups).

Exemplary functional groups (e.g., $R^{AF}$) including any useful group including a cationic moiety (e.g., an onium, such as any described herein) or a halo (e.g., any described herein). In some embodiments, the functional group $R^{AF}$ includes -$L^A$-$Ar^{AF}$ or -$L^A$-$Ak^{AF}$, in which $Ar^{AF}$ is an optionally substituted aryl and in which $Ak^{AF}$ is an optionally substituted alkyl or optionally substituted heteroalkyl. In particular embodiments $L^A$ is any useful covalent bond or any useful linker (e.g., any described herein). In some embodiments, $Ar^{AF}$ or $Ak^{AF}$ is substituted with one or more substituents selected from the group of halo, cyano, optionally substituted haloalkyl, optionally substituted perfluoroalkyl, optionally substituted nitroalkyl, and optionally substituted alkyl; and further includes a cationic moiety (e.g., an onium cation) or a halo (e.g., fluoro, or any described herein).

In some instances, the functional group $R^{AF}$ is a group including a linker $R^A$ and a functional moiety $R^{AF1}$, $R^{A1}$, or $R^{F1}$. In particular embodiments, $R^{AF1}$ is a cationic moiety or a halo. In some embodiments, $R^{A1}$ is a cationic moiety or includes a cationic moiety (e.g., an ammonium cation, a sulfonium cation, a phosphonium cation, an oxonium cation, a diazonium cation, or a halonium cation). In other embodiments, $R^{F1}$ is a halo or includes a halo.

In some embodiments, $R^{A1}$ includes $N^+$. In other embodiments, $R^{A1}$ is $—N^+R^{N1}R^{N2}R^{N3}$ or includes $—N^+R^{N1}R^{N2}R^{N3}$, where each of $R^{N1}$, $R^{N2}$, and $R^{N3}$ is, independently, H, optionally substituted alkyl, optionally substituted aryl, or optionally substituted alkaryl; or where $R^{N1}$ and $R^{N2}$, taken together with the nitrogen atom to which each are attached, form a heterocycle; or where $R^{N1}$ and $R^{N2}$, taken together, form an optionally substituted alkylene or heteroalkylene (e.g., as described herein). In some embodiments, each of $R^{N1}$, $R^{N2}$, and $R^{N3}$ is, independently, H or optionally substituted $C_{1-6}$ alkyl.

In some embodiments, $R^{A1}$ includes $S^+$. In other embodiments, $R^{A1}$ is $—S^+R^{S1}R^{S2}$ or includes $—S^+R^{S1}R^{S2}$, where each of $R^{S1}$ and $R^{S2}$ is, independently, H, optionally substituted alkyl, optionally substituted aryl, optionally substituted alkaryl, or optionally substituted alkenyl; or where $R^{S1}$ and $R^{S2}$, taken together with the sulky atom to which each are attached, form a heterocycle; or where $R^{S1}$ and $R^{S2}$, taken together, form an optionally substituted alkylene or heteroalkylene (e.g., as described herein). In some embodiments, each of $R^{S1}$ and $R^{S2}$ is, independently, H or optionally substituted $C_{1-6}$ alkyl.

In some embodiments, $R^{A1}$ includes $P^+$. In other embodiments, $R^{A1}$ is $—P^+R^{P1}R^{P2}R^{P3}$ or includes $—P^+R^{P1}R^{P2}R^{P3}$, where each of $R^{P1}$, $R^{P2}$, and $R^{P3}$ is, independently, H, optionally substituted alkyl, optionally substituted alkenyl, optionally substituted aryl, or optionally substituted alkaryl; or where two of $R^{P1}$, $R^{P2}$, and $R^{P3}$, taken together, form an optionally substituted alkylene or heteroalkylene (e.g., as described herein). In some embodiments, each of $R^{P1}$, $R^{P2}$, and $R^{P3}$ is, independently, H or optionally substituted $C_{1-6}$ alkyl.

In some embodiments, $R^{A1}$ includes $O^+$. In other embodiments, $R^{A1}$ is $—O^+R^{O1}R^{O2}$ or includes $—O^+R^{O1}R^{O2}$, where each of $R^{O1}$ and $R^{O2}$ is, independently, H, optionally substituted alkyl, optionally substituted alkenyl, optionally substituted aryl, or optionally substituted alkaryl; or where $R^{O1}$ and $R^{O2}$, taken together, form an optionally substituted alkylene or heteroalkylene (e.g., as described herein). In some embodiments, each of $R^{O1}$ and $R^{O2}$ is, independently, H or optionally substituted $C_{1-6}$ alkyl.

In some embodiments, $R^{A1}$ is $—N_2^+$ or includes $—N_2^+$.

In some embodiments, $R^{A1}$ is $—X^+$ or includes $—X^+$, where X is halo as defined herein. Exemplary halonium groups include an iodonium group (e.g., $—I^+$), a bromonium group (e.g., $—Br^+$), a chloronium group (e.g., $—Cl^+$), or a fluoronium group (e.g., $—F^+$).

In some embodiments, $R^{F1}$ is halo or includes halo (e.g., F, Cl, Br, or I).

As seen in FIG. 4A, formulas (I-1) and (I-2) provide polymers having different representations of the $R^{AF1}$ functional moiety. As can be seen, formula (I-4) includes a $R^{AF1}$ moiety attached to the pendent aryl groups by way of an aryloyl group (e.g., —C(O)-Ph). As can be also seen, formula (I-2) includes a $R^{AF1}$ moiety attached to the pendent aryl groups by way of a linker $L^A$ and a further aryl group (e.g., -$L^A$-Ph). The linker $L^A$ can be any useful bivalent linker. The $R^{AF1}$ moiety can be any useful functional group including a cationic moiety or halo (e.g., as described herein for $R^{A1}$ or $R^{F1}$).

A polymer can include any useful combination of $R^{AF}$ groups, see, e.g., FIG. 4B. As can be seen, formula (I-3) includes a $R^{AF1}$ moiety attached to the pendent aryl groups by way of a linker $L^A$ alone or a linker with an aryl group, i.e., -$L^A$-Ph. $R^{AF}$ groups can be provided any useful number of pendent aryl groups in any useful location. As can be also seen, formula (I-4) includes a $R^{AF1}$ moiety attached alternating pendent aryl groups by way of a linker $L^A$ or a further aryl group (e.g., -$L^A$-Ph). The linker $L^A$ can be any useful bivalent linker. The $R^{AF1}$ moiety can be any useful functional group including a cationic moiety or halo (e.g., as described herein for $R^{A1}$ or $R^{F1}$).

In any formula herein, the polymer includes a functional group in which the cationic moiety is distanced from the backbone. For instance, when $R^{AF}$ is -$L^A$-$R^{AF1}$, in which $L^A$ is a linker and $R^{AF1}$ is functional moiety including a cationic moiety, then $L^A$ is linker longer than three carbon atoms (e.g., an optionally substituted $C_{4-18}$ alkylene). Without wishing to be limited by mechanism, under high temperatures (e.g., greater than about 80° C.), benzyl ammonium cations can degrade, and it has been postulated that the hydroxyl anions can nucleophilically attack the ammonium positive charge. Thus, a long alkyl tether can be employed to minimize such nucleophilic reactions, which may be explained by the increased steric bulk of the long alkyl chain that may wrap around the cation protecting it from nucleophilic attack.

Each $R^{AF1}$ functional moiety can be a functional moiety including a cationic moiety ($R^{A1}$) or a functional moiety including a halo ($R^{F1}$). Each of $R^{A1}$ and $R^{F1}$ can be located at any useful position of the pendent or backbone aryl groups, see, e.g., FIG. 5A. As can be seen, formula (I-5) includes four $R^{A1}$ moieties attached to the pendent aryl groups by way of a linked aryl group (e.g., -$L^A$-Ph) and two $R^{F1}$ moieties attached to the pendent aryl groups by way of another linked aryl group (e.g., -$L^A$-Ph). Formula (I-6) includes three $R^{A1}$ moieties attached to the pendent aryl groups by way of a linked aryl group (e.g., -$L^A$-Ph) and three $R^{F1}$ moieties attached to the pendent aryl groups by way of another linked aryl group (e.g., -$L^A$-Ph).

Figure 5A:
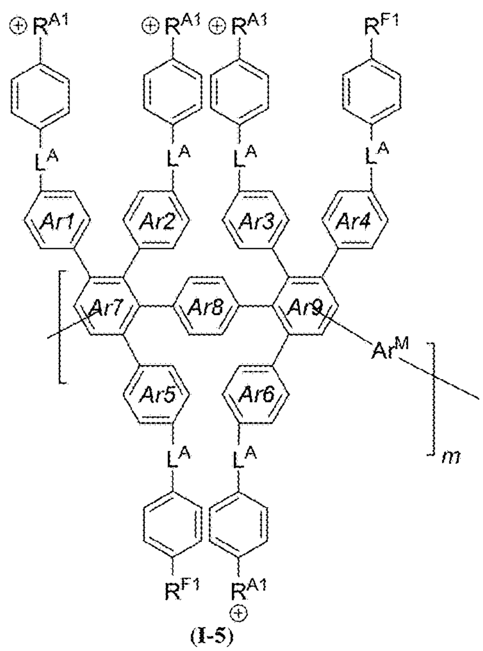
FIG. 5A-5B shows schematics of exemplary polymer structures having $R^{A1}$ (i.e., a substituent that includes a cationic moiety) or $R^{F1}$ (i.e., a substituent that includes a halo group) and $L^{A}$ (i.e., a linker, such as any herein). Provided are structures (A) having formulas (I-5) to (I-6); and (B) having formulas (I-7) to (I-8).
Figure 5A:
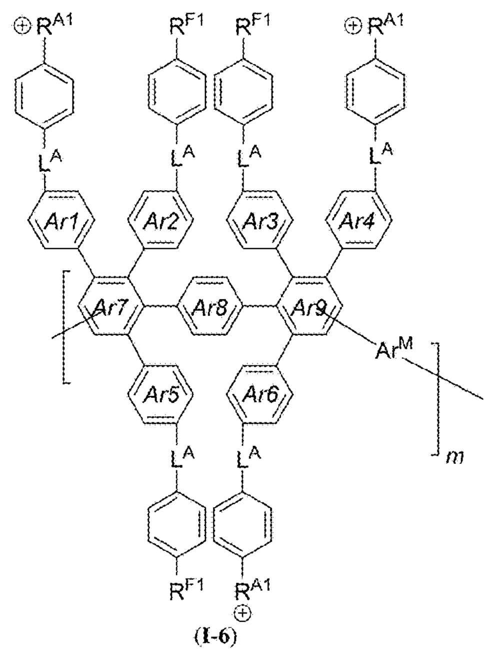
Figure 5B:
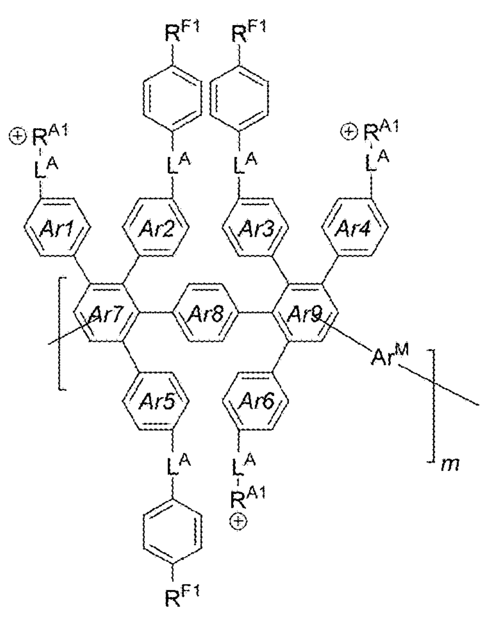
Figure 5B:
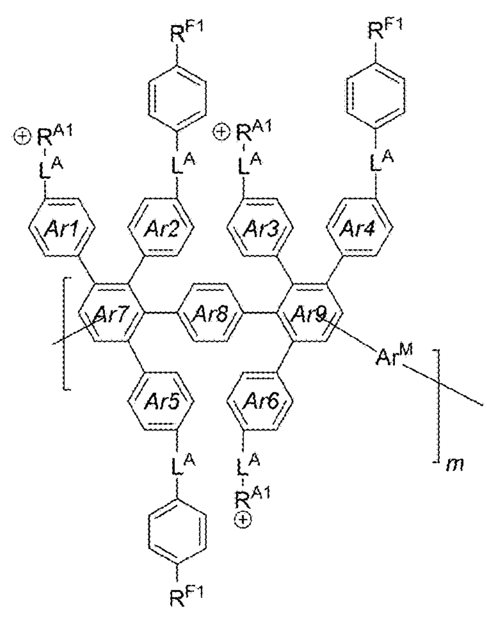

Functional moieties $R^{A1}$ and $R^{F1}$ can be attached to the polymer in any useful manner, see, e.g., FIG. 5B. As can be seen, formula (I-7) includes three $R^{A1}$ moieties attached to the pendent aryl groups by way of a linker (e.g., -$L^A$) and three $R^{F1}$ moieties attached to the pendent aryl groups by way of a linked aryl group (e.g., -$L^A$-Ph). Formula (I-8) includes three $R^{A1}$ moieties and three $R^{F1}$ moieties attached to alternating pendent aryl groups by way of a linker (e.g., -$L^A$) or a linked aryl group (e.g., -$L^A$-Ph).

Polymers having reactive handles $R^H$ can be further reacted to provide functional moieties $R^{AF}$ on any useful polymer (e.g., a polymer having formula (I)). Exemplary reactive handles (e.g., $R^H$) include any useful group, such as H, optionally substituted alkyl, optionally substituted haloalkyl, optionally substituted perfluoroalkyl, optionally substituted heteroalkyl, halo, optionally substituted aryl, optionally substituted alkaryl, optionally substituted arylalkoxy, optionally substituted aryloxy, optionally substituted aryloxycarbonyl, optionally substituted aryloyl, optionally substituted arylcarbonylalkyl, optionally substituted arylsulfonyl, and optionally substituted arylsulfonylalkyl. In one instance, at least one $R^H$ includes an optionally substituted aryl group (e.g., an optionally substituted aryl group including a halo, a haloalkyl, a perfluoroalkyl, a hydroxyl, or an alkoxy group).

In some embodiments, the reactive handle $R^H$ includes -$L^H$-$Ar^H$ or -$L^H$-$Ak^H$, in which $Ar^H$ is an optionally substituted aryl and in which $Ak^H$ is an optionally substituted alkyl or optionally substituted heteroalkyl. In particular embodiments $L^H$ is any useful covalent bond or any useful linker (e.g., any described herein). In some embodiments, $Ar^H$ or $Ak^H$ is substituted with one or more substituents selected from the group of halo, cyano, optionally substituted haloalkyl, optionally substituted perfluoroalkyl, optionally substituted nitroalkyl, and optionally substituted alkyl.

Figure 23A:
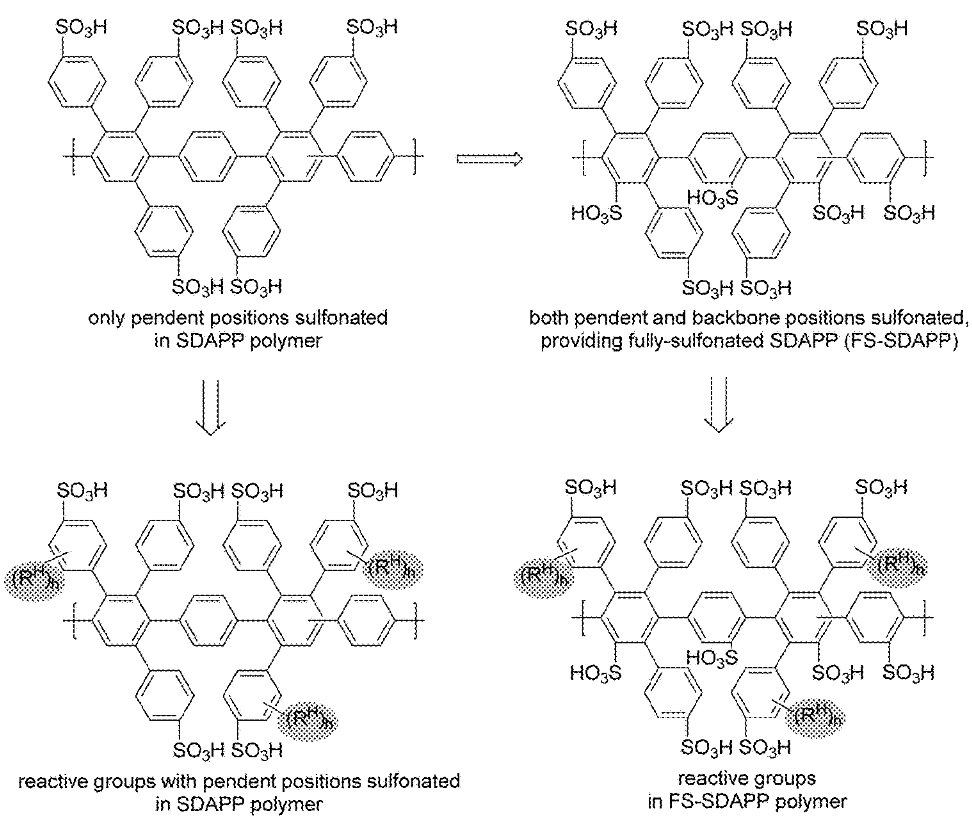
FIG. 23A-23C shows schematics of exemplary polymer structures having one or more reactive handles ($R^H$). Provided are (A) an exemplary schematic of various portions of the DAPP that can be appended with a reactive handle $R^H$ (e.g., on one or more pendent groups of DAPP) or with an acidic group (e.g., on the backbone and/or one or more pendent groups of DAPP). Also provided are exemplary polymer structures (B) having formulas (IIk) to (IIp) and (C) having formulas (IIq) and (IIr). Any of the reactive handle $R^H$ in this figure can be reacted with a reagent to provide a $R^{AF}$ group.
Figure 23B:
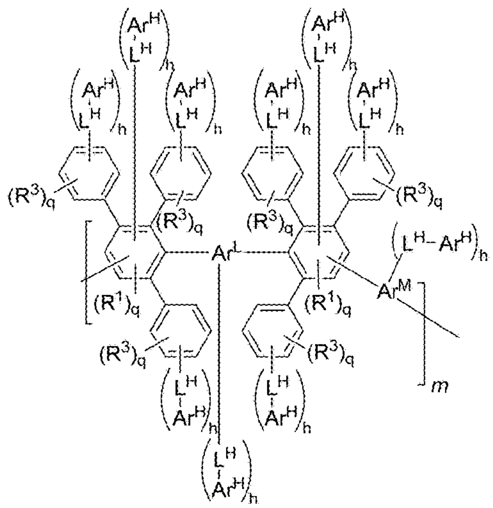
Figure 23B:
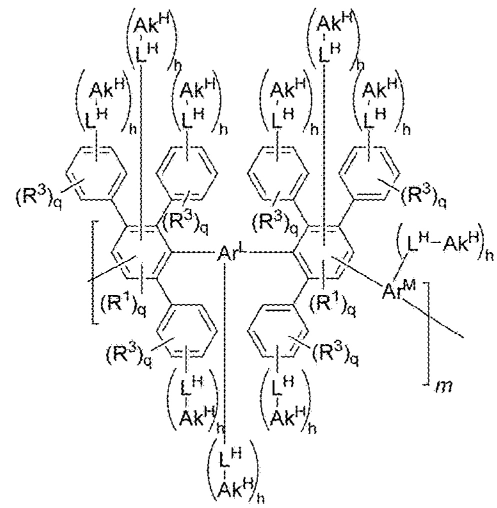
Figure 23B:
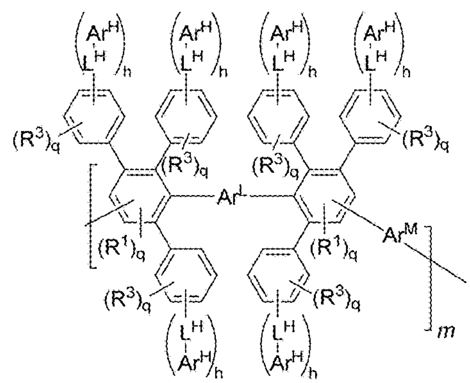
Figure 23B:
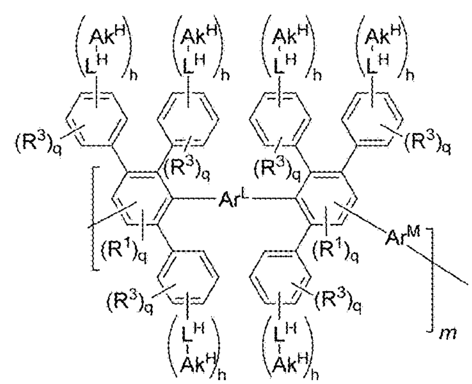
Figure 23B:
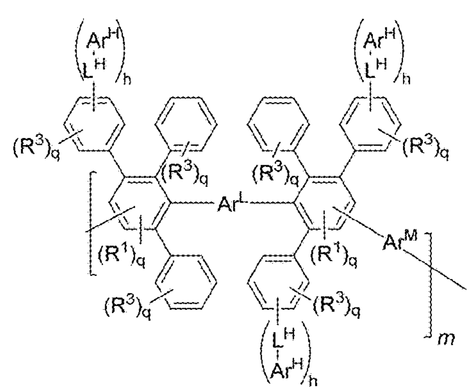
Figure 23B:
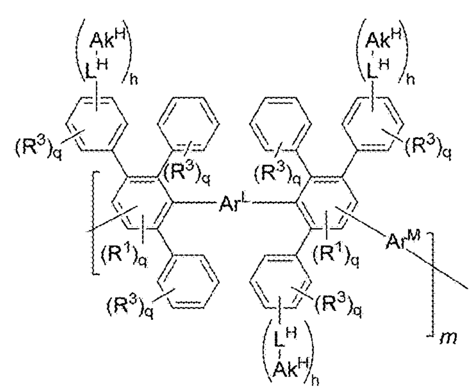

FIG. 23B provides exemplary polymers having a structure that includes $R^H$ substituents selected from $-L^H-Ar^H$ and $-L^H-Ak^H$. As can be seen, the polymer can include one or more $R^H$ that is $-L^H-Ar^H$. In some embodiments, the $Ar^H$ aryl-containing $R^H$ substituent is installed on each aryl group of the polymer (e.g., as in a structure having formula (IIk)). In other embodiments, the $Ar^H$ aryl-containing $R^H$ substituent is installed on each pendent aryl group of the polymer (e.g., as in a structure having formula (IIm)). In yet other embodiments, the $Ar^H$ aryl-containing $R^H$ substituent is installed on three pendent aryl groups of the polymer (e.g., as in a structure having formula (IIo)).

Figure 23C:
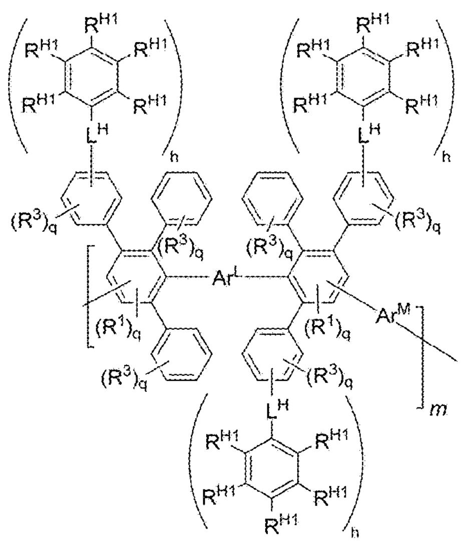
Figure 23C:
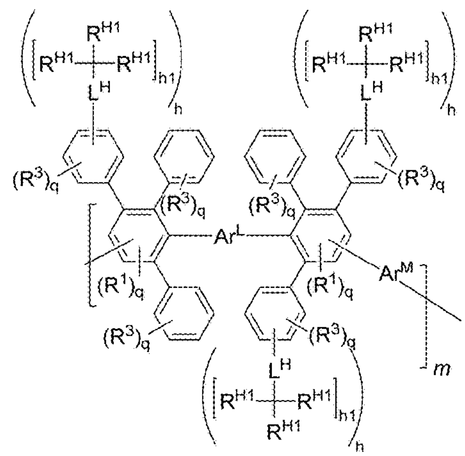

In some embodiments, the $Ar^H$ aryl-containing $R^H$ substituent is $-L^H-Ar^H$, in which $Ar^H$ is an $R^{H1}$-substituted phenyl group. Furthermore, any number h of such $R^H$ substituents can be installed on each aryl group. $R^{H1}$ can be any useful substituent, such as amino, amino, azido, nitro, nitroso, halo, as well as any described for an aryl group (e.g., substituents (1)-(47) as defined herein for aryl). As seen in FIG. 23C, in other embodiments, the $Ar^H$ aryl-containing $R^H$ substituent is installed on three pendent aryl groups of the polymer (e.g., as in a structure having formula (IIq)).

Figure 24:
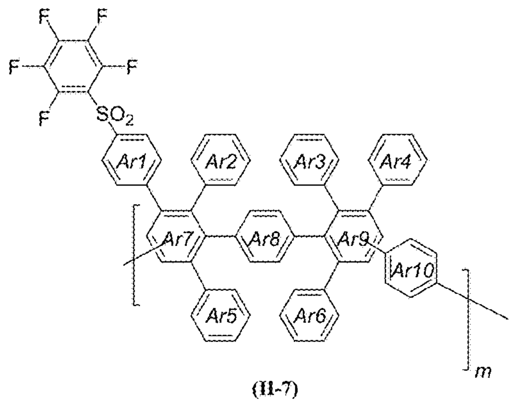
FIG. 24 shows schematics of exemplary polymer structures having formulas (II-7) to (II-12), which include one exemplary reactive handle $R^H$ on a pendent aryl group Ar1. Any of the fluoro groups in this figure can be reacted with a reagent to provide a cationic moiety. Alternatively, the fluoro group can be maintained for use as a $R^F$ group.
Figure 24:
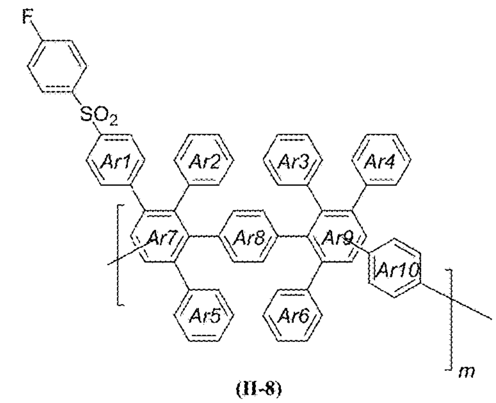
Figure 24:
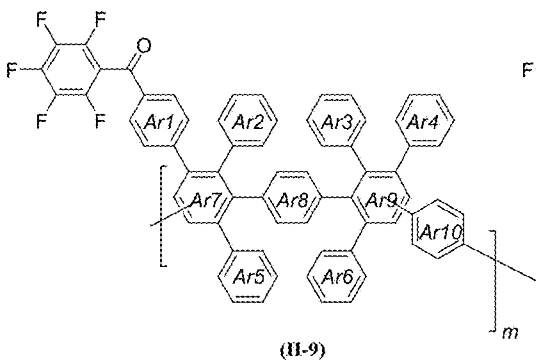
Figure 24:
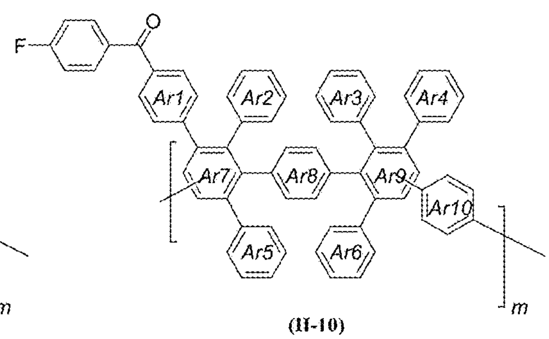
Figure 24:
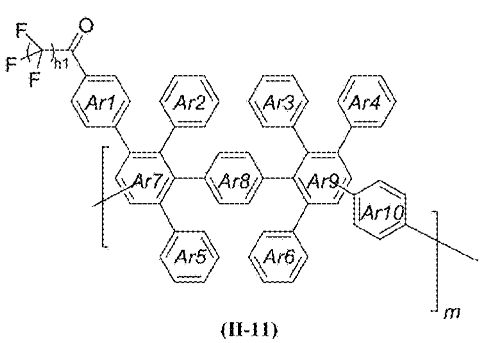
Figure 24:
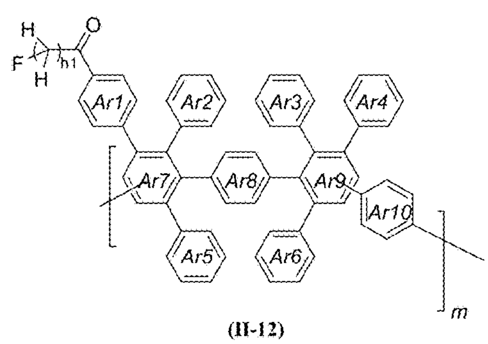

In other embodiments, the $Ar^H$ aryl-containing $R^H$ substituent is $-L^H-Ar^H$, in which $L^H$ is a sulfonyl group and in which $Ar^H$ is a halo-substituted phenyl group (e.g., pentafluorophenyl, tetrafluorophenyl, trifluorophenyl, difluorophenyl, or monofluorophenyl). As seen in FIG. 24, exemplary polymers include structures having formula (II-7) or structures having formula (II-8).

In yet other embodiments, the $Ar^H$ aryl-containing $R^H$ substituent is $-L^H-Ar^H$, in which $L^H$ is a carbonyl group and in which $Ar^H$ is a halo-substituted phenyl group (e.g., pentafluorophenyl, tetrafluorophenyl, trifluorophenyl, difluorophenyl, or monofluorophenyl). As seen in FIG. 24, exemplary polymers include structures having formula (II-9) or structures having formula (II-10).

As can also be seen in FIG. 23B, the polymer can include one or more $R^H$ that is $-L^H-Ak^H$. In some embodiments, the $Ak^H$ alkyl-containing $R^H$ substituent is installed on each aryl group of the polymer (e.g., as in a structure having formula (III)). In other embodiments, the $Ak^H$ alkyl-containing $R^H$ substituent is installed on each pendent aryl group of the polymer (e.g., as in a structure having formula (IIn)). In yet other embodiments, the $Ak^H$ alkyl-containing $R^H$ substituent is installed on three pendent aryl groups of the polymer (e.g., as in a structure having formula (IIp)).

In some embodiments, the $Ak^H$ alkyl-containing $R^H$ substituent is $-L^H-Ak^H$, in which $Ak^H$ is an $R^{H1}$-substituted $C_1$-alkyl group. Furthermore, any number h of such $R^H$ substituents can be installed on each aryl group, and any number h1 of $—CR^{H1}R^{H1}$ groups can be present within the $R^H$ substituent, in which each $R^{H1}$ can be the same or different. $R^{H1}$ can be any useful substituent, such as amino, amido, azido, nitro, nitroso, halo, as well as any described for an aryl group (e.g., substituents (1)-(27) as defined herein for alkyl). As seen in FIG. 23C, in other embodiments, the $Ak^H$ alkyl-containing $R^H$ substituent is installed on three pendent aryl groups of the polymer (e.g., as in a structure having formula (IIr)).

In other embodiments, the $Ak^H$ alkyl-containing $R^H$ substituent is $-L_H-Ak^H$, in which $L^H$ is a carbonyl group and in which $Ak^H$ is a halo-substituted alkyl group (e.g., perfluoroalkyl, $—(CF_2)_{h1}F$, $—(CH_2)_{h1}F$, or $—(CHF)_{h1}F$, in which h1 is an integer of from about 1 to about 24). As seen in FIG. 24, exemplary polymers include structures having formula (II-11) or structures having formula (II-12).

Exemplary linkers (e.g., for $L^A$ or $L^H$) include a covalent bond, carbonyl (—C(O)—), oxy (—O—), phosphonoyl phosphoryl (—P(O)H—), phosphoryl (—P(O)<), sulfonyl ($—S(O)_2—$), sulfonyl (—S(O)—), sulfonamide (e.g., $—SO_2—NR^{L3}—$ or $—NR^{L3}—SO_2—$, where $R^{L3}$ is H, optionally substituted alkyl, optionally substituted haloalkyl, optionally substituted alkoxy, optionally substituted alkaryl, optionally substituted aryl, or halo), imino (—NH—), imine (e.g., $—CR^{L1}=N—$, where $R^{L1}$ is H or optionally substituted alkyl), phosphine (e.g., $—PR^{L3}—$ group, where $R^{L3}$ is H or optionally substituted alkyl), nitrilo (e.g., $—NR^{L3}—$, where $R^{L3}$ is H, optionally substituted alkyl, optionally substituted haloalkyl, optionally substituted alkoxy, optionally substituted alkaryl, optionally substituted aryl, or halo), optionally substituted $C_{1-12}$ alkylene (e.g., $—(CR^{L1}R^{L2})_{La}—$, where each of $R^{L1}$ and $R^{L2}$ is, independently, H, optionally substituted alkyl, optionally substituted haloalkyl, optionally substituted alkoxy, optionally substituted alkaryl, optionally substituted aryl, or halo), optionally substituted $C_{1-12}$ alkyleneoxy, optionally substituted $C_{1-12}$ heteroalkylene (e.g., $—C(O)NR^{L3}—$, $—NR^{L3}C(O)—$, $—(CR^{L1}R^{L2})_{La}—C(O)—NR^{L3}—$, $—(CR^{L1}R^{L2})_{La}—NR^{L3}—C(O)—$, $—(CR^{L1}R^{L2})_{La}—SO_2—NR^{L3}—$, or $—SO_2—NR^{L3}—(CR^{L1}R^{L2})_{La}—$, where each of $R^{L1}$, $R^{L2}$, and $R^{L3}$ is, independently, H, optionally substituted alkyl, optionally substituted haloalkyl, optionally substituted alkoxy, optionally substituted alkaryl, optionally substituted aryl, or halo), optionally substituted $C_{1-12}$ heteroalkyleneoxy, optionally substituted $C_{4-18}$ arylene, or optionally substituted $C_{4-18}$ aryleneoxy.

Further exemplary reactive handles $R^H$ include $—C(O)—Ar^H$, in which $Ar^H$ is an optionally substituted aryl (e.g., optionally substituted phenyl with one or more optional substituents selected from the group of halo, haloalkyl, nitro, nitroso, alkoxy, etc.). In another instance, $R^H$ includes —C(O)-Ph, in which Ph is substituted with h1 number of $R^{H1}$, where $R^{H1}$ is selected from the group of halo, haloalkyl, nitro, nitroso, alkoxy, etc., and where h1 is an integer of from 1 to 5).

Figure 19A:
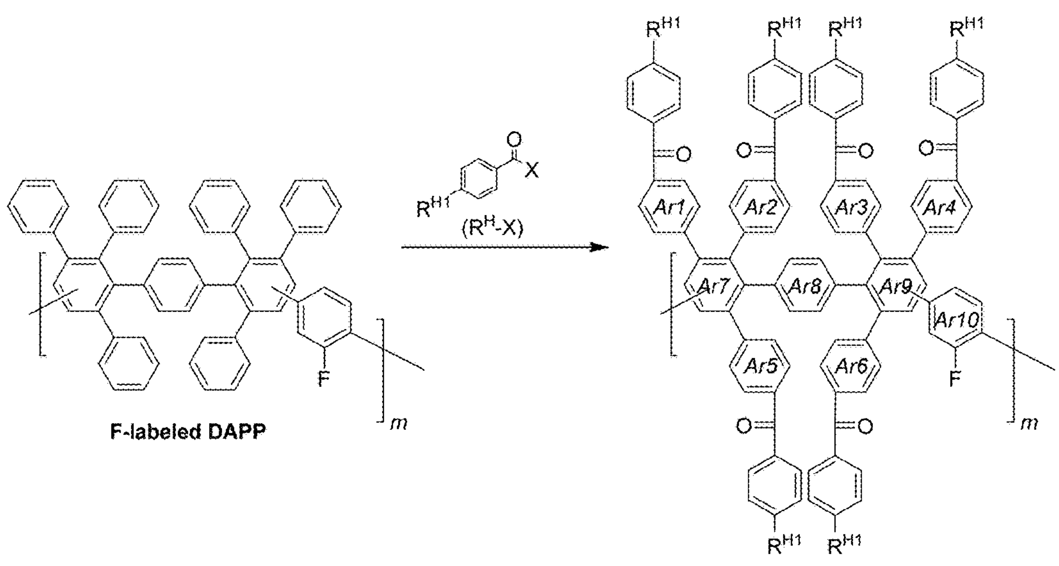
FIG. 19A-19C shows schematics of exemplary reaction schemes to provide polymer structures with one or more reactive handles ($R^H$). Provided are (A) an exemplary reaction of a labeled Diels-Alder poly(phenylene) polymer (labeled "F-labeled DAPP") in the presence of a reagent (e.g., $R^H$—X, such as $R^{H1}$—Ar—C(O)—X) to form a DAPP (II-1) having six reactive handles $R^H$ appended to all six pendent aryl groups of the DAPP (e.g., in which $R^H$ is $R^{H1}$—Ar—C(O)—); (B) an exemplary reaction of a Diels-Alder poly(phenylene) polymer (labeled "DAPP") in the presence of a reagent (e.g., $R^H$—X, such as $R^{H1}$—Ar—C(O)—X) to form a DAPP (II-2) having three reactive handles $R^H$ appended to half of the pendent aryl groups of the DAPP (e.g., in which $R^H$ is $R^{H1}$—Ar—C(O)—); and (C) an exemplary reaction of a DAPP (II-3) having four reactive handles appended to four of the pendent aryl groups of the DAPP (e.g., in which $R^H$ is $R^{H1}$—Ar—C(O)—) in the presence of an acid (e.g., $H_2SO_4$) to form a DAPP (II-4) having both reactive handles and acid groups appended to the pendent aryl groups. Any of the reactive handle $R^H$ in this figure can be reacted with a reagent to provide a $R^{AF}$ group.

FIG. 19A shows an exemplary reactive handle $R^H$, in which $R^{H1}$ is located in the para position in relation to the —C(O)— linker of $R^H$. As can be seen, any number of aryl groups in the underlying DAPP can be substituted. For instance, in the polymer of structure (II-1), each pendent aryl group (i.e., aryl groups Ar1 to Ar6) includes a $R^H$ substituent of $—C(O)-(p-R^{H1})-Ph$. In another instance, only the backbone aryl groups (i.e., aryl groups Ar7 to Ar9) are substituted (e.g., with one or more $R^H$, such as any herein). In yet another instance, the connecting group $Ar^M$ (labeled aryl group Ar10) is substituted (e.g., with one or more $R^H$, such as any herein). Optionally, the connecting group $Ar^M$ can include a label (e.g., halo).

Figure 19B:
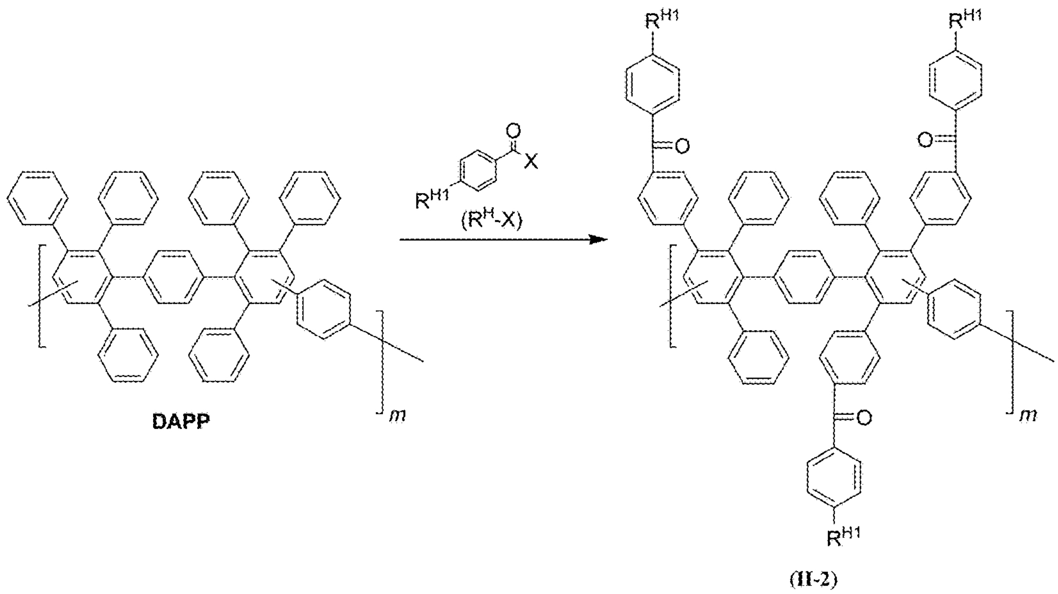

Any useful number of aryl groups in the polymer can include $R^H$. For instance, as seen in FIG. 19B, the polymer of structure (II-2) includes three pendent aryl groups, in which each of these pendent groups includes a $R^H$ substituent of $—C(O)-(p-R^{H1})-Ph$. In some instances, each pendent aryl group is substituted. In other instances, only some of the pendent groups are substituted.

Figure 19C:
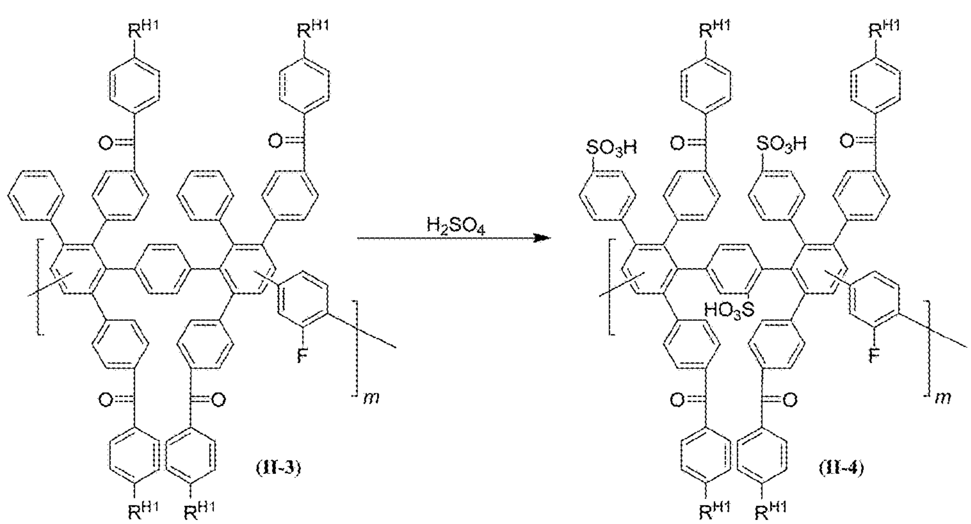

The polymer structure can include any useful combination of substitutions, including one or more $R^H$ substituents in combination with one or more $R^1$ and/or $R^3$ substituents. For instance, as seen in FIG. 19C, the polymer of structure (II-4) includes four $R^H$ substituents (e.g., —C(O)-(p-$R^{H1}$)-Ph located on pendent aryl groups), a $R^1$ substituent (e.g., —$SO_3H$ located on a backbone aryl group), and two $R^3$ substituents (e.g., —$SO_3H$ located on pendent aryl groups). Any useful number and type of $R^H$, $R^1$, and/or $R^3$ substituents can be present on a particular polymer structure. In another instance, the number q of $R^1$ substituent(s) is of from 0 to 5 for each aryl group (e.g., from 0 to 1, 1 to 5, 1 to 4, 1 to 3, 1 to 2, 2 to 5, 2 to 4, or 2 to 3).

In one instance, the number h of $R^H$ substituent(s) is of from 0 to 5 for each aryl group (e.g., from 0 to 4, 0 to 3, 0 to 2, 0 to 1, 1 to 5, 1 to 4, 1 to 3, 1 to 2, 2 to 5, 2 to 4, or 2 to 3). In some embodiments, each aryl group includes one or more $R^H$. In other embodiments, one aryl group includes one or more $R^H$. In other embodiments, each pendent aryl group includes one or more $R^H$. In yet other embodiments, one to three pendent aryl groups includes one or more $R^H$. In other embodiments, each backbone aryl group or $Ar^L$ aryl group includes one or more $R^H$. In some embodiments, one backbone aryl group includes one or more $R^H$. In particular embodiments, each h for each aryl group is the same or different.

In another instance, each backbone aryl group or $Ar^L$ aryl group includes one or more $R^1$. In particular embodiments, each q for each aryl group is the same or different. In yet another instance, the number q of $R^3$ substituent(s) is of from 0 to 5 for each aryl group (e.g., from 0 to 1, 1 to 5, 1 to 4, 1 to 3, 1 to 2, 2 to 5, 2 to 4, or 2 to 3). In some embodiments, each pendent aryl group includes one or more $R^3$.

Figure 20A:
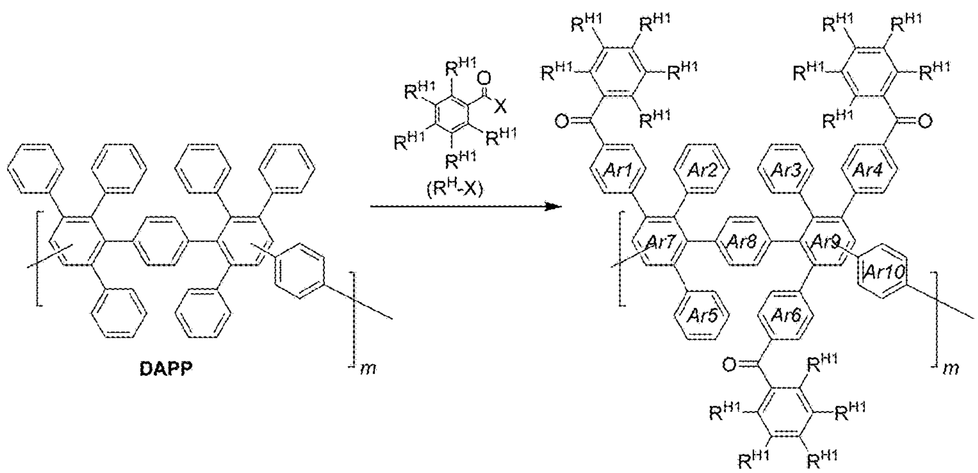
FIG. 20A-20B shows schematics of further exemplary reaction schemes to provide polymer structures with one or more reactive handles ($R^H$). Provided are (A) an exemplary reaction of a Diels-Alder poly(phenylene) polymer (labeled "DAPP") in the presence of a reagent (e.g., $R^H$—X, such as $(R^{H1})_6$—Ar—C(O)—X) to form a DAPP (II-5) having three reactive handles $R^H$ appended to half of the pendent aryl groups of the DAPP (e.g., in which $R^H$ is $(R^{H1})_6$—Ar—C(O)—); and (B) an exemplary reaction of a Diels-Alder poly(phenylene) polymer (labeled "DAPP") in the presence of a reagent (e.g., $R^H$—X, such as $(R^{H1})_6$—Ar—$SO_2$—X) to form a DAPP (II-6) having three reactive handles $R^H$ appended to half of the pendent aryl groups of the DAPP (e.g., in which $R^H$ is $(R^{H1})_6$—Ar—$SO_2$—). Any of the reactive moiety $R^{H1}$ in this figure can be reacted with a reagent to provide a $R^{A1}$ group or a $R^{F1}$ group.
Figure 20B:
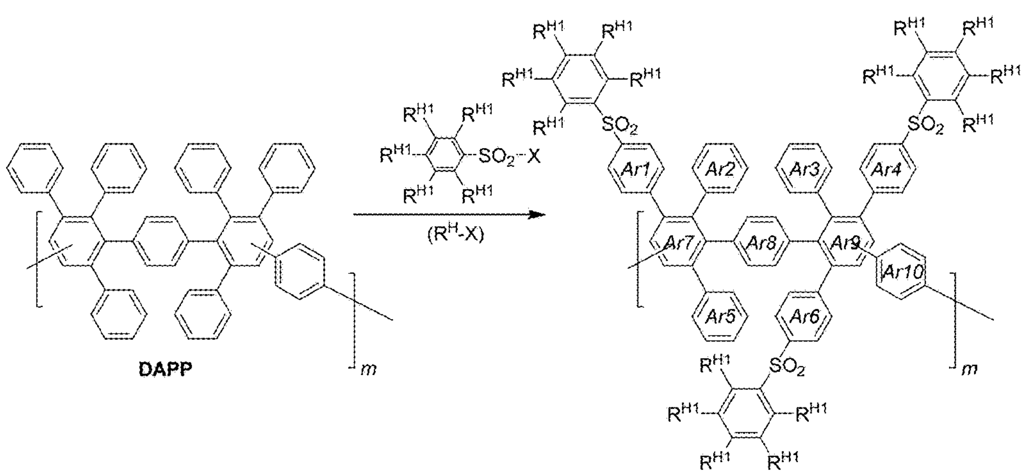

Any useful $R^H$ substituents can be present on any number of aryl groups (e.g., some of the pendent aryl groups, such as of from about 1 to about 3 pendent aryl groups). For instance, FIG. 20A provides another polymer of structure (II-5), which includes three pendent aryl groups (i.e., pendent aryl groups Ar1, Ar4, and Ar6) and in which each of these pendent groups includes a $R^H$ substituent of —C(O)—$(R^{H1})_5$-Ph. In another instance, FIG. 20B provides another polymer of structure (II-6), which includes three pendent aryl groups (i.e., pendent aryl groups Ar1, Ar4, and Ar6) and in which each of these pendent groups includes a $R^H$ substituent of —$SO_2$—$(R^{H1})_5$-Ph.

Other exemplary reactive handles $R^H$ include —$SO_2$—$Ar^H$, in which $Ar^H$ is an optionally substituted aryl (e.g., optionally substituted phenyl with one or more optional substituents selected from the group of halo, haloalkyl, nitro, nitroso, alkoxy, etc.). In another instance, $R^H$ includes —$SO_2$-Ph, in which Ph is substituted with h1 number of $R^{H1}$, where $R^{H1}$ is selected from the group of halo, haloalkyl, nitro, nitroso, alkoxy, etc., and where h1 is an integer of from 1 to 5).

Exemplary acidic moieties (e.g., $R^S$) include any group having one or more sulfonyl groups, such as sulfo (e.g., —$SO_2$—OH), alkylsulfonyl (e.g., —$SO_2$—$R^{S1}$, where $R^{S1}$ is optionally substituted $C_{1-12}$ alkyl), alkylsulfonylalkyl (e.g., —$R^{SA}$—$SO_2$—$R^{S1}$, where each of $R^{S1}$ is optionally substituted $C_{1-12}$ alkylene or optionally substituted heteroalkylene and $R^{S1}$ is optionally substituted $C_{1-12}$ alkyl), arylsulfonyl (e.g., —$SO_2$—$R^{Ar}$, where $R^{Ar}$ is optionally substituted $C_{4-18}$ aryl), arylsulfonylalkyl (e.g., —$R^{SA}$—$SO_2$—$R^{Ar}$, where $R^{SA}$ is independently, optionally substituted $C_{1-12}$ alkyl or alkylene and $R^{Ar}$ is optionally substituted $C_{4-18}$ aryl), sulfonamoyl (e.g., —$SO_2NR^{N1}R^{N2}$), sulfoamino (e.g., —N($R^{N1}$)—$SO_2$—$R^{S3}$), aminosulfonyl (e.g., —$SO_2$—$NR^{N1}$—$R^{S2}$), or sulfonyl imide (e.g., —$SO_2$—$NR^{N1}$—$SO_2$—$R^{S3}$), where each of $R^{N1}$ and $R^{N2}$ is, independently, H, optionally substituted $C_{1-12}$ alkyl (e.g., haloalkyl, such as perfluoroalkyl), optionally substituted $C_{4-18}$ aryl, or optionally substituted $C_{1-12}$ alk-$C_{4-18}$ aryl; $R^{S2}$ is H, optionally substituted $C_{1-12}$ alkyl (e.g., haloalkyl, such as perfluoroalkyl), hydroxyl, optionally substituted $C_{1-12}$ alkylsulfonyl, optionally substituted $C_{4-18}$ aryl, or optionally substituted $C_{1-12}$ alk-$C_{4-18}$ aryl; and $R^{S3}$ is H, hydroxyl, optionally substituted $C_{1-12}$ alkyl (e.g., haloalkyl, such as perfluoroalkyl), optionally substituted $C_{4-18}$ aryl, or optionally substituted $C_{1-12}$ alk-$C_{4-18}$ aryl.

In any of these moieties, each $R^{S1}$ and $R^{S3}$ is, independently, optionally substituted $C_{1-12}$ alkyl (e.g., haloalkyl, such as $C_{1-12}$ perfluoroalkyl), optionally substituted $C_{1-12}$ alkoxy, optionally substituted $C_{4-18}$ aryl, optionally substituted $C_{1-12}$ alk-$C_{4-18}$ aryl optionally substituted $C_{4-18}$ aryloxy, hydroxyl, or H; each $R^{S2}$ is independently, optionally substituted $C_{1-12}$ alkyl (e.g., haloalkyl, such as perfluoroalkyl), optionally substituted $C_{1-12}$ alkylsulfonyl, optionally substituted $C_{1-12}$ alkoxy, optionally substituted $C_{4-18}$ aryl, optionally substituted $C_{1-12}$ alk-$C_{4-18}$ aryl optionally substituted $C_{4-18}$ aryloxy, hydroxyl, or H; each $R^{Ar}$ is, independently, optionally substituted $C_{4-18}$ aryl, optionally substituted $C_{1-12}$ alk-$C_{4-18}$ aryl, or optionally substituted $C_{4-18}$ aryloxy; each of $R^{SA}$ is, independently, oxy, optionally substituted $C_{1-12}$ alkylene, or optionally substituted heteroalkylene; and each of $R^{N1}$ and $R^{N2}$ is, independently, H, optionally substituted $C_{1-12}$ alkyl (e.g., haloalkyl, such as perfluoroalkyl), optionally substituted $C_{4-18}$ aryl, or optionally substituted $C_{1-12}$ alk-$C_{4-18}$ aryl.

Other exemplary acidic moieties (e.g., $R^P$) include any group having one or more phosphoryl groups, such as phosphono (e.g., —P(O)$(OH)_2$), phosphoric ester (e.g., —O—PO$(OH)_2$ or —O—P(O)$<R^{P1}R^{P2}$ or —O—P(O)$<R^{Ar}R^{P2}$ or —O—P(O)$<R^{Ar}R^{Ar}$, where each $R^{Ar}$ is the same or different), alkylphosphoryl (e.g., —P(O)$<R^{P1}R^{P2}$, where $R^{P1}$ is optionally substituted $C_{1-12}$ alkyl or optionally substituted $C_{1-12}$ alkoxy; and $R^{P2}$ is optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H), substituted phosphonoyl (e.g., —P(O)$HR^{P1}$, where $R^{P1}$ is optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H), alkylphosphorylalkyl (e.g., —$R^{PA}$—P(O)$<R^{P1}R^{P2}$, where $R^{PA}$ is optionally substituted $C_{1-12}$ alkylene or optionally substituted heteroalkylene; and each of $R^{P1}$ and $R^{P2}$ is, independently, optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H), arylphosphoryl (e.g., —P(O)$<R^{Ar}R^{P2}$ or —P(O)$<R^{Ar}R^{Ar}$, where each $R^{Ar}$ is, independently, optionally substituted $C_{4-18}$ aryl, optionally substituted $C_{1-12}$ alk-$C_{4-18}$ aryl, or optionally substituted $C_{4-18}$ aryloxy; and $R^{P2}$ is optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H), or arylphosphorylalkyl (e.g., —$R^{PA}$—P(O)$<R^{Ar}R^{P2}$ or —$R^{PA}$—P(O)$<R^{Ar}R^{Ar}$, where $R^{PA}$ is, independently, optionally substituted $C_{1-12}$ alkylene or optionally substituted heteroalkylene; each $R^{Ar}$ is, independently, optionally substituted $C_{4-18}$ aryl, optionally substituted $C_{1-12}$ alk-$C_{4-18}$ aryl, or optionally substituted $C_{4-18}$ aryloxy; and $R^{P2}$ is optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H), where each of these groups can be optionally substituted (e.g., with one or more substituents described for alkyl, as defined herein).

In any of these moieties, each of $R^{P1}$ and $R^{P2}$ is, independently, optionally substituted $C_{1-12}$ alkyl (e.g., haloalkyl, such as $C_{1-12}$ perfluoroalkyl), optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H; each of $R^{Ar}$ is, independently, optionally substituted $C_{4-18}$ aryl, optionally substituted $C_{1-12}$ alk-$C_{4-18}$ aryl, or optionally substituted $C_{4-18}$ aryloxy; and each $R^{PA}$ is, independently, oxy, optionally substituted $C_{1-12}$ alkylene, or optionally substituted heteroalkylene.

Yet other exemplary acidic moieties (e.g., $R^C$) include any group having a carbonyl group, such as carboxyl (e.g., —$CO_2H$), —C(O)—$R^{C1}$, or —$R^{CA}$—C(O)—$R^{C1}$ (e.g., where each $R^{C1}$ is, independently, optionally substituted $C_{1-12}$ alkyl (e.g., haloalkyl, such as $C_{1-12}$ perfluoroalkyl), optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H; and each $R^{CA}$ is, independently, oxy, optionally substituted $C_{1-12}$ alkylene, or optionally substituted heteroalkylene).

Exemplary electron-withdrawing moieties (e.g., $R^E$) include optionally substituted $C_{7-11}$ aryloyl, optionally substituted $C_{6-18}$ aryl, carboxyaldehyde, optionally substituted $C_{2-7}$ alkanoyl, optionally substituted $C_{1-12}$ alkyl, optionally substituted $C_{1-12}$ haloalkyl, optionally substituted $C_{2-7}$ alkoxycarbonyl, nitro, nitroso, cyano, sulfa carboxyl, and quaternary ammonium (e.g., —$N^+R^{N1}R^{N2}R^{N3}$, where each of $R^{N1}$, $R^{N2}$, and $R^{N3}$ is, independently, optionally substituted alkyl, optionally substituted alkaryl, or optionally substituted aryl, or two of $R^{N1}$, $R^{N2}$, and $R^{N3}$, taken together with the nitrogen atom to which each are attached, form a heterocyclyl group, as defined herein). In another embodiment, $R^E$ includes or is substituted by a $C_{1-12}$ perfluoroalkyl group. In yet another embodiment, $R^E$ is a $C_{1-12}$ perfluoroalkyl group.

Figure 22:
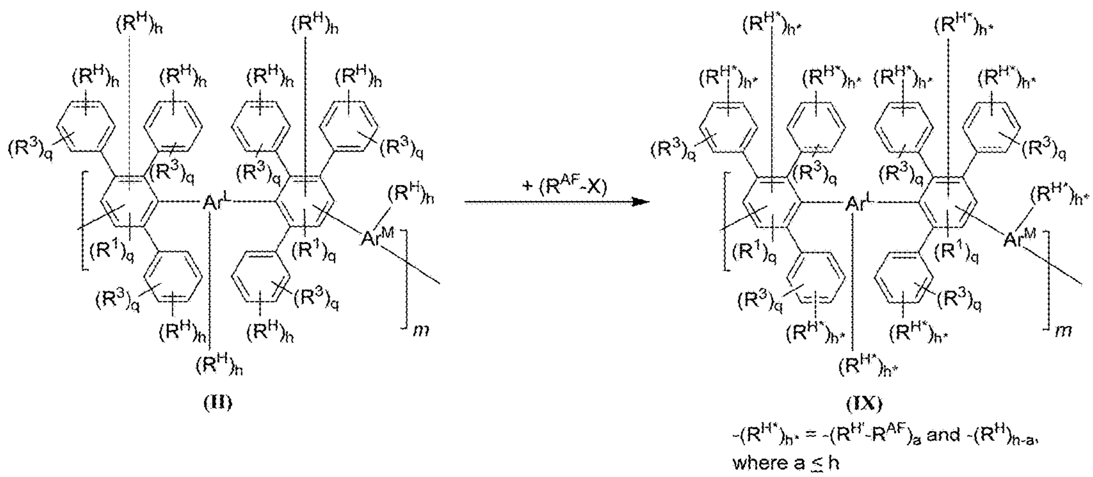
FIG. 22 shows an exemplary reaction scheme for reacting the reactive handles ($R^H$) of an initial polymer structure having formula (II) in the presence of one or more functional groups ($R^{AF}$), thereby providing a further functionalized polymer structure having formula (IX).

One or more functional groups can be appended to a reactive handle $R^H$. Exemplary functional groups include any useful group, such as halo, nitro, nitroso, cyano, amino, amido, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, optionally substituted $C_{1-12}$ alkoxy, optionally substituted aryl, optionally substituted alkaryl, optionally substituted arylalkoxy, optionally substituted aryloxy, optionally substituted aryloxycarbonyl, optionally substituted aryloyl, optionally substituted arylsulfonyl, and optionally substituted arylsulfonylalkyl, in addition to any that provides an $R^{AF}$ (e.g., as defined herein). FIG. 22 provides a structure having the formula (IX) having h* number of $R^{H*}$ substituents, in which $R^{H*}$ includes a number a of reacted reactive handle $R^{H'}$ (e.g., a reactive handle $R^H$, such as any herein, lacking a leaving group (e.g., H, halo, etc.)) that is covalently bonded to a functional group $R^{AF}$ and includes a number h−a of non-reacted reactive handle $R^H$, and in which a≤h. Any number of $R^H$ substituents can include a functional group $R^{AF}$. In one instance, every $R^H$ is reacted with one or more $R^{AF}$, thereby providing a h* number of $R^{H*}$ and in which h* is h). In another instance, some $R^H$ is reacted with one or more $R^{AF}$, thereby providing a h* number of $R^{H*}$ and in which h*=a<h.

The functional moieties including a cationic moiety, functional moieties including a halo, reactive handles, acidic moieties, electron-withdrawing moieties, and/or functional groups can be substituted or unsubstituted. For example, these groups can be substituted with one or more substitution groups, as described herein for alkyl and/or aryl.

Aryl Groups

The aryl groups herein can have any useful configuration, structure, and substitutions. Exemplary aryl groups (e.g., including arylene groups, such as for $Ar^L$, $Ar^M$, and Ar*) include the following groups, which may be optionally substituted:

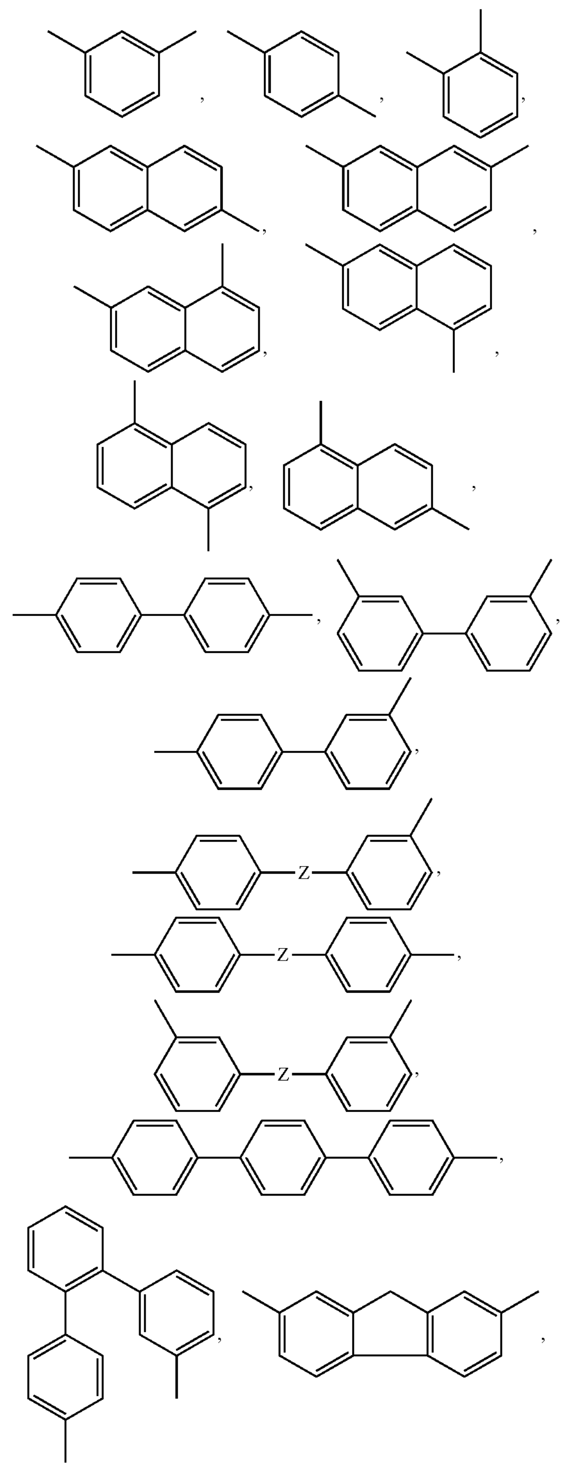

-continued

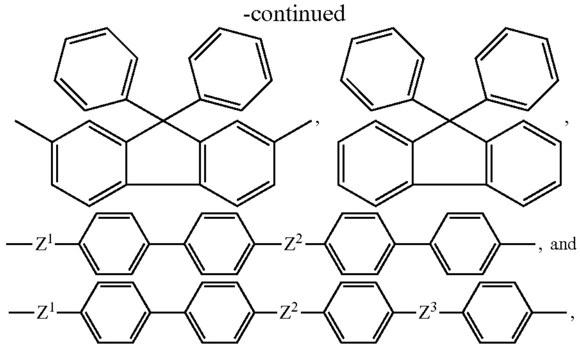

where each of Z, $Z^1$, $Z^2$, and $Z^3$ is, independently, —O—, —S—, —$SO_2$—, optionally substituted alkylene, optionally substituted $C_{1-12}$ alkyleneoxy, optionally substituted $C_{1-12}$ heteroalkylene, optionally substituted $C_{1-12}$ heteroalkyleneoxy, —$CF_2$—, —$CH_2$—, —$OCF_2$—, perfluoroalkylene, perfluoroalkyleneoxy, —$Si(R^i)_2$—, —$P(O)(R^i)$—, —$PR^i$—, —C(O)—, —$C(CF_3)_2$, —$C(CH_3)_2$—, or —$CCF_3$Ph-, and where $R^i$ is H, optionally substituted alkyl, or optionally substituted a methyl, ethyl, isopropyl, t-butyl, or phenyl).

Polymer Salts and Forms Thereof Including a Counter Ion

The present invention includes a salt or a form thereof including a counter ion of any polymer described herein, e.g., a salt or a form thereof including a counter ion of any one of formulas (I), (Ia), (Ib), (Ic), (Id), (Ie), (If), (Ig), (Ih), (Ii), (Ij), (VI), (VIa), (VIb), (VIc), (VId), (VII), (VIII), (VIIIa), and (IX), as well as particular structures provided as structures (I-1), (I-2), (I-3), (I-4), (I-5), (I-6), (I-7), (I-8), (IV-3), (IV-5), (IV-8), (IV-10), and (IV-11). In particular embodiments, the salt is a sodium salt. In other embodiments, the counter ion is an anion (e.g., a chloride anion or a hydroxide anion).

Polymeric Starting Material

Figure 16:
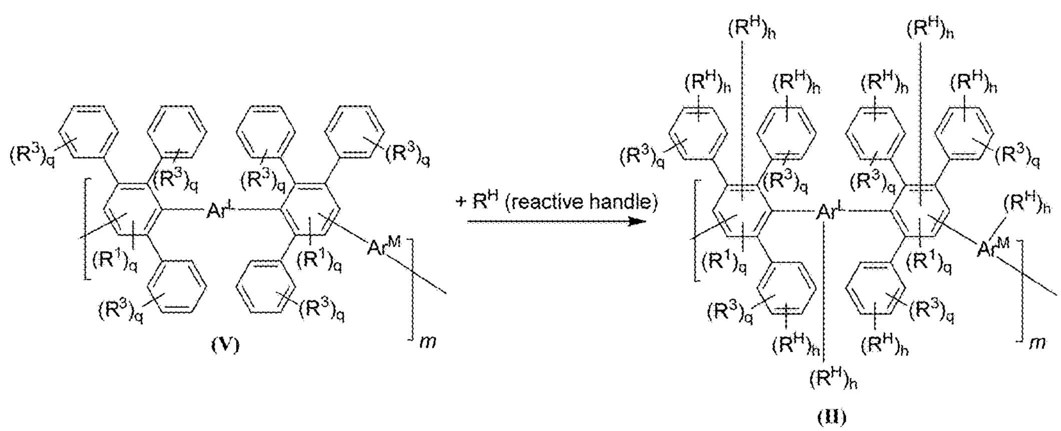
FIG. 16 shows an exemplary reaction scheme for reacting an initial polymer structure having formula (V) in the presence of one or more reactive handles ($R^H$), thereby providing a polymer structure having formula (II) in which $R^H$ can be further reacted with any useful reagent to provide any polymer herein (e.g., polymer structure having formulas (I), (Ia) to (Ij), (I-1) to (I-8), (IV-3), (IV-5), (IV-8), (IV-10), or (IV-11), a salt thereof, or a form thereof including a counter ion). Furthermore, any of the reactive handle $R^H$ in this figure can be reacted with a reagent to provide a $R^{AF}$ group.

Polymers having formula (II) can be employed as a starting material, in which reactive handles $R^H$ can be further reacted to provide functional moieties $R^{AF}$ on polymer having formula (I). As can be seen in FIG. 16, formula (II) is a generic structure encompassing other structures (e.g., formula (IIa)), in which a polymer of formula (II) can be optionally synthesized from an initial polymer of formula (V). The polymer can include any useful number of reactive handles $R^H$ disposed on pendent aryl groups and/or backbone aryl groups. The polymer can include any useful type of reactive handles (e.g., reactive handles $R^H$), as well as any useful number of such handles (e.g., h handles, where h can be 0, 1, 2, 3, 4, or 5, and/or where at least one h is not 0).

The polymer (e.g., of formula (II) or (V)) can include any useful type of pendent substituents (e.g., pendent substituents $R^H$ and/or $R^3$), any useful number of such substituents on each aryl group (e.g., h substituents for $R^H$ and/or q substituents for $R^3$, where each of h and q is, independently, 0, 1, 2, 3, 4, or 5, and/or where at least one h is not 0), any useful backbone structure (e.g., two $R^1$-substituted aryl groups and a bridging group $Ar^L$ optionally including a reactive handle $R^H$), any useful type of backbone substituents (e.g., backbone substituents $R^1$ or $R^H$ disposed on a backbone aryl group), and any useful number of such substituents on each group (e.g., h substituents for $R^H$ and/or q substituents for $R^1$, where each of h and q is, independently, 0, 1, 2, 3, 4, or 5, and/or where at least one h is not 0). Each of bridging group $Ar^L$ and connecting group $Ar^M$ can be any useful bivalent linker (e.g., any described herein). In particular embodiments, each of $Ar^L$ and $Ar^M$ is, independently, includes an optionally substituted arylene group. Furthermore, a polymer can include any useful number of structures of formula (I). In some embodiments, the polymer includes m structures, where m is an integer of from about 1 to 1000 (e.g., from about 1 to 500).

For any structure described herein, each $R^1$ or $R^3$ is, independently, a reactive handle $R^H$, an acidic moiety (e.g., $R^S$, $R^P$, $R^C$, or any described herein), an electron-withdrawing moiety (e.g., $R^F$ or any described herein), or an inert substituent (e.g., H, halo, optionally substituted alkyl, optionally substituted alkoxy, etc.). In some embodiments, each and every $R^1$ is, independently, $R^H$, $R^S$, $R^P$, $R^C$, or $R^E$. In other embodiments, each and every $R^3$ is, independently, $R^H$, $R^S$, $R^P$, $R^C$, or $R^E$.

Figure 17A:
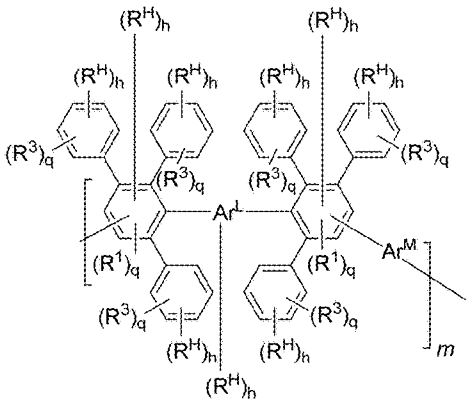
FIG. 17A-17B shows schematics of exemplary polymer structures having one or more reactive handles ($R^H$). Provided are exemplary polymer structures (A) having formulas (IIa) to (IId) and (B) having formulas (IIe) to (IIj). Any of the reactive handle $R^H$ in this figure can be reacted with a reagent to provide a $R^{AF}$ group.
Figure 17A:
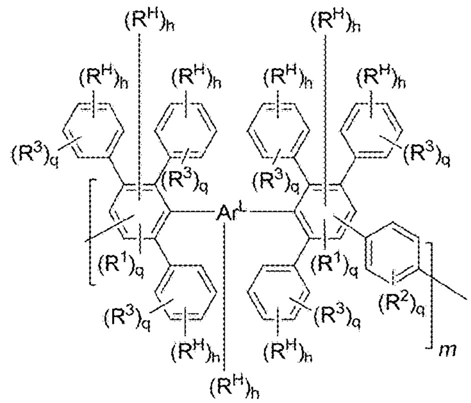
Figure 17A:
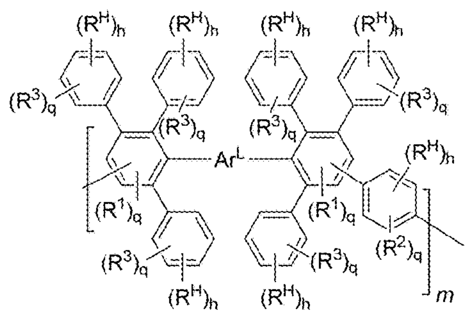
Figure 17A:
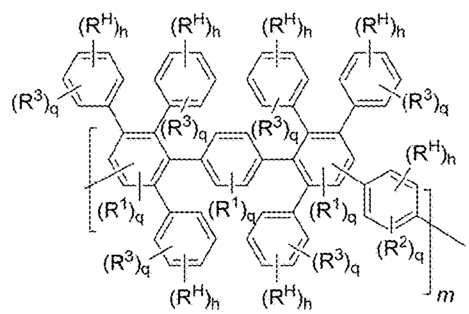

As seen in FIG. 17A, formulas (IIa) to (IId) provide polymers having various combinations of structures for the bridging group $Ar^L$ and the connecting group $Ar^M$. For example, formula (IIa) includes a connecting group $Ar^M$; formula (IIb) includes a connecting group that is a $R^2$-substituted 1,4-phenylene group; formula (IIc) includes a connecting group that is a $R^2$-substituted, $R^H$-substituted 1,4-phenylene group; and formula (IId) includes a bridging group that is a $R^1$-substituted 1,4-phenylene group and a connecting group that is a $R^2$-substituted, $R^H$-substituted 1,4-phenylene group. $R^2$ can be any substituent described herein. In some embodiments, each $R^2$ is, independently, H, halo, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^{AF}$ (e.g., $R^A$ or $R^F$), $R^S$, $R^P$, $R^C$, or $R^E$.

Figure 17B:
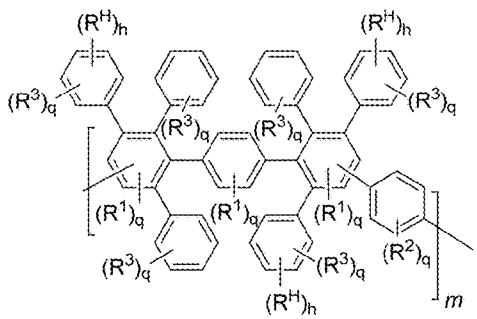
Figure 17B:
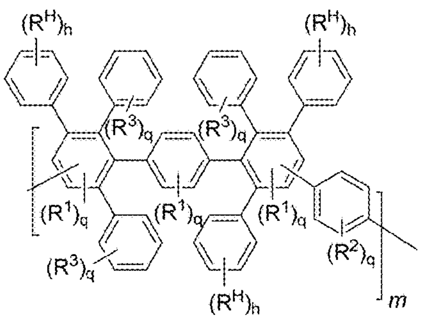
Figure 17B:
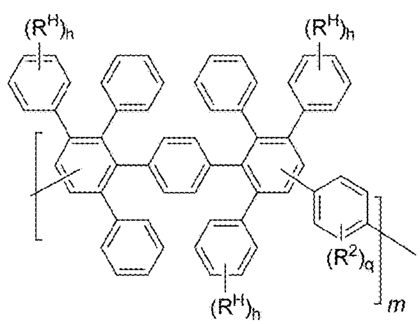
Figure 17B:
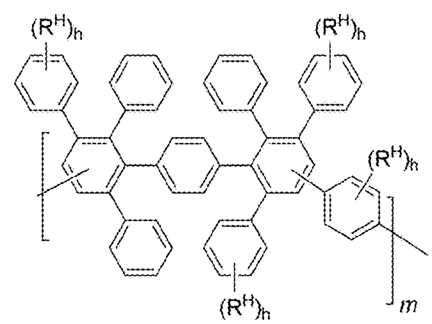
Figure 17B:
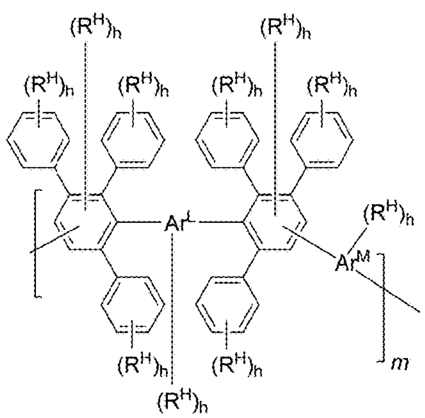
Figure 17B:
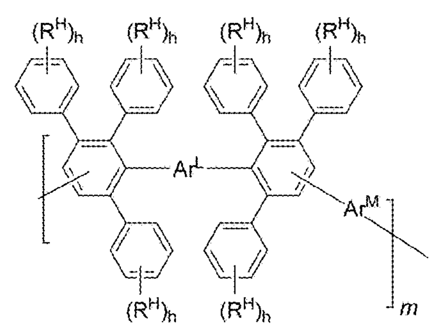

As seen in FIG. 17B, formulas (IIe) to (IIj) provide polymers having various $R^3$ and $R^H$ substituents on pendent aryl groups, as well as various $R^1$ and $R^H$ substituents on backbone aryl groups. For instance, formula (IIe) provides a polymer having both $R^3$ and $R^H$ substituents on some of the pendent aryl groups, whereas formula (IIf) provides a polymer having either $R^3$ or $R^H$ substituents on the pendent aryl groups. In other instances, formulas (IIg) to (IIj) provide polymers having various levels of $R^H$ substitution. As can be seen, formulas (IIg) and (IIh) include $R^H$ substituents on three of the pendent aryl groups. In another instance, formula (IIi) includes $R^H$ substituents on all pendent and backbone aryl groups, whereas formula (IIj) includes $R^H$ substituents on all pendent aryl groups.

Any polymer including an $R^H$ functional moiety can be employed as a starting material (e.g., any described herein, such as in FIGS. 16, 17A-17B, 19A-19C, 20A-20B, 22, 23A-23C, 24, 25A-25C, 26A-26C, 27, 28, and 29) to provide a polymer of formula (I). For instance, $R^H$ can be reacted with a functional agent to provide a functional moiety including a cationic moiety (e.g., an $R^A$ group). Alternatively, an $R^H$ group, if it includes a halo, can serve as a functional moiety including a halo (e.g., an $R^F$ group).

Methods of Making Polymer Structures

The polymers of the invention can be synthesized using any useful scheme. The following synthetic schemes are provided as non-limiting examples.

Figure 8:
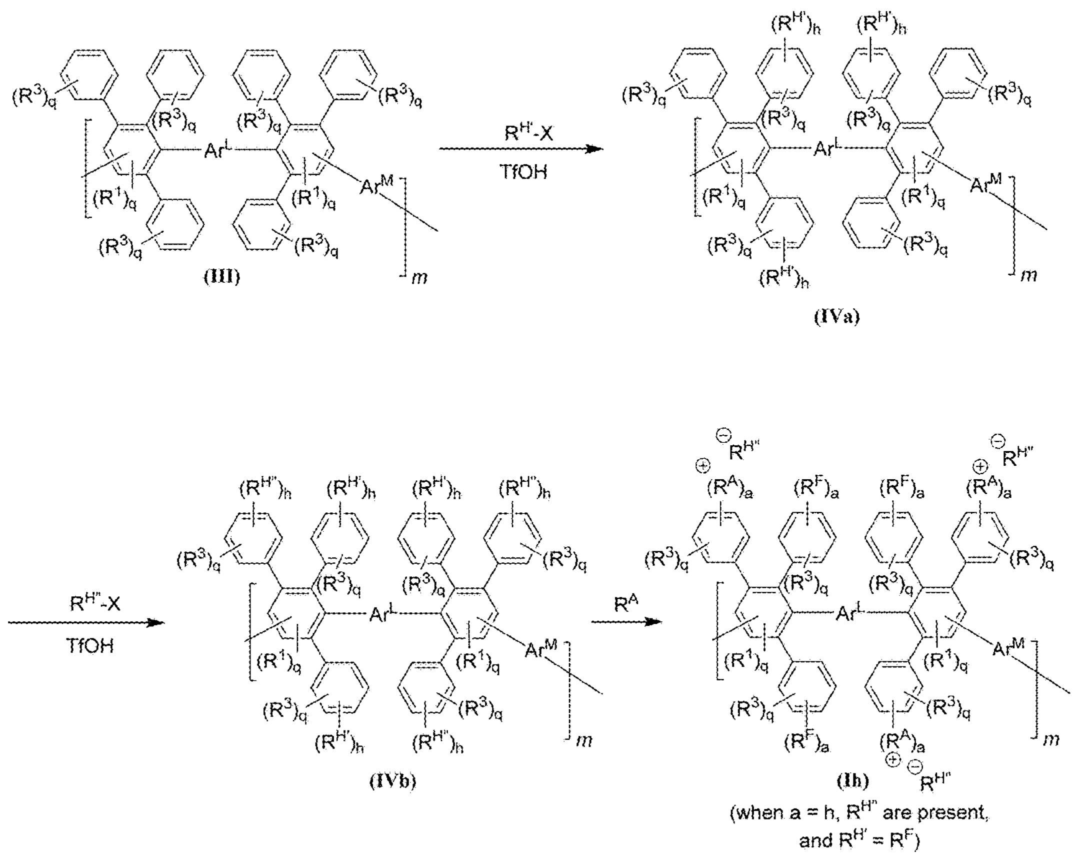
FIG. 8 shows an exemplary reaction scheme to provide the polymer structure of formula (Ih). Provided is a reaction scheme for reacting an initial polymer (III) in the presence of a reagent (e.g., $R^{H'}$—X) to form a reactive polymer (IVa) having three reactive handles $R^{H'}$ appended to three pendent aryl groups. Then, reactive polymer (IVa) is treated with a further reagent (e.g., $R^{H''}$—X) to form a further reactive polymer (IVb) having three other reactive handles $R^{H''}$ appended to three other pendent aryl groups. Finally, polymer (IVb) is treated with a reagent (e.g., $R^{A}$) to form a resultant polymer (Ih) having cationic moieties ($R^{A}$) and halo groups ($R^{F}$, when $R^{H'}$ is chosen to be a chemical moiety having a halo group). In this non-limiting manner, orthogonal chemistries can be installed on the same polymer structure.

FIG. 8 shows an exemplary scheme in which a polymer including reactive handles $R^H$ is further reacted to provide a polymer including functional moieties having cationic moieties $R^A$. As can be seen, an initial polymer (III) is reacted in the presence of a reagent (e.g., $R^{H'}$—X) to form a reactive polymer (IVa) having three reactive handles $R^{H'}$ appended to three pendent aryl groups. Then, reactive polymer (IVa) is treated with a further reagent (e.g., $R^{H''}$—X) to form a further reactive polymer (IVb) having three other reactive handles $R^{H''}$ appended to three other pendent aryl groups.

Finally, polymer (IVb) is treated with a reagent (e.g., $R^A$) to form a resultant polymer (Ih) having cationic moieties ($R^A$) and halo groups when $R^F$, when $R^{H'}$ is chosen to be a chemical moiety having a halo group). In this non-limiting manner, orthogonal chemistries can be installed on the same polymer structure.

In FIG. 8, the steps to install groups $R^{H'}$ and $R^{H''}$ can be combined into a single step or can be combined into a one-pot reaction in any useful order (e.g., in which reagent $R^{H''}$—X is first introduced, and then reagent $R^{H'}$—X is provided). Such groups can be selected to ensure that $R^{H''}$ displays increased reactivity to reagent $R^A$, as compared to $R^{H'}$.

Figure 9A:
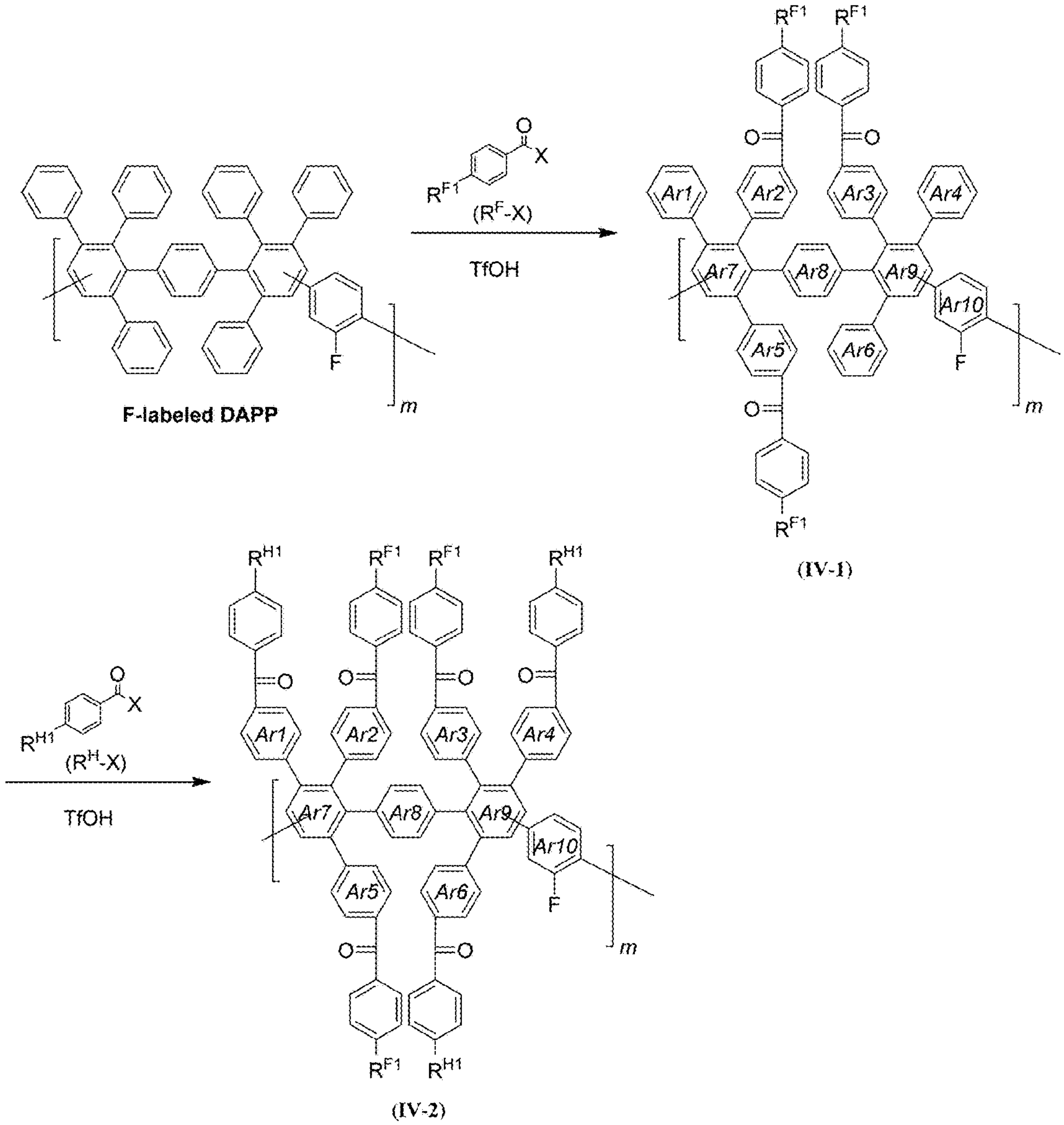
FIG. 9A-9C shows schematics of exemplary reaction schemes to provide polymer structures with one or more substituents including a cationic moiety ($R^{A}$) or a halo group ($R^{F1}$). Provided is (A) an exemplary reaction of a labeled Diels-Alder poly(phenylene) polymer (labeled "F-labeled DAPP") in the presence of a reagent (e.g., $R^{F}$—X, such as $R^{F1}$—Ar—C(O)—X) to form a DAPP (IV-1) having three $R^{F}$ substituents appended on three pendent aryl groups of the DAPP (e.g., in which $R^{F}$ is —C(O)—Ar—$R^{F1}$). Then, DAPP polymer (IV-1) is reacted with a second reagent (e.g., $R^{H}$—X, such as $R^{H1}$—Ar—C(O)—X) to form hydrophobic DAPP (IV-2) having three $R^{H}$ substituents appended on three other pendent aryl groups of the DAPP (e.g., in which $R^{H}$ is —C(O)—Ar—$R^{H1}$). Also provided is (B) a reaction to form a cationic, hydrophobic film using polymer (IV-2), which was provided as a cast film and then reacted in the presence of a reagent (e.g., $R^{A1}$) to provide polymer (IV-3) including cationic moieties (e.g., $R^{A}$ that is —C(O)—Ar—$R^{A1}$, in which $R^{A1}$ is an onium) and halo groups (e.g., $R^{F}$ that is —C(O)—Ar—$R^{F1}$, in which $R^{F1}$ is halo). Alternatively, the reaction includes forming a cation moiety and then casting the polymer, as shown in (C), in which polymer (IV-2) is reacted in the presence of a reagent (e.g., $R^{A1}$) to provide polymer (IV-3) including cationic moieties (e.g., $R^{A}$ that is —C(O)—Ar—$R^{A1}$, in which $R^{A1}$ is an onium) and halo groups (e.g., $R^{F}$ that is —C(O)—Ar—$R^{F1}$, in which $R^{F1}$ is halo). Then, polymer (IV-3) is cast as film. In any embodiment herein, the anion is $R^{H1}$. Alternatively, an anion exchange reaction can be conducted, thereby swapping $R^{H1}$ for any other useful anion (e.g., any described herein).
Figure 9B:
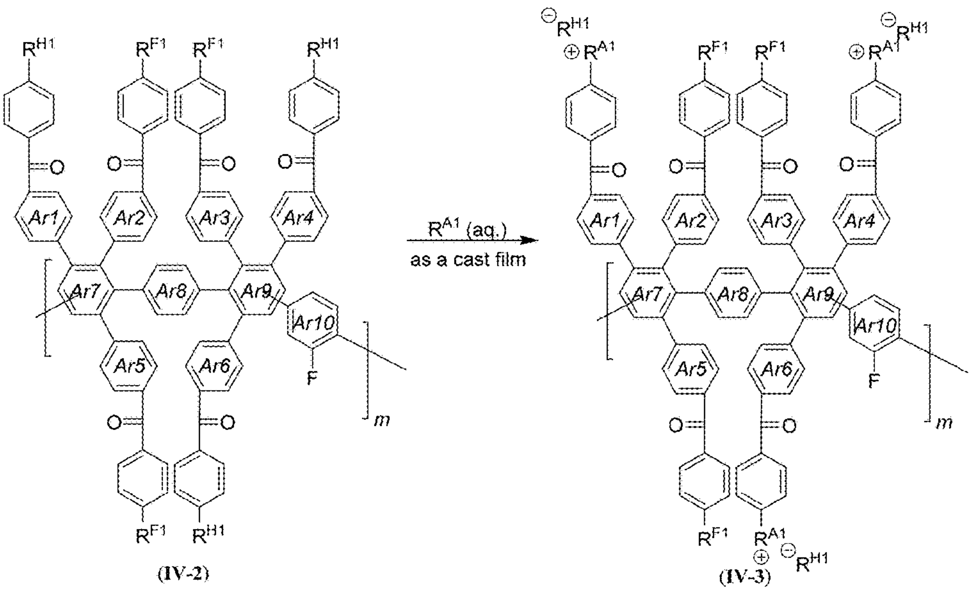
Figure 9C:
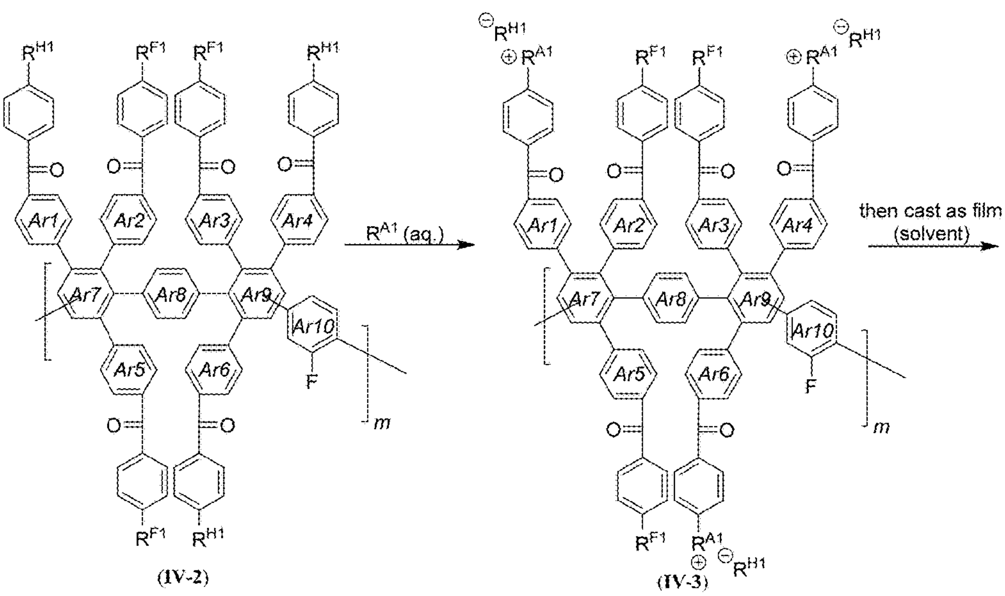

FIG. 9A-9C shows exemplary schemes for providing a functional moiety $R^{F1}$ on a poly(phenylene)-based polymer. FIG. 9A shows an exemplary reaction of a labeled Diels-Alder poly(phenylene) polymer in the presence of a reagent (e.g., $R^F$—X, such as $R^{F1}$—Ar—C—(O)—X) to form a DAPP (IV-1) having three $R^F$ substituents appended on three pendent aryl groups of the DAPP (e.g., in which $R^F$ is —C(O)—Ar—$R^{F1}$). Then, DAPP polymer (IV-1) is reacted with a second reagent (e.g., $R^H$—X, such as $R^{H1}$—Ar—C(O)—X) to form hydrophobic DAPP (IV-2) having three $R^H$ substituents appended on three other pendent aryl groups of the DAPP (e.g., in which $R^H$ is —C(O)—Ar—$R^{H1}$).

A functionalized polymer can be further reacted in any useful manner to provide a cationic, hydrophobic polymer (e.g., as a film). For instance, FIG. 9B shows hydrophobic polymer (IV-2), which was provided as a cast film and then reacted in the presence of a reagent (e.g., $R^{A1}$) to provide polymer (IV-3) including cationic moieties (e.g., $R^A$ or $R^{A1}$) and halo groups (e.g., $R^F$ or $R^{F1}$). Alternatively, FIG. 9C shows a polymer in which a cation moiety is formed and then the resultant polymer is then cast. As can be seen, polymer (IV-2) is reacted in the presence of a reagent (e.g., $R^{A1}$) to provide polymer (IV-3) including cationic moieties (e.g., $R^A$ or $R^{A1}$) and halo groups (e.g., $R^F$ or $R^{F1}$). Then, polymer (IV-3) is cast as film. Furthermore, an anion exchange reaction can be conducted, thereby swapping $R^{H1}$ for any other useful anion (e.g., any described herein).

Figure 10:
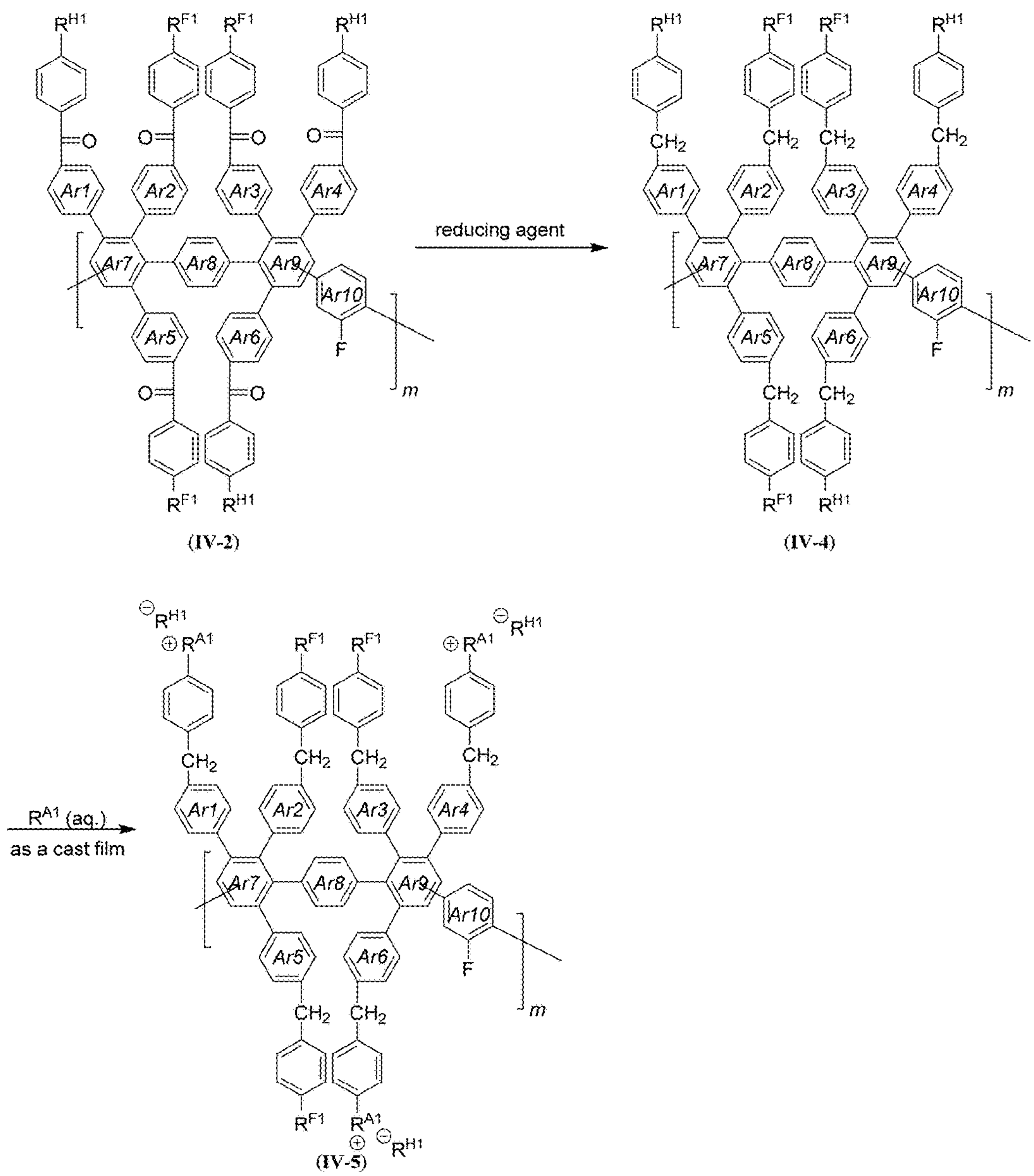
FIG. 10 shows a schematic of an exemplary reaction scheme to provide polymer structure (IV-5). Provided is an exemplary reaction of a hydrophobic DAPP (IV-2) having three $R^H$ substituents appended on three pendent aryl groups of the DAPP (e.g., in which $R^H$ is —C(O)—Ar—$R^{H1}$) and three $R^F$ substituents appended on three other pendent aryl groups (e.g., in which $R^F$ is —C(O)—Ar—$R^{F1}$). Additional reaction steps can be conducted to modify the linker. In one instance, under reducing conditions, the carbonyl linker (—C(O)—) is reduced to a methylene linker (—$CH_2$—), thereby providing polymer (IV-4). This polymer is then reacted in the presence of a reagent (e.g., $R^{A1}$) to provide polymer (IV-5) including cationic moieties $R^A$ that is —$CH_2$—Ar—$R^{A1}$, in which $R^{A1}$ is an onium) and halo groups (e.g., $R^F$ that is —$CH_2$—Ar—$R^{F1}$, in which $R^{F1}$ is halo). Polymer (IV-4) can be cast as film and then reacted with a reagent $R^{A1}$. Alternatively, polymer (IV-5) can be cast as the film.

A functional group present on a polymer can be further reacted in any useful manner. In one instance, the linker includes an oxo group, which can be reduced with any useful reducing agent. As seen in FIG. 10, a polymer (IV-2) can include a carbonyl group, which can be reduced to a methylene group to provide polymer (IV-4). Furthermore, the polymer can be provided as a cast film and then reacted with an amine (reagent $R^A$) to provide a polymer (IV-5) including a plurality of cationic moieties.

Scheme I

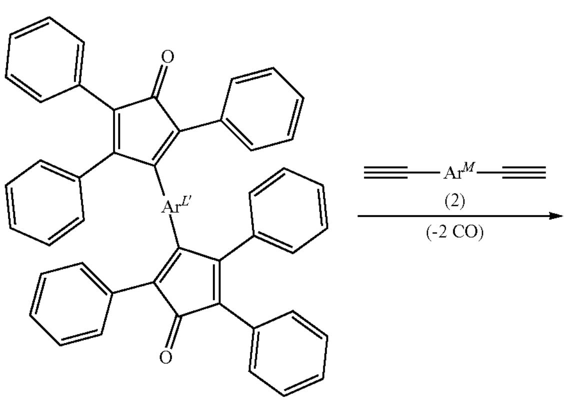

(1)

-continued

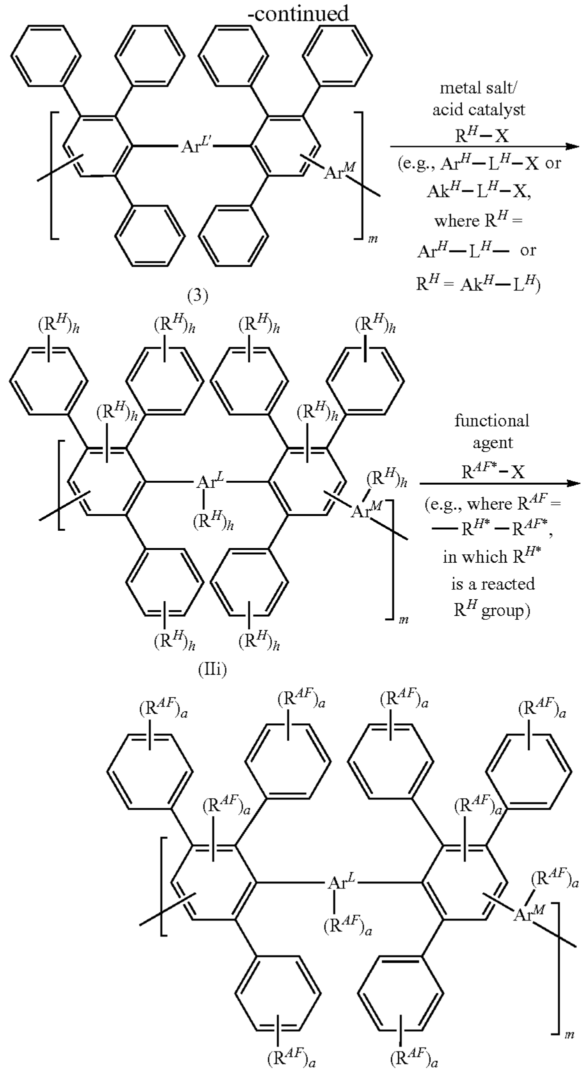

(IXa)

As shown in Scheme I, the polymer of formula (IXa) can be formed by reacting a polymer of formula (IIi) having reactive handles, in which polymer (IIi) in turn can be formed by performing a Diels-Alder reaction to form the pendent and backbone aryl groups, and then performing a first substitution reaction to introduce $R^H$ to the parent structure. These steps are described in more detail below.

First, a Diels-Alder reaction can be performed with an optionally substituted diene, such as a 1,4-bis-(2,4,5-triphenylcyclopentadienone)arylene reagent (1), with an optionally substituted dienophile, such as a diethynylarylene reagent (2). This reaction provides a Diels-Alder poly(phenylene) polymer (DAPP) (3). As can be seen, in this step, the number of subunits m is controlled by the stoichiometry of reagents (1) and (2).

Second, a substitution reaction is performed with reagent $R^H$—X with the DAPP product (3) to provide a substituted polymer (IIi), where X is any useful leaving group (e.g., halo, hydroxyl, or sulfonate, such as mesylate, tosylate, or triflate) and $R^H$ is any described herein (e.g., $R^H$ can be -$L^H$-$Ar^H$ or -$L^H$-$Ak^H$).

The concentration of $R^H$—X can be controlled to provide the desired extent of substitution on the DAPP pendent and/or backbone aryl groups. As can be seen, the number of $R^H$ substituents h on each aryl group can be controlled by the stoichiometry of reagent $R^H$—X and (DAPP) (3). In one instance, concentration can be controlled in order to install $R^H$ substituents on readily accessible pendent aryl groups. The reaction can be conducted until completion in order to access the backbone aryl groups, which are sterically more difficult to functionalize.

Optionally, the substitution reaction with reagent $R^H$—X is performed in the presence of a metal salt and/or in the presence of an acid. Exemplary metal salts include M[O($SO_2$—$R^{MF}$)], M[N($SO_2$—$R^{MF}$)$_2$], or M[C($SO_2$—$R^{MF}$)$_3$], where $R^{MF}$ is optionally substituted alkyl, optionally substituted aryl, optionally substituted alkaryl, optionally substituted haloalkyl, or perfluoroalkyl, and where M is Ag, Al, Ba, Bi, Ca, Cu, In, Re, Sc, Sn, Ti, Y, Yb, or Zn. Particular embodiments of metal salts include M[OTf]$_{mf}$, where mf is an integer from 1 to 3 and where M is Ag, Al, Ba, Bi, Ca, Cu, In, Sc, Y, or Yb; as well as M[NTf$_2$]$_{mf}$, where mf is an integer from 1 to 3 and where M is Ag, Al, Sn, Ti, Yb, or Zn.

Exemplary acids include a Lewis acid or a Bronsted acid that acts as a catalyst, such as, e.g., HO($SO_2$—$R^{AF}$), HO($SO_2$—$R^{Ar}$), HO($SO_2$F), HO($SO_2$—$R^{Ar}$), and HO(C(O)—$R^{AF}$), where $R^{AF}$ is optionally substituted alkyl, optionally substituted aryl, optionally substituted alkaryl, optionally substituted haloalkyl, or perfluoroalkyl, and where $R^{Ar}$ is optionally substituted aryl or optionally substituted alkaryl. Particular embodiments of acids include HO($SO_2CF_3$), HO($SO_2$F), $H_2SO_4$, HO($SO_2$-(p-$CH_3$)Ph), or HO($COCF_3$).

Third, a substitution reaction is performed to react a reactive handle $R^H$ in the presence of a functional agent $R^{AF*}$—X, thereby providing a functional group $R^{AF}$. As seen in formula (IXa), $R^{AF}$ is formed by a reacted $R^H$ group (indicated by $R^{H*}$) that is appended by a reacted functional moiety $R^{AF*}$. In one non-limiting example, the reactive group $R^H$ can be a -Ph-$CH_2$Cl group that is reacted with an amine $NR^{N1}$—$R^{N2}R^{N3}$ (e.g., where each of $R^{N1}$ and $R^{N2}$ and $R^{N3}$ is, independently, H or optionally substituted alkyl, or $R^{N1}$ and $R^{N2}$, taken together with the nitrogen atom to which each are attached, form a heterocyclyl group, as defined herein), thereby providing an $R^{AF}$ moiety of -Ph-$CH_2$—$NR^{N1}R^{N2}R^{N3}$, in which reacted $R^{H*}$ is -Ph-$CH_2$— and reacted $R^{AF*}$ is —$NR^{N1}R^{N2}R^{N3}$.

Scheme II

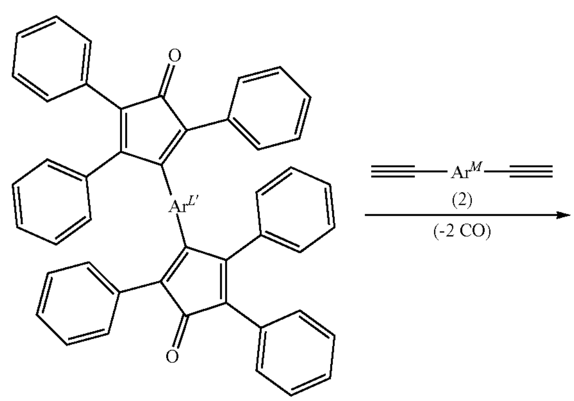

(1)

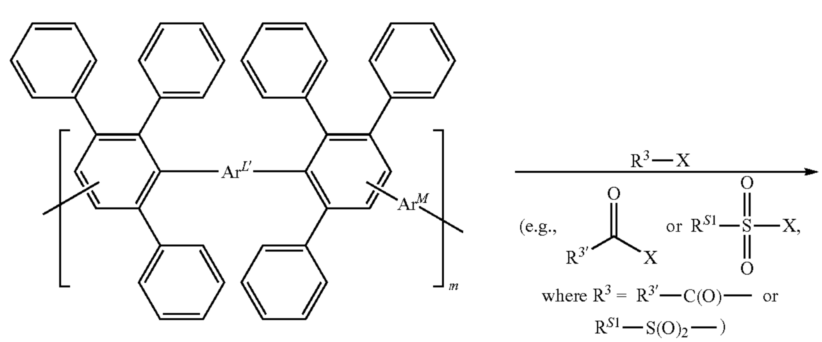

(3)

-continued

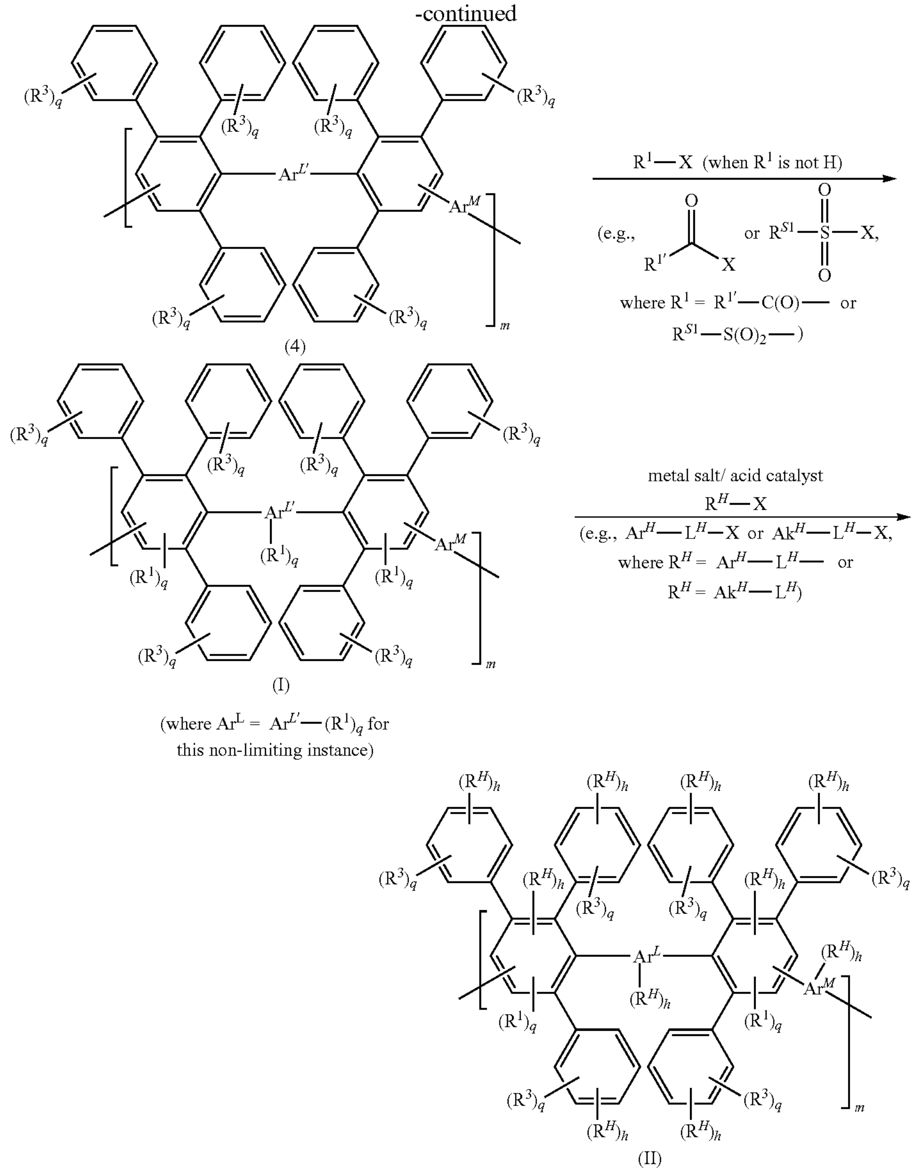

As shown in Scheme II, the polymer of formula (II) can be formed by performing a Diels-Alder reaction to form the pendent and backbone aryl groups, performing a first substitution reaction to introduce $R^3$ to the parent structure, performing a second substitution reaction to introduce $R^1$, and performing a final substitution reaction to introduce $R^H$. Polymer (II), in turn, can be reacted (e.g., by way of a substitution or replacement reaction) with a functional agent to provide a polymer of formula (I). The four steps to provide formula (II) are described in more detail below.

Similar to Scheme I, the first step in Scheme II includes a Diels-Alder reaction that is performed with an optionally substituted diene, such as a 1,4-bis-(2,4,5-triphenyl cyclopentadienone)arylene reagent (1), in the presence of an optionally substituted dienophile, such as a diethynylarylene reagent (2). This reaction provides a Diels-Alder poly(phenylene) polymer (DAPP) (3).

The second step includes an initial substitution reaction, which is performed with reagent $R^3$—X in the presence of the DAPP product (3), thereby providing a substituted polymer (4). For reagent $R^3$—X, X is any useful leaving group (e.g., halo, hydroxyl, or sulfonate, such as mesylate, tosylate, or triflate) and $R^3$ is any described herein.

The third step includes a second substitution reaction, which is performed with reagent $R^1$—X in the presence of the substituted polymer (4) to provide the desired polymer of formula (I). For reagent $R^1$—X, X is any useful leaving group (e.g., halo, hydroxyl, or sulfonate, such as mesylate, tosylate, or triflate), and $R^1$ is any described herein.

Finally, the fourth step includes a third substitution reaction, which is performed with reagent $R^H$—X in the presence of the DAPP product (3) to provide a substituted polymer (II). For reagent $R^H$—X, X is any useful leaving group (e.g., halo, hydroxyl, or sulfonate, such as mesylate, tosylate, or triflate), and $R^H$ is any described herein (e.g., $R^H$ can be -$L^H$-$Ar^H$ or -$L^H$-$Ak^H$).

The three substitution steps (i.e., the second, third, and fourth steps) can be performed in any order to obtain the desired substitution pattern. Of course, if $R^3$ and $R^1$ are the same substituents, then only one of the substitution reaction steps can be conducted. Alternatively, one or more steps may be required to install $R^1$ or $R^3$ on the parent molecule. For instance, when $R^1$ or $R^3$ is $—SO_2—NR^{N1}—R^{S2}$, multiple steps may be required to first install the $—SO_2—$ functional group on the parent molecule. Then, this functional group may be activated (e.g., by forming a sulfonyl halide, such as sulfonyl chloride) and reacted with an amine (e.g., $NHR^{N1}—R^{S2}$).

In another instance, an additional step may be required to install the functional group. For example, when $R^1$ or $R^3$ includes two sulfonyl groups, such as in $—SO_2—NR^{N1}—SO_2—R^{S2'}$, then sulfonyl groups can be attached sequentially. In one example, the method includes installing the first $—SO_2—$ functional group on the parent molecule and then reacted with a primary amine, such as $NH_2R^{N1}$, thereby providing a parent molecule having a $—SO_2—NHR^{N1}$ sulfonamide group. This sulfonamide can then be reacted with an activated sulfonyl agent, e.g., a $Cl—SO_2—R^{S2'}$ agent, where $R^{S2'}$ is an optionally substituted $C_{1-12}$ alkyl, thereby providing an $R^S$ moiety of $—SO_2—NR^{N1}—SO_2—R^{S2'}$ on the polymer.

In yet another instance, when $R^1$ or $R^3$ is $—R^{PA}—P(O)<(R^{P1}R^{P2}$, multiple steps may be required to first install the $R^{PA}$ alkylene or heteroalkylene on the parent molecule, and then to later install the $—P(O)<R^{P1}R^{P2}$ group on the alkylene or heteroalkylene molecule. Furthermore, if $R^{P1}$ or $R^{P2}$ is an alkoxy or aryloxy group, then additional step may be required to modify a hydroxyl group attached to the phosphorous atom with an alkoxy or aryloxy group. A skilled artisan would understand that additional modifications or step can be employed to arrive at the desired structure.

Exemplary $R^1—X$ and $R^3—X$ reagents include $HSO_3Cl$, $H_2SO_4$, $PCl_3$, $POCl_3$, $H_3PO_4$, $SO_3$, fuming sulfuric acid, thionyl chloride, trimethylsilyl chlorosulfonate, dialkyl phosphites (e.g., diethyl phosphate with an optional catalyst, such as a Pd(0) catalyst), phosphines (e.g., tertiary phosphines), phosphoric acids (e.g., hypophosphorous acids, phosphonic acids, phosphinic acids, etc.), aryl halide (e.g., RX, where R is an optionally substituted aryl group, as defined herein, and X is halo), aryl halide (e.g., RX, where R is an optionally substituted aryloyl group, as defined herein, and X is halo, such as trifluorobenzoyl chloride), protein kinase (e.g., to install a phosphoryl group), phosphonoxyphenols, as well as mixtures thereof.

Scheme III

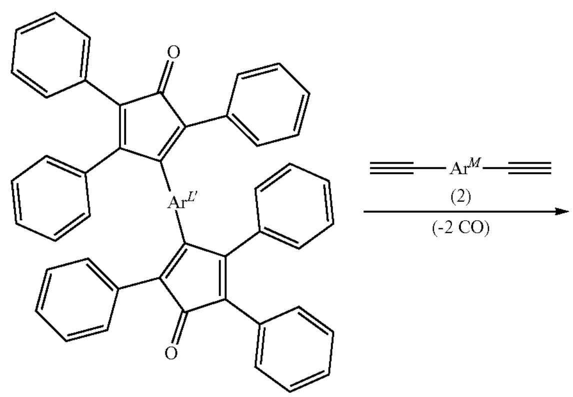

(1)

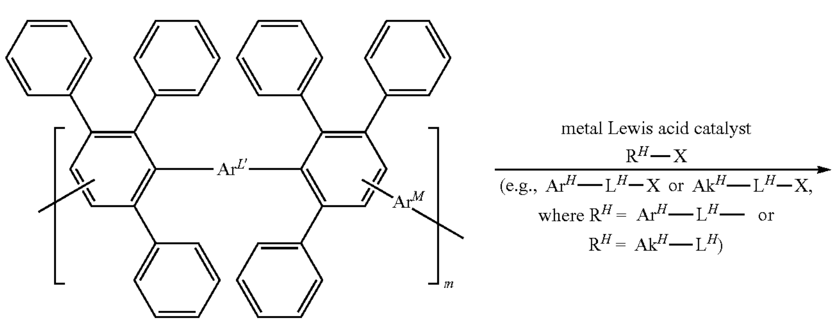

(3)

-continued

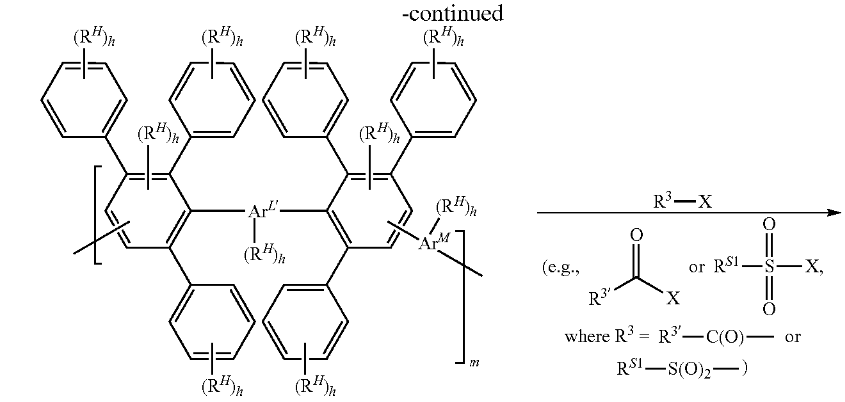

(5)

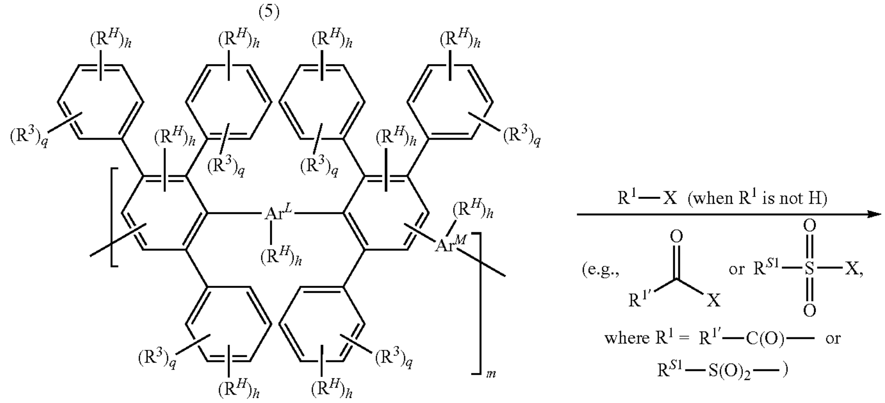

(6)

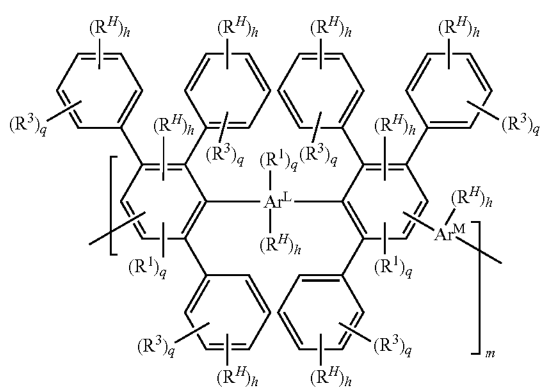

(II)

(where $Ar^L = Ar^{L'}—(R^1)_q$ for this non-limiting instance)

As discussed herein, the substitution steps can be performed in any useful order. In one non-limiting instance, the reaction scheme includes introducing one or more reactive handles $R^H$, and then introducing other substitution groups (e.g., $R^1$ and/or $R^3$). As shown in Scheme III, the polymer of formula (II) can be formed by performing a Diels-Alder reaction to form the pendent and backbone aryl groups, performing a first substitution reaction to introduce $R^H$, performing a second substitution reaction to introduce $R^3$ to the parent structure, and performing a final substitution reaction to introduce $R^1$. In one instance, the substitution steps including $R^3$ and $R^1$ can be conducted in the opposite order. These four steps are described in more detail below.

Similar to Schemes I and II, the first step in Scheme III includes a Diels-Alder reaction that is performed with an optionally substituted diene, such as a 1,4-bis-(2,4,5-triphenyl cyclopentadienone)arylene reagent (1), in the presence of an optionally substituted dienophile, such as a diethynylarylene reagent (2). This reaction provides a Diels-Alder poly(phenylene) polymer (DAPP) (3).

The second step includes a first substitution reaction, which is performed with reagent $R^H$—X in the presence of the DAPP product (3) to provide a $R^H$-substituted polymer (5). For reagent $R^H$—X, X is any useful leaving group (e.g., halo, hydroxyl, or sulfonate, such as mesylate, tosylate, or triflate), and $R^H$ is any described herein (e.g., $R^H$ can be $-L^H-Ar^H$ or $-L^H-Ak^H$).

The third step includes a second substitution reaction, which is performed with reagent $R^3$—X in the presence of the $R^H$-substituted polymer (5), thereby providing a $R^H$—, $R^3$-substituted polymer (6). For reagent $R^3$—X, X is any useful leaving group (e.g., halo, hydroxyl, or sulfonate, such as mesylate, tosylate, or triflate) and $R^3$ is any described herein.

Finally, the fourth step includes a third substitution reaction, which is performed with reagent $R^1$—X in the presence of the $R^H$—, $R^3$-substituted polymer (6) to provide the desired polymer of formula (II). For reagent $R^1$—X, X is any useful leaving group (e.g., halo, hydroxyl, or sulfonate, such as mesylate, tosylate, or triflate), and $R^1$ is any described herein.

Scheme IV

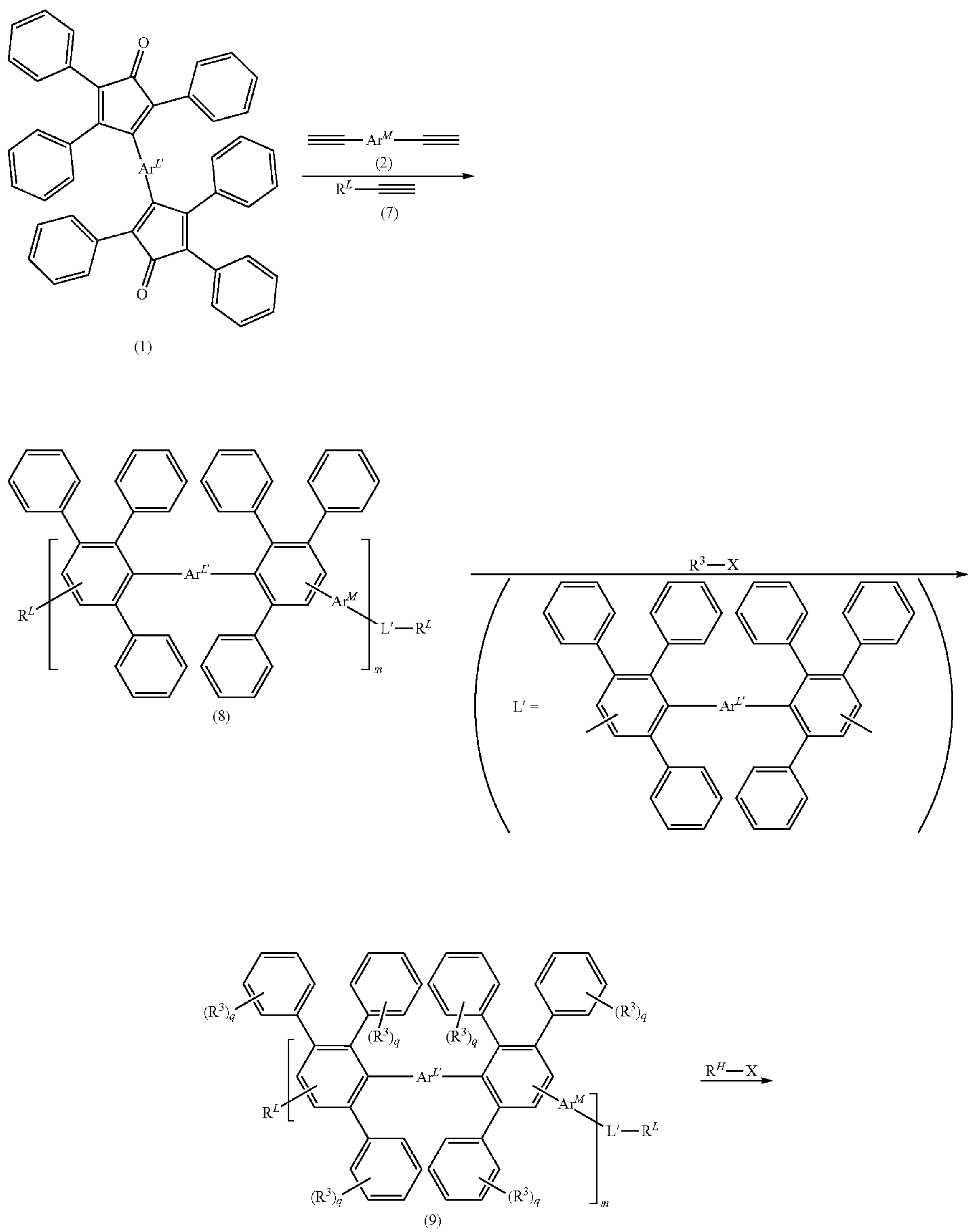

-continued

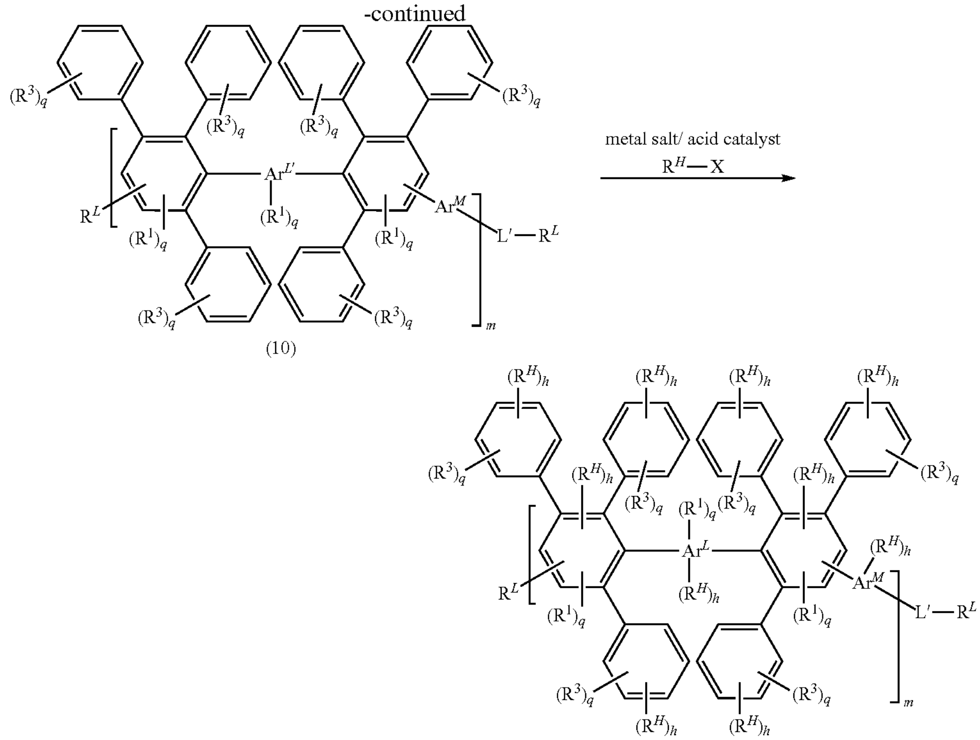

(10)

(12)

(where $Ar^L = Ar^{L'}$—$(R^1)_q$ for this non-limiting instance)

As shown in Scheme IV, the polymer reagent of formula (12) can be formed by performing a Diels-Alder reaction to form the pendent and backbone aryl groups and to install reactive end groups $R^L$. Then, substitution reactions can be performed in order to introduce $R^3$, $R^1$, and/or $R^H$. These three steps are described in more detail below.

Similar to that of Scheme I, the first segment is formed by performing a Diels-Alder reaction with a 1,4-bis-(2,4,5-triphenylcyclopentadienone)arylene reagent (1) and a diethynylarylene reagent (2).

To further install reactive end groups, the Diels-Alder reaction is also performed in the presence of a monoethynylarylene reagent (7). As can be seen, because reagent (2) includes two dienophile groups (i.e., two ethynyl groups), this reagent can react with two diene molecules (1), where the product of this reaction can further propagate the polymerization reaction. In contrast, reagent (7) includes only one dienophile group, and therefore terminates the polymerization reaction and provides a polymer reagent (8) having a terminal reactive end group $R^L$. Additional methods for installing reactive end groups are described in U.S. Pat. No. 8,110,636, which is incorporated herein by reference in its entirety.

Then, substitution reaction(s) can be performed. In Scheme IV, the substitution reactions are provided as three steps performed first with reagent $R^3$—X (e.g., as described herein) in the presence of an unsubstituted polymer (8) to form a further polymer (9), then with reagent $R^1$—X (e.g., as described herein) to form a further polymer (10), and finally with reagent $R^H$—X (e.g., as described herein) to form polymer reagent (12). If $R^3$ and $R^1$ are the same substituents, then a single substitution reaction step can be conducted. If $R^3$ and $R^1$ are different, then these substituents can be added in any desired order. A skilled artisan would understand that other modifications could be made to form the desired polymer reagent (12). In exemplary Scheme IV, $Ar^L$ in formula (12) is $Ar^{L'}$—$(R_1)_q$, which is a non-limiting embodiment.

Methods of making the polymer also include preparing an initial polymer having one or more $R^1$ and/or $R^3$ substituents, and then installing one or more $R^H$ on one or more pendent and/or backbone aryl groups. As seen in FIG. 23A, in one instance, the initial polymer is a sulfonated DAPP polymer (SDAPP) having one or more sulfo groups (e.g., on one or more pendent aryl groups), which can then be reacted with reagent $R^H$—X to install one or more $R^H$ substituents on that SDAPP polymer. As also seen in FIG. 23A, in another instance, the initial polymer is a fully sulfonated DAPP polymer (FS-DAPP) having one or more sulfo groups (e.g., on one or more pendent aryl groups and on one or more backbone aryl groups), which can then be reacted with reagent $R^H$—X to install one or more $R^H$ substituents on that FS-DAPP polymer.

In another instance, a precursor of the polymer herein (e.g., a polymer having a structure of formula (I)) is prepared as a membrane, and further functionalization is conducted to include one or more $R^H$, $R^1$, and/or $R^3$ substituents by reacting the membrane with one or more reagents to install such substituents.

Any reactions herein can be conducted with any useful reagent, solvent, or conditions. An example of reagent (1) includes 1,4-bis-(2,4,5-triphenylcyclopentadienone)benzene, and an example of reagent (2) includes diethynylbenzene reagent. Exemplary solvents useful for Diels-Alder and substitution reactions include an ether (e.g., diphenyl ether), methylene chloride, dichloroethane, etc. Salts of any polymers can be obtained by reacting any product with a suitable acid or base to obtain the desired acid or base addition salt. Furthermore, additional reaction steps can be conducted to further purify, test, or use any polymer herein.

Additional details on synthesis are described in Fujimoto C H et at, "Ionomeric poly(phenylene) prepared by Diels-Alder polymerization: Synthesis and physical properties of a novel polyelectrolyte," *Macromolecules* 2005; 38:5010-6, Lim Y et al., "Synthesis and properties of sulfonated poly (phenylene sulfone)s without ether linkage by Diels-Alder reaction for PEMFC application," *Electrochim. Acta* 2014; 119:16-23, Hibbs M R et al., "Synthesis and characterization of poly(phenylene)-based anion exchange membranes for alkaline fuel cells," *Macromolecules* 2009; 42:8316-21, Jakoby K et al., "Palladium-catalyzed phosphonation of polyphenylsulfone,"*Macromol. Chem. Phys.* 2003; 204:61-7, Parcero E et al., "Phosphonated and sulfonated polyphenylsulfone membranes for fuel cell application," *J. Membr. Sci.* 2006; 285:206-13, Poppe D et al., "Carboxylated and sulfonated poly(arylene-co-arylene sulfone)s: thermostable polyelectrolytes for fuel cell applications," *Macromolecules* 2002; 35:7936-41, Akiko O et al., "Electrophilic aromatic aroylation with $CF_3$-bearing arenecarboxylic acid derivatives: Reaction behavior and acidic mediator dependence," *Synth. Commun.* 2007; 37:2701-15, Jang D O et al., "Highly selective catalytic Friedel-Crafts acylation and sulfonylation of activated aromatic compounds using indium metal," *Tetrahedron Lett.* 2006; 47:6063-6, Skalski T J G et al., "Structurally-defined, sulfo-phenylated, oligophenylenes and polyphenylenes," *J. Am. Chem. Soc.* 2015; 137(38): 12223-6, Kobayashi S et al., "Catalytic Friedel-Crafts acylation of benzene, chlorobenzene, and fluorobenzene using a novel catalyst system, hafnium triflate and trifluoromethanesulfonic acid," *Tetrahedron Lett.* 1998; 39:4697-700, Noji M et al., "Secondary benzylation using benzyl alcohols catalyzed by lanthanoid, scandium, and hafnium triflate," *J. Org. Chem.* 2003; 68:9340-7, Singh R P et al., "An efficient method for aromatic Friedel-Crafts alkylation, acylation, benzoylation, and sulfonylation reactions," *Tetrahedron* 2001; 57:241-7, Ellenberger F et al., "Trifluoromethanesulfonic-carboxylic anhydrides, highly active acylation agents," *Angew. Chem. Int'l Ed* 1972; 11(4):299-300, Effenberger F et al., "Catalytic Friedel-Crafts acylation of aromatic compounds," *Angew. Chem. Int'l Ed,* 1972; 11(4): 300-1, and Rakira P E, "Triflic acid and its derivatives: a family of useful reagents for synthesis," *Chem. Today* 2004 May/April:48-50, as well as U.S. Pat. Nos. 8,809,483, 8,110,636 and 7,301,002, each of which is incorporated herein by reference in its entirety.

Uses

The polymers of the invention can be used in a variety of electrochemical applications. For instance, any polymer herein can be prepared as a membrane (e.g., by casting), and the membrane (e.g., a proton exchange membrane) can be incorporated into any device. In another instance, a precursor of the polymer herein (e.g., a polymer having a structure of formula (I)) is prepared as a membrane (e.g., an anion exchange membrane), and further functionalization is conducted to include one or more $R^{AF}$ (e.g., $R^A$ and/or $R^F$), $R^H$, $R^1$, and/or $R^3$ substituents by reacting the membrane with one or more reagents to install such substituents.

Exemplary devices include fuel cells (e.g., automotive fuel cells, hydrogen fuel cells, or direct methanol fuel cells), flow batteries (e.g., redox flow batteries, such as vanadium redox flow batteries), electrolyzers, electrochemical hydrogen production devices, etc. The membranes can be used for any use, such as a proton exchange membrane, an anion exchange membrane, an ion exchange resin, a polymer separator, etc. In addition, the membranes can be in any useful form, such as a hydrogel. Membranes formed from the polymers herein can, in some instances, display enhanced properties, such as enhanced ion exchange capacity, decreased water uptake, and/or enhanced durability (e.g., as determined by stress-strain measurements). Methods of forming and testing membranes are described in Fujimoto C H et al., *Macromolecules* 2005; 38:5010-6, Lim Y et al., *Electrochim. Acta* 2014; 119:16-23, Sun C-N et al., "Evaluation of Diels-Alder poly(phenylene) anion exchange membranes in all-vanadium redox flow batteries," *Electrochem. Commun.* 2014; 43:63-6, Merle G et al., "Anion exchange membranes for alkaline fuel cells: A review," *J. Membrane Sci.* 2011; 377:1-35, Stanis R J et al., "Evaluation of hydrogen and methanol fuel cell performance of sulfonated Diels Alder poly(phenylene) membranes," *J. Power Sci.* 2010; 195:104-10, and Fujimoto C et al., "Vanadium redox flow battery efficiency and durability studies of sulfonated Diels Alder poly(phenylene)s," *Electrochem. Commun.* 2012; 20:48-51, as well as U.S. Pat. Nos. 8,809,483, 8,110,636, and 7,888,397, each of which is incorporated herein by reference in its entirety.

EXAMPLES

Example 1: Fluorine-Containing Anion Exchange Membranes

Anionic exchange membranes generally employ materials having a cationic charge in order to bind to anions. However, one recent hurdle in use of such anion exchange membranes in fuel cells has been the high water affinity of these materials due to the cationic charge. High water affinity results in poor fuel cell performance at high current density since the water created in the fuel cell is not rejected, and then blocks incoming hydrogen and air from reaching the catalytic sites. This results in flooding. We proposed using halo groups (e.g., fluoro) within the anion exchange polymer structure, which should improve the hydrophobic properties and resist flooding problems. One synthesis issue is that fluorine incorporation is typically difficult and require multi-step reactions.

Figure 11:
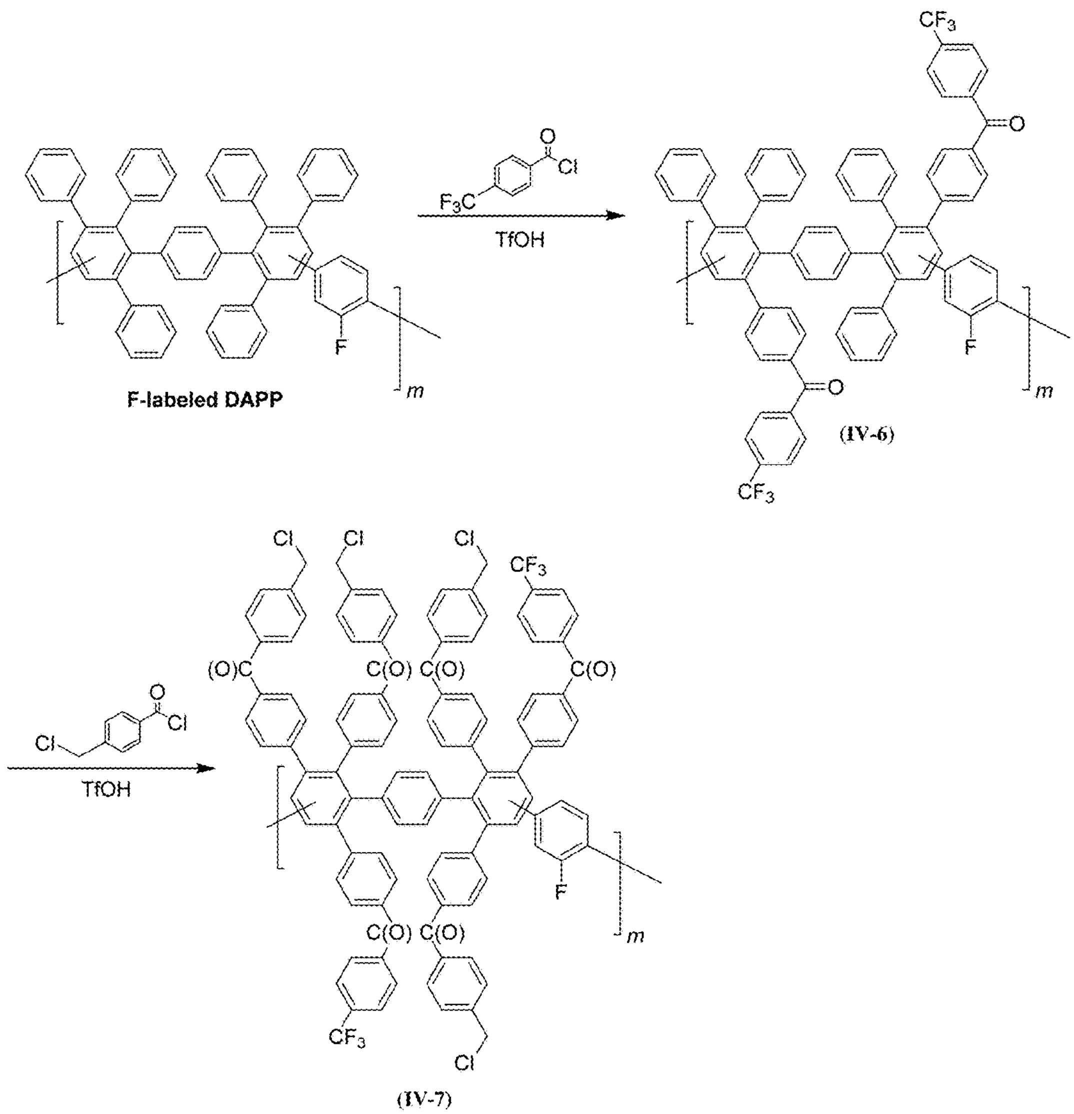
FIG. 11 shows a schematic of an exemplary reaction scheme to provide polymer structure (IV-7). Provided is an exemplary reaction of a labeled Diels-Alder poly(phenylene) polymer (labeled "F-labeled DAPP") in the presence of a reagent (e.g., $R^{H1}$—X, such as $CF_3$—Ar—C(O)—Cl) to form a DAPP (IV-6) having two reactive handles $R^{H1}$ appended to two pendent aryl groups of the DAPP (e.g., in which $R^{H1}$ is —C(O)—Ar—$CF_3$); and then a further reaction of a $R^H$-containing DAPP in the presence of a reagent (e.g., $R^{H1}$—X, such as $ClCH_2$—Ar—C(O)—Cl) to form a DAPP (IV-7) having a functional group $R^{H2}$ attached to other pendent aryl groups (e.g., in which the $R^{H2}$ is —C(O)—Ar—$CH_2Cl$).

Provided herein are compositions and methods including such halo-containing polymers that also include a cationic moiety, thereby enabling its use as an anion exchange membrane. We discuss methods to attach both fluorine and benzyl halide groups onto the Diels-Alder backbone. In FIG. 11, the first step is to attach the trifluorobenzoyl groups onto the poly(phenylene) backbone (e.g., catalyzed by triflic acid). The resultant polymer (IV-6) can be isolated and dried before the next step, but these reactions can be combined to a one pot (one step) process in which both acid chlorides are added at the same time. The synthesized polymer (IV-7) can include both the fluoro-containing functional groups and the chloro-containing functional groups. In FIG. 11, the fluorine in the poly(phenylene) backbone is not required but used herein as a reference for NMR characterization.

Figure 12:
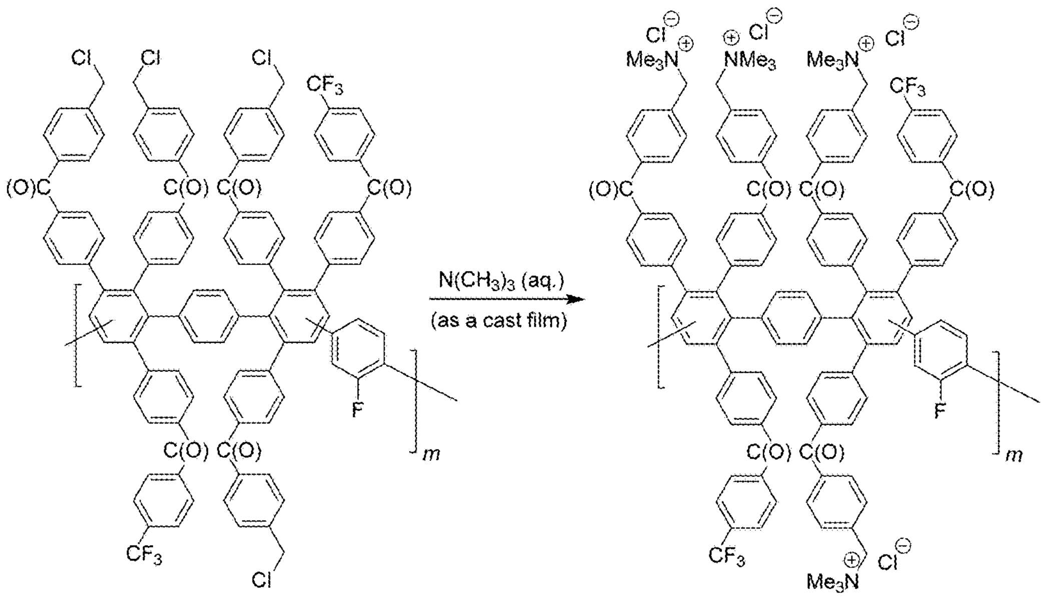
FIG. 12 shows a schematic of an exemplary reaction scheme to provide polymer structure (IV-8). Provided is an exemplary reaction of a DAPP (IV-7, provided as a cast film) with a reagent (e.g., $N(CH_3)_3$) to provide polymer (IV-8) including cationic moieties (e.g., $R^A$ that is —C(O)—Ar—$CH_2$—$N(CH_3)_3$, in which Ar is phenyl) and halo groups (e.g., $R^F$ that is —$CH_2$—Ar—$CF_3$, in which Ar is phenyl).
Figure 13:
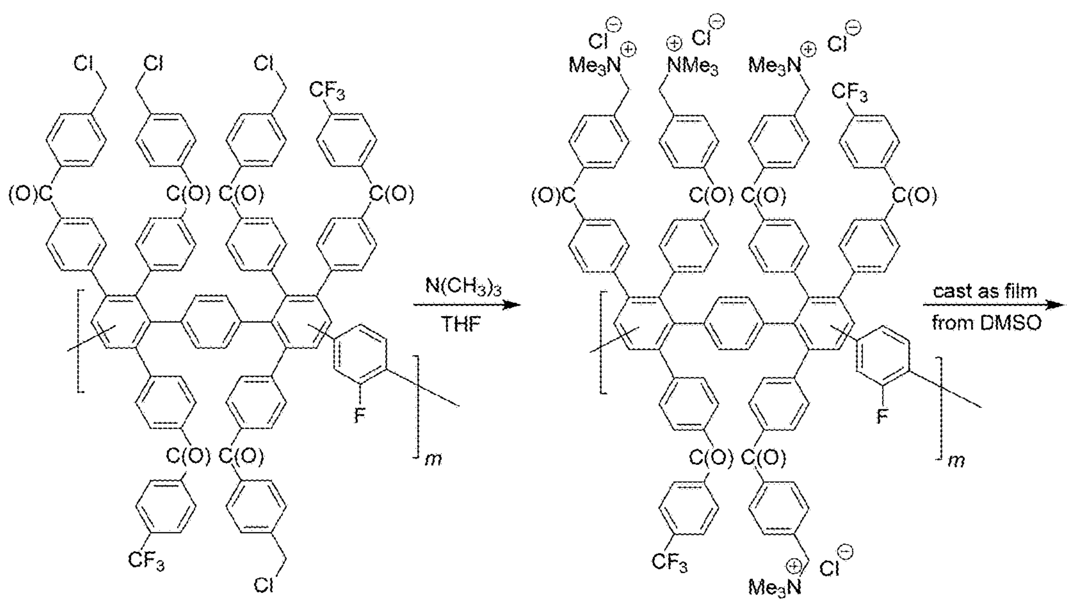
FIG. 13 shows a schematic of another exemplary reaction scheme to provide polymer structure (IV-8). Provided is an exemplary reaction of a DAPP (IV-7) with a reagent (e.g., $N(CH_3)_3$) in a solvent to provide polymer (IV-8) including cationic moieties (e.g., $R^A$ that is —C(O)—Ar—$CH_2$—N$(CH_3)_3$, in which Ar is phenyl) and halo groups (e.g., $R^F$ that is —$CH_2$—Ar—$CF_3$, in which Ar is phenyl). Polymer (IV-8) can be cast as a film.
Figure 14:
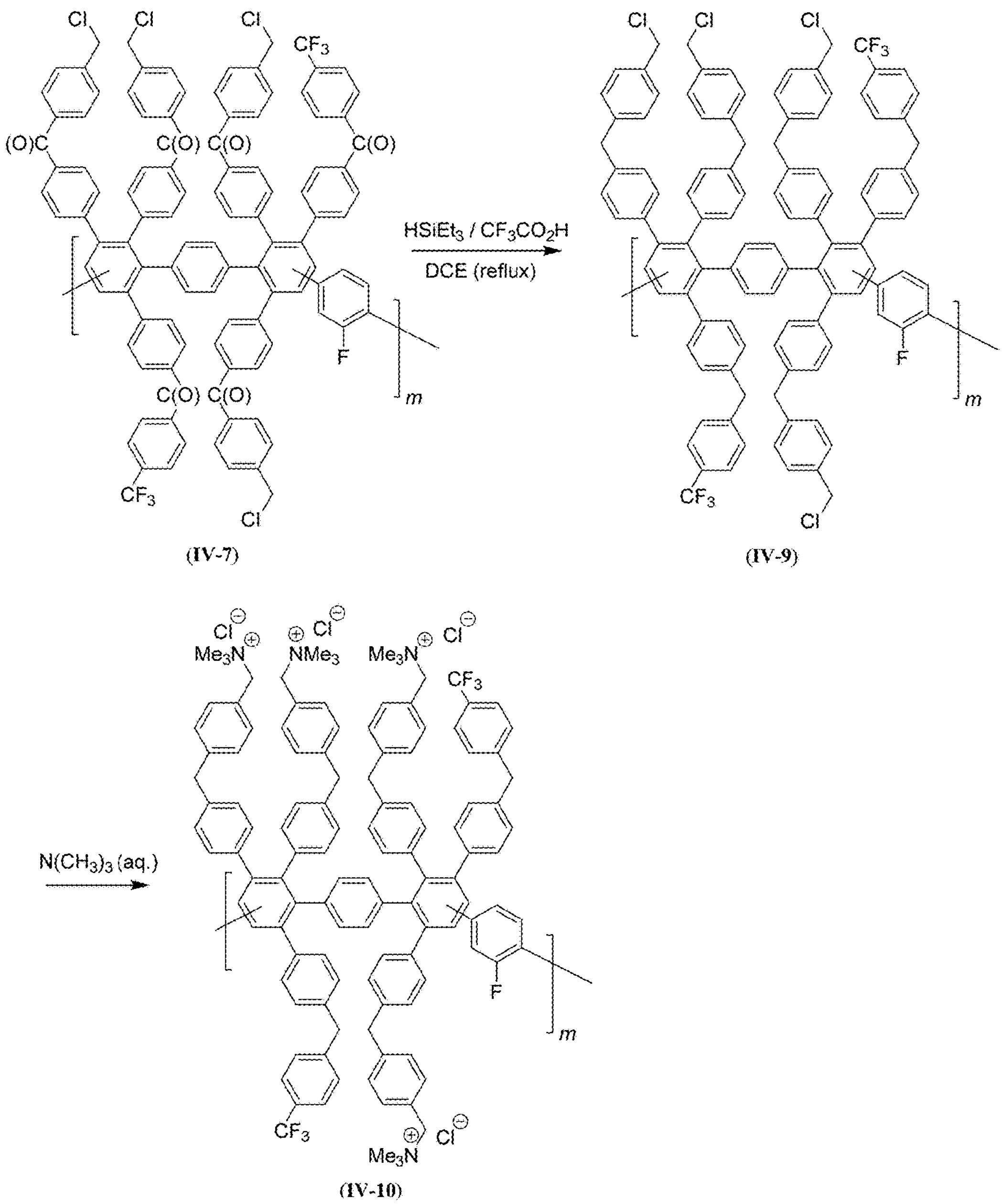
FIG. 14 shows a schematic of an exemplary reaction scheme to provide polymer structure (IV-10). Provided is an exemplary reaction of a hydrophobic DAPP (IV-7) having three $R^H$ substituents appended on three pendent aryl groups of the DAPP (e.g., in which $R^H$ is —C(O)—Ar—$CH_2Cl$, in which Ar is phenyl) and three $R^F$ substituents appended on three other pendent aryl groups (e.g., in which $R^F$ is —C(O)—Ar—$CF_3$, in which Ar is phenyl). Additional reaction steps can be conducted to modify the linker. In one instance, under reducing conditions (e.g., with $HSiEt_3$), the carbonyl linker (—C(O)—) is reduced to a methylene linker (—$CH_2$—), thereby providing polymer (IV-9). This polymer is then reacted in the presence of a reagent (e.g., $N(CH_3)_3$) to provide polymer (IV-10) including cationic moieties e.g., $R^A$ that is —$CH_2$—Ar—$CH_2$—$N(CH_3)_3$, in which Ar is phenyl) and halo groups (e.g., $R^F$ that is —$CH_2$—Ar—$CF_3$, in which Ar is phenyl). Polymer (IV-10) can then be cast as a film.
Figure 15:
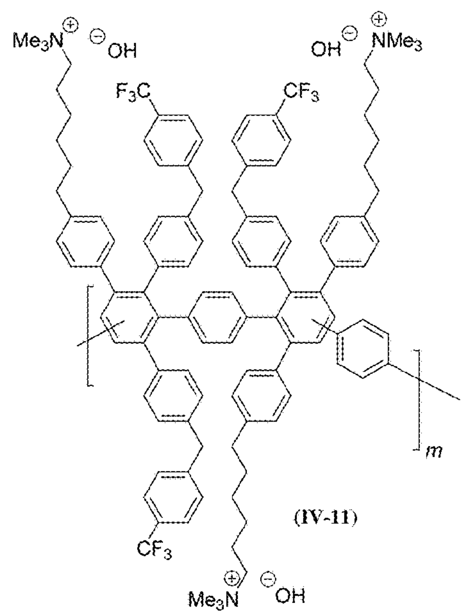
FIG. 15 shows another exemplary polymer structure (IV-11) including cationic moieties (e.g., $R^A$ that is -Ak-N$(CH_3)_3$, in which Ak is alkylene) and halo groups (e.g., $R^F$ that is —$CH_2$—Ar—$CF_3$, in which Ar is phenyl).

As seen in FIG. 12, the resultant polymer (IV-7) can be cast as a film and then soaked in aqueous trimethyl amine to provide a cationic polymer (IV-8). Alternatively, as seen in FIG. 13, the polymer (IV-7) can be dissolved in a solvent (e.g., tetrahydrofuran, THF), reacted with a trimethyl amine to provide the cationic polymer (IV-8), and then cast generate the trimethyl benzyl ammonium group.

Furthermore, any other useful synthetic steps can be employed to modify any portion of the polymer. In one non-limiting instance, a ketone functional group can be sensitive to attach by a nucleophile (e.g., a hydroxide anion), and such a ketone group can be removed from the linker in any useful manner. In one instance, the ketone functional group is reduced prior to attaching the ammonium cation (FIG. 14), thereby providing interim polymer (IV-9) including chloro- and fluoro-groups that can be further reacted to provide a cationic polymer (IV-10).

Any useful reagents can be employed. For instance, for the reduction of ketone groups, refluxing in 1,2 dichloroethane (DCE) with triethyl silane and trifluoroacetic acid is sufficiently gentle enough to minimize side reactions with the benzyl chloride groups. After reduction of the ketone, the resultant polymer can either be cast as a film or dissolved in a solvent (e.g., THF) to react with an amine (e.g., a trialkyl amine, such as $NMe_3$) to form the ammonium cation.

A lengthy linker between the pendent aryl group and the cationic moiety can also be incorporated by first attaching an alkyl chloride group in the optional presence of a Lewis acid catalyst (e.g., a 6-bromohexanoyl chloride in the presence of aluminum trichloride), then attachment of a halo-containing aryl group in the presence of an acid catalyst (e.g., a trifluorobenzoyl chloride with triflic acid), followed by ketone reduction, and then reaction with an amine to provide a cationic moiety (e.g., reaction with a trialkyl amine, such as $NMe_3$). An exemplary polymer (IV-11) provided by such a synthetic scheme is provided in FIG. 15.

Example 2: Testing of Anion Exchange Membranes

Figure 6A:
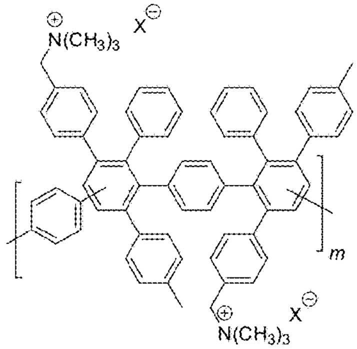
FIG. 6A-6B shows schematics of exemplary polymer structures, including (A) an exemplary polymer for an anion exchange membrane and (B) an exemplary poly(arylene ether) polymer for another anion exchange membrane.
Figure 6B:
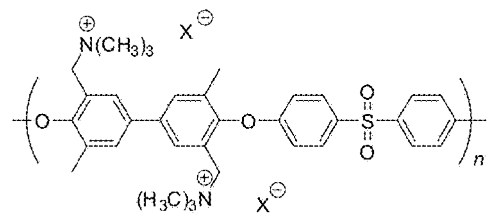
Figure 7A:
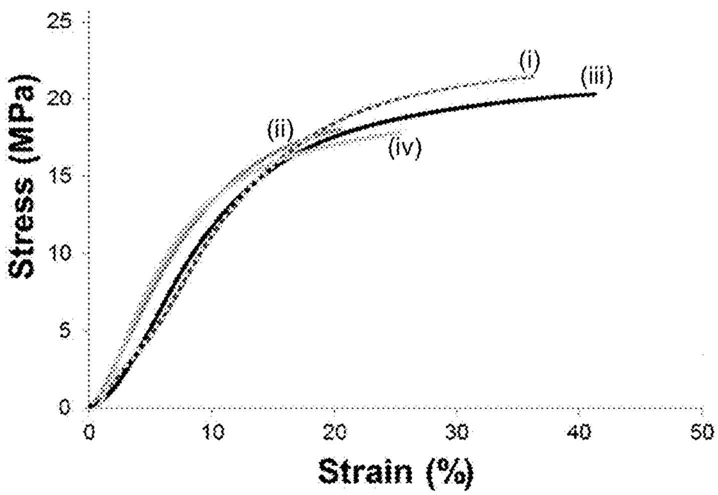
FIG. 7A-7B shows graphs of mechanical strength testing of (A) an anion exchange membrane including the polymer in FIGS. 6A and (B) an anion exchange membrane including the polymer in FIG. 6B.
Figure 7B:
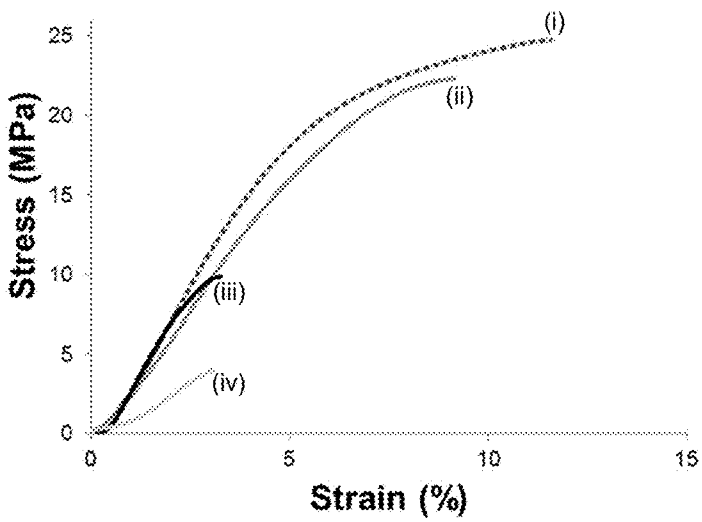

Anion exchange membranes have been developed using poly(phenylene) polymers formed by a Diels-Alder reaction (Diels-Alder polyphenylene polymers, DAPPs). In particular, such a synthesis allows for use of poly(phenylene) polymers as the backbone scaffold. FIG. 6A shows an exemplary poly(phenylene)-based polymer, which displays high backbone stability under alkaline conditions (FIG. 7A). Without wishing to be limited by mechanism, the presence of aryl-aryl bonds provide such a stability as these bonds are less likely to be cleaved, as compared to bonds within heteroatom-containing polymers, such as poly(arylene ether)s (FIG. 6B). As can be seen, stress strain curves are provided for a DAPP (FIG. 7A) and a poly(arylene ether) (FIG. 7B) under varying alkaline conditions. The DAPP-based anion exchange polymer displayed enhanced mechanical stability under tested conditions, as compared to the poly(arylene ether) polymer. Accordingly, DAPP-based polymers display particular mechanical characteristics imparted by the backbone. It is believed that a DAPP-based polymer can be further modified to provide other chemical characteristics, such as by installing a cationic moiety to impart binding to anions or by installing a hydrophobic moiety (e.g., a halo) to provide a membrane with lower water affinity. Such polymer can, for instance, have a structure of formula (I).

Example 3: Functionalization of Diels-Alder Polyphenylene Polymers

Figure 25A:
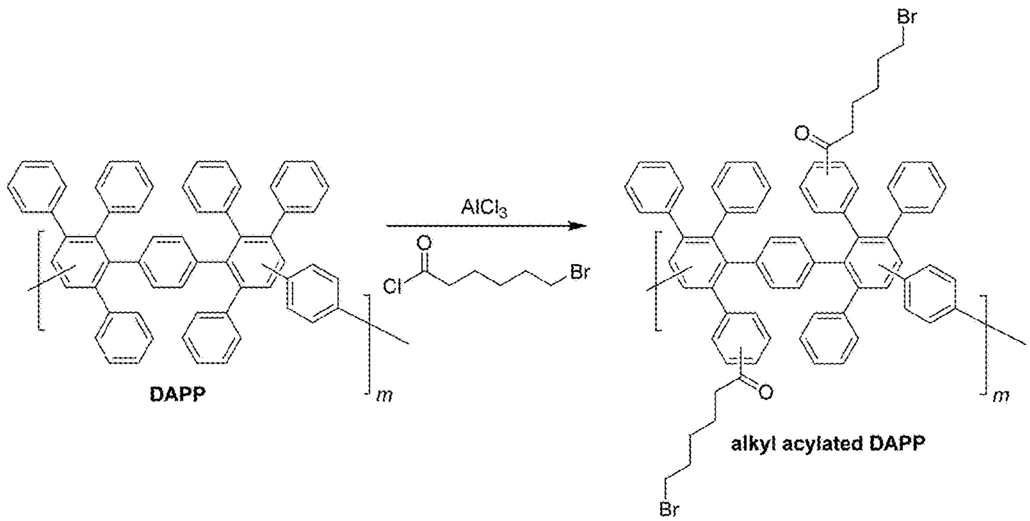
FIG. 25A-25C shows exemplary reaction schemes involving Diels-Alder polyphenylene polymers (DAPPs). Provided are (A) an exemplary reaction scheme for reacting DAPP to conduct a Friedel Crafts alkyl acylation reaction, thereby producing an alkyl acylated DAPP that can be further reacted to provide a cationic moiety as a $R^A$ group or maintained as a $R^F$ group; (B) exemplary reaction schemes for reacting DAPP to conduct a Friedel Crafts aryl acylation reaction; and (C) an exemplary reaction scheme showing the reaction between a silver triflate reagent (AgOTf) and a benzoyl chloride, a potential source for a reactive handle, and then further functionalization with a phenyl group of a polymer.

Friedel-Crafts acylation reactions can be employed to functionalize Diels-Alder polyphenylene polymers (see, e.g., U.S. Pat. No. 8,809,483). Such functionalized polymers can be further reacted to provide any useful polymer (e.g., a polymer having formula (I)). As seen in FIG. 25A, a Diels-Alder poly(phenylene) polymer (DAPP) is functionalized by way of a Friedel-Crafts acylation reaction with an alkyl acyl chloride (e.g., 6-bromohexanoyl chloride) in the presence of aluminum trichloride as a catalyst, thereby providing an alkyl acylated DAPP.

Figure 25B:
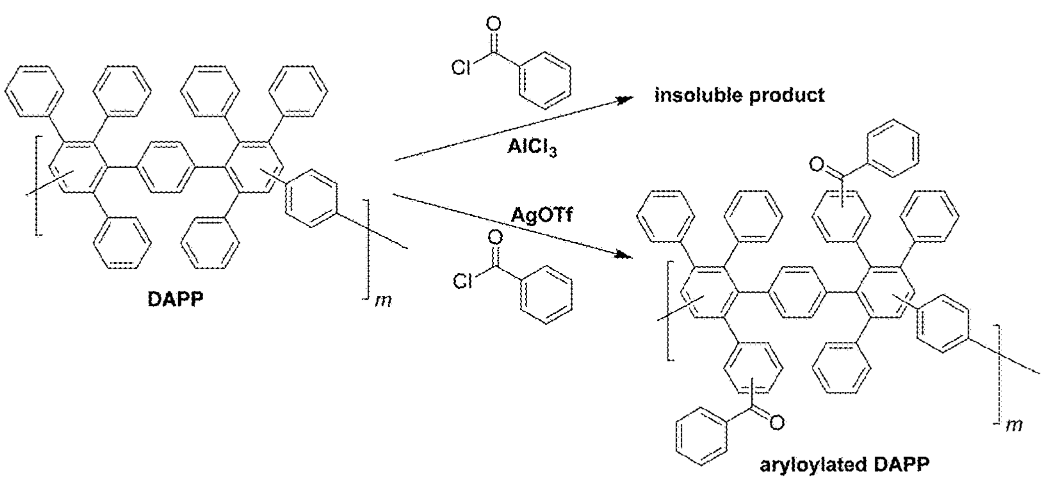

When this Friedel-Crafts acylation approach was used to attach aryl acyl chlorides (e.g., benzoyl chloride), an insoluble product was obtained, which could not be processed further (FIG. 25B, top reaction pathway). Without wishing to be limited by mechanism, Lewis acids, such as $FeCl_3$ and $AlCl_3$, are known to catalyze oxidative carbon-carbon (C—C) coupling, including intramolecular and intermolecular C—C coupling, as well as aryl-aryl coupling, such as in a Scholl reaction. Such coupling reactions are not desired and may lead to insoluble polymeric products. Due to the insolubility of the product provide by the reaction in FIG. 25B (top reaction pathway), we believe that only a trace amount of intramolecular or intermolecular C—C coupling of pendent aryl groups in DAPP would result in insoluble cross linking. Common trace impurities in $AlCl_3$, such as $FeCl_3$ and acidic protons, are potential catalysts for this process.

There are numerous differences between an alkyl acylation reaction (e.g., as in FIG. 25A) and an aryl acylation reaction (e.g., as in FIG. 25B). Without wishing to be limited by mechanism, the reaction pathway difference between alkyl and aryl acyl chlorides can be explained in terms of the stability of the acylium ion intermediates. An aryl acylium ion is stabilized by resonance delocalization, which is not available in alkyl acylium. Thus, the alkyl acylium ion is readily nucleophilically attacked by the pendent aryl groups of DAPP, while the aryl acylium ion reacts slower with the aryl groups so that it competes with aryl-aryl coupling (see, e.g., Corriu R et at, "Mécanisme de la C acylation: étude cinétique du mécanisme de l'acétylation des composés aromatiques catalysée par $AlCl_3$," *Tetrahedron* 1971; 27:5819-31; and Corriu R et al., "Mécanisme de la C acylation: étude cinétique du mécanisme de la benzoylation des composés aromatiques catalysée par $AlCl_3$," *Tetrahedron* 1971; 27:5601-18). Due to these differences in stability between the alkyl-based versus aryl-based ions, different reaction pathways and different end-products can be observed.

Figure 25C:
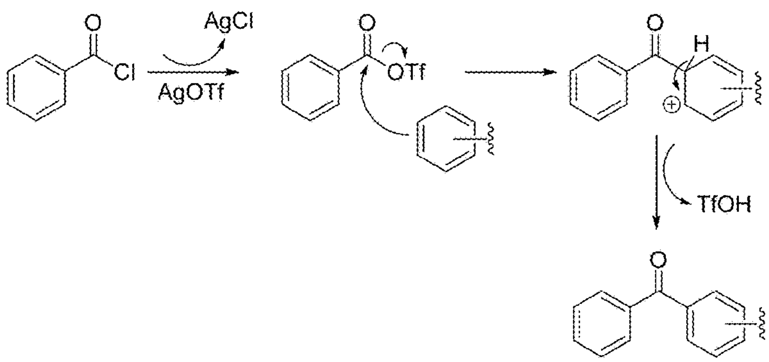

New strategies were required to effectively attach aryl-based functional groups on DAPP backbone and/or pendent groups. In particular, these developments included use of a metal salt to promote aryl acylation. Effenberger published work discussing non-metal catalyzed, Friedel Crafts acylation employing silver triflate (see Effenberger F et al., "Trifluoromethanesulfonic-carboxylic anhydrides, highly active acylation agents," *Angew. Chem. Int'l Ed.* 1972; 11(4):299-300). Without wishing to be limited by mechanism, a reaction between silver triflate and benzoyl chloride generally generates a trifluoromethanesulfonic-carboxylic anhydride and silver chloride (FIG. 25C). The anhydride can then further react with arenes, such as benzene or a phenyl ring to form benzophenone at high yields (e.g., a yield of about 90% or greater). One disadvantage of utilizing silver triflate in this manner is that for every aryl acyl chloride, at least one equivalent of silver triflate is required. An alternative to silver triflate, is employing triflic acid; only a catalytic amount (e.g., 1%) can be used for the Friedel Crafts acylation of aryl acyl chlorides (see, e.g., Effenberger F et al., "Catalytic Friedel-Crafts acylation of aromatic compounds," *Angew. Chem. Int'l Ed.* 1972; 11(4):300-1).

We have applied this chemistry onto a Diels-Alder polyphenylene (DAPP) by reacting a F-labeled DAPP with 4-fluorobenzoyl chloride in the presence of sliver triflate (FIG. 26A), thereby producing a DAPP having one or more reactive handles (II-13). By using 19F-NMR and a fluorine in the polymer backbone as a reference, we can monitor the amount of trifluoromethylbenzoyl that is attached to the backbone (see, e.g., FIG. 26B). Any useful reaction conditions can be modified to increase yield. For instance, reaction temperatures can be increased (e.g., of from about 60° C. or greater, such as of from about 60° C. to about 140° C.); solvent or solvent mixtures can be modified (e.g., by use of no solvent or by use of solvents with low donor numbers, e.g., ethers, acetone, aprotic solvents, non-polar solvents, polar aprotic solvents, etc.); and concentration of reactants can be altered to maximize yield and/or selectivity.

Figure 26A:
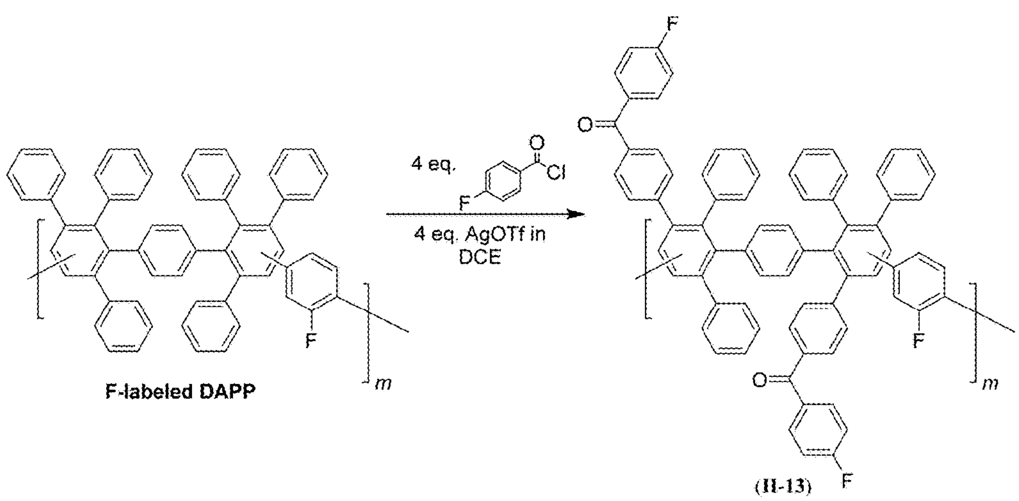
FIG. 26A-26C shows reaction of a labeled DAPP in the presence of a reagent to provide a reactive handle. Provided are (A) an exemplary reaction scheme for reacting a F-labeled DAPP in the presence of a reagent (e.g., $R^H$—X, such as F—Ar—C(O)—Cl) to form a DAPP (II-13) having two reactive handles $R^H$ appended to two pendent aryl groups of the DAPP (e.g., in which $R^H$ is F—Ar—C(O)—); (B) an NMR spectrograph of the F-labeled DAPP; and (C) an exemplary reaction scheme for reacting a $R^H$-containing DAPP in the presence of a reagent (e.g., $R^X$—X, such as $CH_3O$—Ar—O—H) to form a DAPP (II-14) having a functional group $R^X$ attached to each of the two reactive handles $R^H$ (e.g., in which the reacted $R^H$ is —Ar—C(O)—, and in which $R^A$ is $CH_3O$—Ar—O—). Any of $R^H$ and $R^X$ in this figure can be reacted with a reagent to provide a $R^{AF}$ group, or the $R^H$ can be maintained to provide a $R^F$ group.

The synthetic protocol is provided in FIG. 26A and was conducted as follows. Two g of F-labeled DAPP (2.59 mmol) was dissolved in 20 mL of methylene chloride, and 1.63 g of 4-fluorobenzoyl chloride (10.3 mmol) was added to this yellow solution. The yellow solution was cooled in an ice bath, and 2.64 g of silver triflate (10.3 mmol) was added in one addition to give a dark brown color. After 1 hour, the ice bath was removed; and the reaction was stirred overnight at room temperature. Next day, the solution was added to water and heated to boil off the organic solvent. The remaining solid was then collected, rinsed with water several times, and dried in a vacuum oven overnight at 60° C.

Figure 26B:
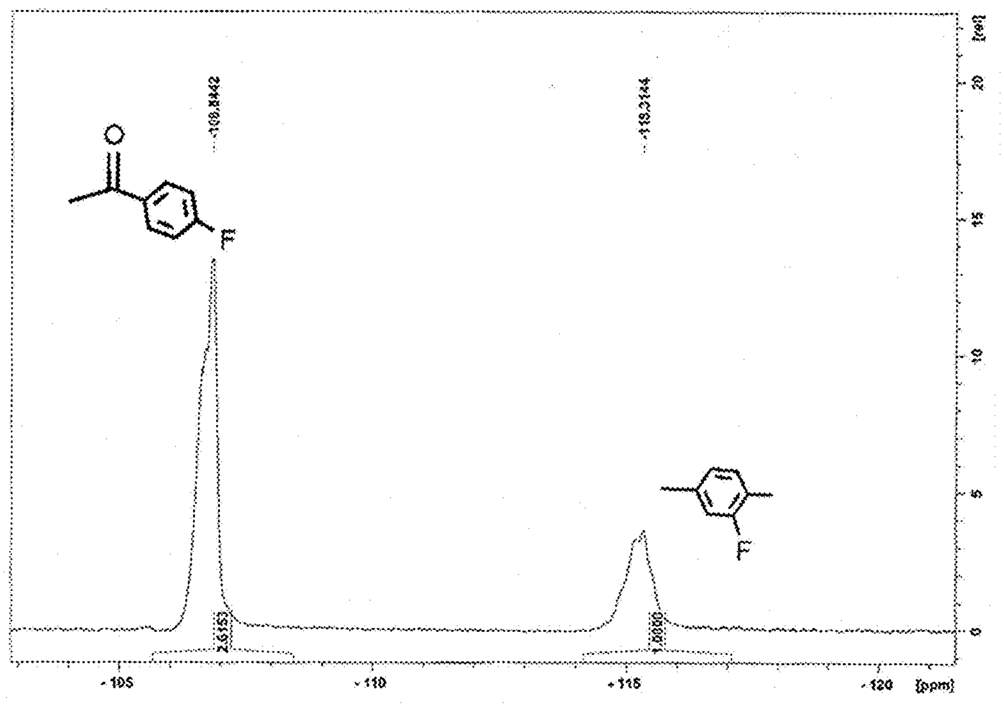

The resultant product was dissolved in D-chloroform for 19F-NMR analysis to determine fluorine quantitative incorporation (FIG. 26B). The signal at −105 ppm arose from the pendent fluorine on the carbonyl aryl group, while the peak at −115 ppm corresponded to a backbone fluorine. Using the peak at −115 ppm as a reference signal, we estimated that about 2.6 pendent aryl fluorine groups were functionalized per repeat group.

Figure 26C:
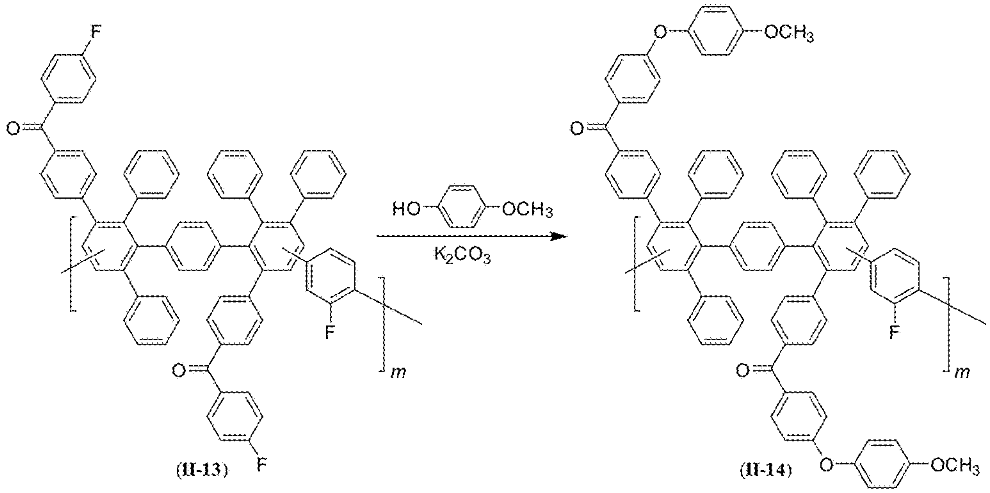

The aryl fluorine group can serve as a reactive handle, which can be further reacted with other functional groups. In particular, the functional versatility of attaching the 4-fluorobenzoyl group is the lability of aryl halides in the presence of a strong electron withdrawing group towards nucleophilic aromatic substitution (SnAr2). As seen in FIG. 26C, the labile aryl halide of the DAPP having a reactive handle (II-13) can be reacted with an aryl ether to append the ether by way of an SnAr2 reaction, thereby forming the further functionalized DAPP polymer (II-14).

Example 4: Acylation Using an Arylsulfonyl Reagent

Figure 27:
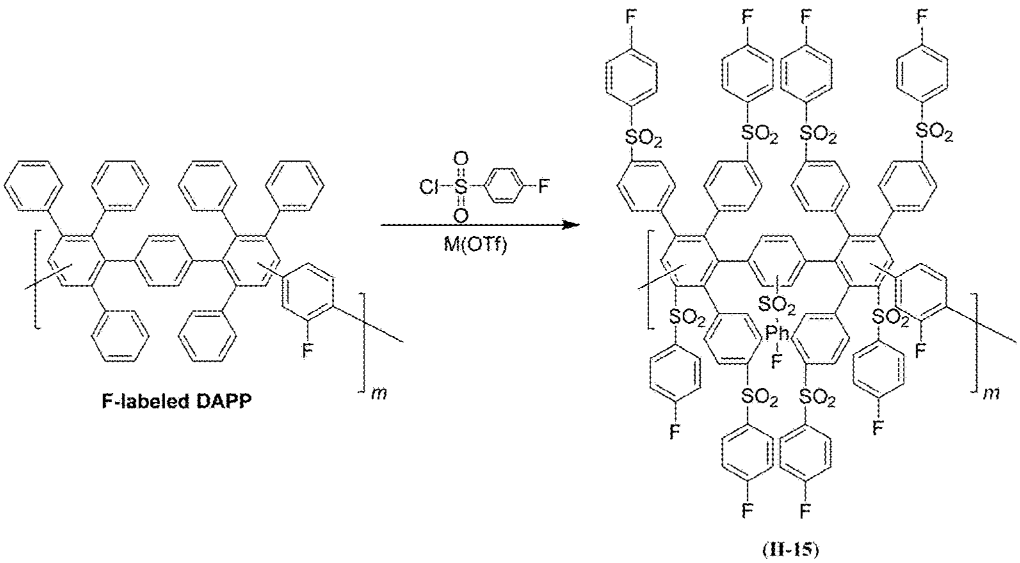
FIG. 27 shows an exemplary reaction scheme for reacting a F-labeled DAPP in the presence of a reagent (e.g., $R^H$—X, such as F—Ar—$SO_2$—Cl) and a metal salt (e.g., M(OTf) to form a DAPP (II-15) having nine reactive handles $R^H$ appended to six pendent aryl groups and three backbone aryl groups of the DAPP (e.g., in which $R^H$ is F—Ar—$SO_2$—). Any of the reactive handle in this figure can be reacted with a reagent to provide a $R^{AF}$ group, or the fluoro-containing group can be maintained to provide a $R^F$ group.

FIG. 27 provides another exemplary reagent to provide a functionalized DAPP polymer. As described herein, the reagent to provide the reactive handle can have the formula $R^HX$, in which $R^H$ can have the formula $-L^H-Ar^H$ or $-L^H-Ak^H$ (e.g., any described herein). In one instance, the exemplary $R^H$—X reagent is $Ar^H-L^H-X$, in which $L^H$ is a sulfonyl and $Ar^H$ is an optionally substituted aryl. As seen in FIG. 27, the $R^H$—X agent includes a linker $L^H$ that is sulfonyl (—$SO_2$—) and an aryl group $Ar^H$ that is a fluorinated phenyl. The $Ar^H$ group can serve as an $Ar^{AF}$ group (e.g., an aryl group including a cationic moiety or a halo).

The reactive handle $R^H$ can be installed in any useful manner. In one instance, $R^H$ can be reacted with the F-labeled DAPP in the presence of a metal salt, e.g., M(OTf), a metal triflate salt. The metal triflate can promote the Friedel Crafts aryl acylation reaction, thereby providing an exemplary DAPP polymer (II-15) having one or more $R^H$ groups appended to the pendent aryl groups and/or the backbone aryl groups of the DAPP polymer.

Example 5: Synthesis of the Fluorinated Diels-Alder Poly(Phenylene) F-DAPP (3*)

Figure 28:
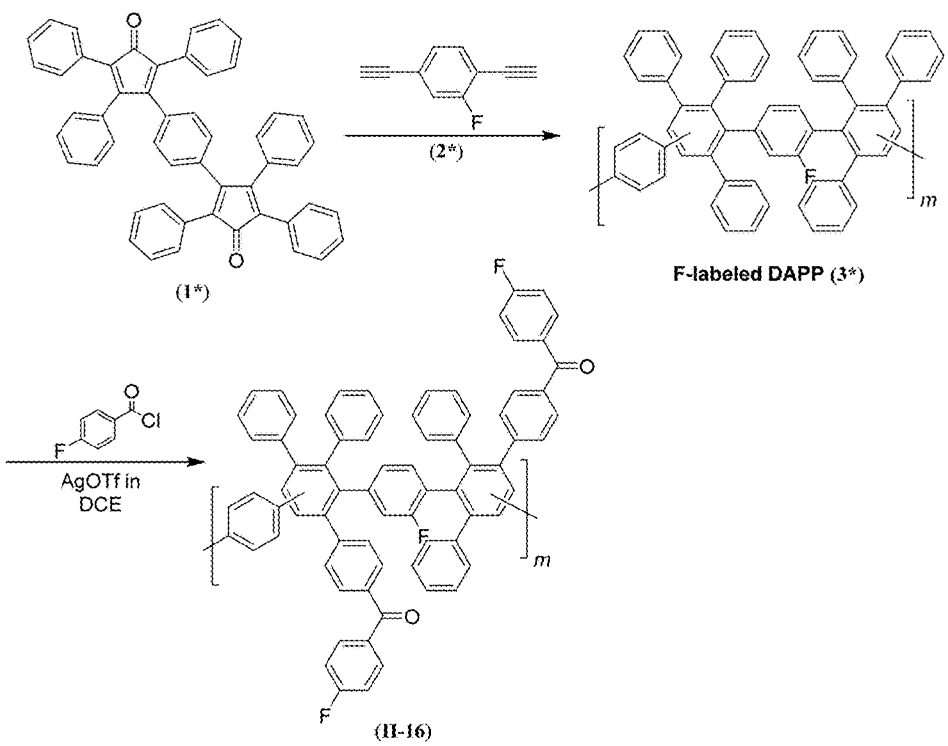
FIG. 28 shows an exemplary reaction scheme for performing a Diels-Alder reaction to generate the Diels-Alder poly(phenylene) (DAPP, 3*) and for performing a Friedel Crafts aryl acylation reaction to generate the DAPP having two reactive handles. Any of the reactive handle in this figure can be reacted with a reagent to provide a $R^{AF}$ group, or the fluoro-containing group can be maintained to provide a $R^F$ group.

FIG. 28 provides the first step for a synthetic scheme, which provides a fluorinated Diels-Alder poly(phenylene) F-DAPP (3*). To 16.9 g of bis(teracyclone) [24.5 mmol] (1*) and 3.5 g of 1,4 diethynyl-2-fluorobenzene [24.5 mmol] (2*) in a 500 mL three neck round bottom flask was added 250 mL of diphenyl ether. The reaction vessel was heated to 165° C. under $N_2$. After 24 hours, the reaction vessel was cooled; and the orange, viscous medium was precipitated from acetone. The solid was isolated, dried, and dissolved in toluene (10 mL of toluene per gram) and then re-precipitated from acetone. The resultant powder was isolated and dried in a vacuum oven at 150° C. for 48 hours, thereby providing F-labeled DAPP (3*).

Example 6: Acylation of Diels-Alder Poly(Phenylene) Backbone with Silver Triflate FIG. 28 also provides the second step for a synthetic scheme, which provides a Diels-Alder poly(phenylene) having a reactive handle composed of a fluorinated acyl group (II-16). Under $N_2$, 2 g of the fluorinated Diels-Alder poly (phenylene) (3*) [2.6 mmol] was dissolved in 150 mL of 1,2-dichloroethane in a 500 mL three neck round bottom flask. At room temperature, 2.4 g of 4-fluorobenzoyl chloride [15.2 mmol] and 3.9 g of AgOTf [15.2 mmol] were added to the reaction vessel. The color of the solution changed from an initial yellow solution to a dark red solution. The reaction was heated to 50° C. for 16 hours. The resultant slurry was filtered by passing through a 2 μm glass fiber syringe frit to remove excess AgOTf and AgCl. The red solution was then precipitated from reagent ethanol and dried in a vacuum oven at 150° C. for 24 hours to provide a fluoroacylated DAPP compound (II-16).

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A composition comprising a structure having the formula (I):

(I)

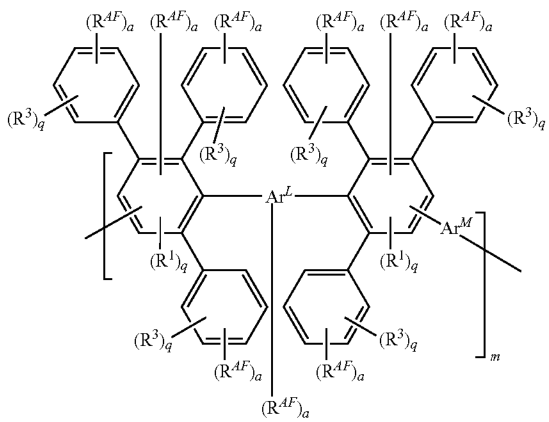

or a salt thereof or a form thereof including a counter ion, wherein:

each and every $R^{AF}$ comprises a cationic moiety or a halo, wherein at least one $R^{AF}$ is an aryl, an alkyl, or a heteroalkyl substituted with the cationic moiety; wherein at least one $R^{AF}$ is an aryl, an alkyl, or a heteroalkyl substituted with the halo; and wherein each of the pendent aryl groups in formula (I) is substituted with $R^{AF}$;

each $R^1$ and $R^3$ is, independently, H, halo, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^E$, wherein $R^S$ is an acidic moiety comprising a sulfonyl group, $R^P$ is an acidic moiety comprising a phosphoryl group, $R^C$ is an acidic moiety comprising a carbonyl group, and $R^E$ is an electron-withdrawing moiety;

each $Ar^L$ is, independently, a bivalent linker comprising optionally substituted arylene;

each $Ar^M$ is, independently, a bivalent linker comprising optionally substituted arylene;

each q is, independently, an integer of from 0 to 5;

each a is, independently, an integer of from 0 to 5, wherein at least one a is not 0; and m is an integer of from about 1 to 1000.

2. The composition of claim 1, wherein at least one $R^{AF}$ is the aryl substituted with the cationic moiety.

3. The composition of claim 1, wherein the cationic moiety comprises an onium cation.

4. The composition of claim 3, wherein the onium cation comprises an ammonium cation.

5. The composition of claim 1, wherein at least one $R^{AF}$ is the aryl substituted with the halo.

6. The composition of claim 1, wherein at least one $R^{AF}$ is an optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, halo, optionally substituted $C_{4-18}$ aryl, optionally substituted $C_{1-12}$ alk-$C_{4-18}$ aryl, optionally substituted $C_{4-18}$ aryl-$C_{1-12}$ alkoxy, optionally substituted $C_{4-18}$ aryloxy, optionally substituted $C_{5-19}$ aryloxycarbonyl, optionally substituted $C_{5-19}$ aryloyl, optionally substituted $C_{4-18}$ arylcarbonyl-$C_{1-12}$ alkyl, optionally substituted $C_{4-18}$ aryl sulfonyl, or optionally substituted $C_{4-18}$ arylsulfonyl-$C_{1-12}$ alkyl.

7. The composition of claim 6, wherein each and every $R^{AF}$ comprises an optionally substituted aryl group.

8. The composition of claim 1, wherein:

at least one $R^{AF}$ is -$L^A$-$Ar^{AF}$ and/or -$L^A$-$Ak^{AF}$, or a salt thereof or a form thereof including a counter ion;

$L^A$ is a covalent bond, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy;

$Ar^{AF}$ is an optionally substituted aryl comprising the cationic moiety or the halo; and $Ak^{AF}$ is an optionally substituted alkyl comprising the cationic moiety or the halo; or an optionally substituted heteroalkyl comprising the cationic moiety or the halo.

9. The composition of claim 8, wherein $L^A$ is a covalent bond, carbonyl, sulfonyl, $—NR^{L3}—$, $—(CR^{L1}R^{L2})_{La}—$, $—C(O)NR^{L3}—$, $—NR^{L3}C(O)—$, $—SO_2—NR^{L3}—$, $—NR^{L3}—SO_2—$, $—(CR^{L1}R^{L2})_{La}—C(O)—NR^{L3}—$, $—(CR^{L1}R^{L2})_{La}—NR^{L3}—C(O)—$, $—(CR^{L1}R^{L2})_{La}—SO_2—NR^{L3}—$, or $—SO_2—NR^{L3}—(CR^{L1}R^{L2})_{La}—$;

wherein each of $R^{L1}$, $R^{L2}$, and $R^{L3}$ is, independently, H, optionally substituted alkyl, optionally substituted haloalkyl, optionally substituted alkoxy, optionally substituted alkaryl, optionally substituted aryl, or halo; and wherein $Ar^{AF}$ or $Ak^{AF}$ is optionally substituted with one or more substituents selected from the group consisting of halo, cyano, optionally substituted haloalkyl, optionally substituted perfluoroalkyl, optionally substituted nitroalkyl, and optionally substituted alkyl.

10. The composition of claim 8, wherein the composition comprises a structure having any one of formulas (Ia) to (Ij), or a salt thereof or a form thereof including a counter ion; and wherein $R^{AF}$ is $R^A$ comprising the cationic moiety or $R^F$ comprising the halo.

11. The composition of claim 1, wherein:

$R^S$ is $—SO_2—R^{S1}$ or $—SO_2—NR^{N1}—R^{S2}$ or $—SO_2—NR^{N1}—SO_2—R^{S3}$, wherein each $R^{S1}$ is, independently, H, optionally substituted alkyl, optionally substituted haloalkyl, optionally substituted perfluoroalkyl, optionally substituted aryl, optionally substituted alkaryl, or hydroxyl; each $R^{N1}$ is, independently, H or optionally substituted $C_{1-12}$ alkyl, optionally substituted aryl, or optionally substituted alkaryl; each $R^{S2}$ is, independently, H, hydroxyl, optionally substituted alkyl, optionally substituted alkylsulfonyl, optionally substituted aryl, or optionally substituted alkaryl; and each $R^{S3}$ is, independently, H, hydroxyl, optionally substituted alkyl, optionally substituted $C_{1-12}$ haloalkyl, optionally substituted perfluoroalkyl, optionally substituted aryl, or optionally substituted alkaryl;

$R^P$ is $—P(O)(OH)_2$ or $—O—PO(OH)_2$ or $—P(O)<R^{P1}R^{P2}$ or $—P(O)<R^{Ar}R^{P2}$ or $—P(O)<R^{Ar}R^{Ar}$, and wherein each of $R^{P1}$ and $R^{P2}$ is, independently, optionally substituted alkyl, optionally substituted alkoxy, optionally substituted aryl, optionally substituted alkaryl, optionally substituted aryloxy, hydroxyl, or H; and each of $R^{Ar}$ is, independently, optionally substituted aryl, optionally substituted alkaryl, or optionally substituted aryloxy;

$R^C$ is $—CO_2H$, $—C(O)—R^{C1}$, or $—R^{CA}—C(O)—R^{C1}$, and wherein each $R^{C1}$ is, independently, optionally substituted alkyl, optionally substituted alkoxy, optionally substituted aryl, optionally substituted alkaryl, optionally substituted aryloxy, hydroxyl, or H; and each $R^{CA}$ is, independently, oxy, optionally substituted alkylene, or optionally substituted heteroalkylene; and $R^E$ is optionally substituted aryloyl, carboxyaldehyde, optionally substituted alkanoyl, or optionally substituted alkyl.

12. The composition of claim 1, wherein $Ar^L$ and/or $Ar^M$ is optionally substituted phenylene, optionally substituted naphthylene, or optionally substituted phenanthrylene.

13. The composition of claim 12, wherein the optional substitution for $Ar^L$ is $R^{AF}$, $R^H$, $R^S$, $R^P$, $R^C$, or $R^E$; and wherein the optional substitution for $Ar^M$ is $R^{AF}$, $R^H$, $R^S$, $R^P$, $R^C$, $R^E$, or a label.

14. The composition of claim 1, wherein the composition comprises a structure having any one of formulas (I-1) to (I-8), (IV-3), (IV-5), (IV-8), (IV-10), or (IV-11), or a salt thereof or a form thereof including a counter ion;

wherein each and every $R^{AF1}$, if present, comprises the cationic moiety or the halo;

wherein each and every $R^{A1}$, if present, comprises the cationic moiety;

wherein each and every $R^{F1}$, if present, comprises the halo;

wherein $L^A$ is a covalent bond, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy; and wherein m is an integer of from about 1 to 500.

15. The composition of claim 14, wherein:

$R^{F1}$ is the halo, an optionally substituted aryl having the halo, an optionally substituted alkyl having the halo, or an optionally substituted heteroalkyl having the halo; and/or $R^{A1}$ is the cationic moiety, an optionally substituted aryl having the cationic moiety, an optionally substituted alkyl having the cationic moiety, or an optionally substituted heteroalkyl having with the cationic moiety.

16. A composition comprising a structure having the formula (VI) or (VII):

(VI)

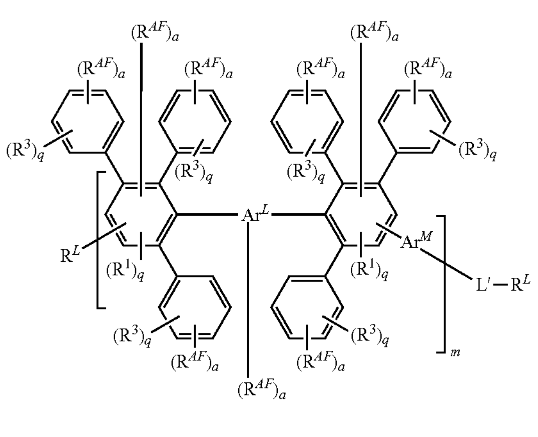

or

-continued (VII)

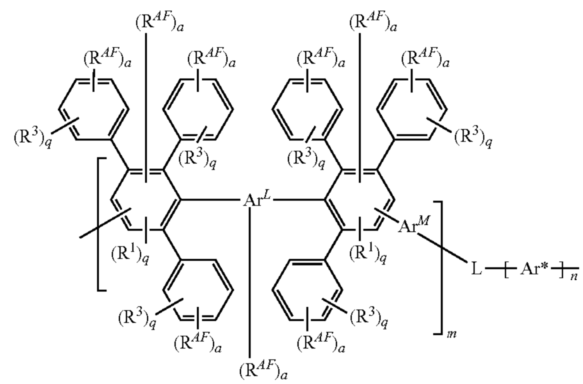

or a salt thereof or a form thereof including a counter ion, wherein:

each and every $R^{AF}$ comprises a cationic moiety or a halo, wherein at least one $R^{AF}$ is an aryl, an alkyl, or a heteroalkyl substituted with the cationic moiety; wherein at least one $R^{AF}$ is an aryl, an alkyl, or a heteroalkyl substituted with the halo; and wherein each of the pendent aryl groups in formula (VI) or (VII) is substituted with $R^{AF}$;

each $R^1$ and $R^3$ is, independently, H, halo, optionally substituted $C_{1-12}$ alkyl, optionally substituted $C_{1-12}$ haloalkyl, optionally substituted $C_{1-12}$ heteroalkyl, optionally substituted $C_{1-12}$ perfluoroalkyl, $R^S$, $R^P$, $R^C$, or $R^E$, wherein $R^S$ is an acidic moiety comprising a sulfonyl group, $R^P$ is an acidic moiety comprising a phosphoryl group, $R^C$ is an acidic moiety comprising a carbonyl group, and $R^E$ is an electron-withdrawing moiety;

each $Ar^L$ is, independently, a bivalent linker comprising optionally substituted arylene;

each $Ar^M$ is, independently, a bivalent linker comprising optionally substituted arylene;

each q is, independently, an integer of from 0 to 5;

each a is, independently, an integer of from 0 to 5, wherein at least one h is not 0;

each of m and n is, independently, an integer of from about 1 to 1000;

L' is a sublink;

Ar* is a hydrophobic segment; and each $R^L$ is, independently, a reactive end group.

17. The composition of claim 16, wherein L' comprises a covalent bond, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, optionally substituted $C_{4-18}$ aryleneoxy, optionally substituted polyphenylene, or a structure of formula (II).

18. The composition of claim 16, wherein $R^L$ is optionally substituted $C_{7-11}$ aryloyl or optionally substituted $C_{6-18}$ aryl.

19. The composition of claim 16, wherein the composition comprises a structure having the formula (VIa) to (VId), or a salt thereof or a form thereof including a counter ion; or the formula (VIII) or (VIIIa), or a salt thereof or a form thereof including a counter ion.

20. An anion exchange membrane comprising the composition of claim 1.

* * * * *